US009024487B1

(12) United States Patent  
Reif

(10) Patent No.: US 9,024,487 B1  
(45) Date of Patent: May 5, 2015

(54) LEVITATION WITH SWITCHABLE INDUCTIVE ELEMENT AND ASSOCIATED SYSTEMS, DEVICES, AND METHODS

(71) Applicant: Eagle Eye Research, Durham, NC (US)

(72) Inventor: John H. Reif, Durham, NC (US)

(73) Assignee: Eagle Eye Research, Inc., Durham, NC (US)

( * ) Notice: Subject to any disclaimer, the term of this patent is extended or adjusted under 35 U.S.C. 154(b) by 318 days.

(21) Appl. No.: 13/682,712

(22) Filed: Nov. 20, 2012

Related U.S. Application Data

(60) Provisional application No. 61/561,918, filed on Nov. 20, 2011.

(51) Int. Cl.  
*H02K 41/02* (2006.01)  
*H02K 7/09* (2006.01)

(52) U.S. Cl.  
CPC ........................................ *H02K 7/09* (2013.01)

(58) Field of Classification Search  
USPC ............ 310/12.09, 12.11, 12.21, 12.22, 90.5; 318/135, 687; 335/209, 306, 205, 206  
See application file for complete search history.

(56) References Cited

U.S. PATENT DOCUMENTS

| | | | |
|---|---|---|---|
| 4,767,954 A * | 8/1988 | Phillips ...................... 310/12.22 |
| 5,722,326 A | 3/1998 | Post | |
| 6,629,503 B2 | 10/2003 | Post | |
| 6,633,217 B2 | 10/2003 | Post | |
| 6,664,880 B2 | 12/2003 | Post | |
| 6,758,146 B2 | 7/2004 | Post | |
| 7,015,780 B2 * | 3/2006 | Bernstein et al. ............. 335/302 |
| 7,096,794 B2 | 8/2006 | Post | |
| 7,170,241 B1 * | 1/2007 | Faizullabhoy et al. ....... 318/135 |
| 7,478,598 B2 | 1/2009 | Post | |
| 7,906,925 B2 * | 3/2011 | Takeuchi ................. 318/400.38 |
| 8,009,001 B1 * | 8/2011 | Cleveland ..................... 335/306 |
| 2003/0006871 A1 * | 1/2003 | Post .............................. 335/306 |
| 2005/0248220 A1 * | 11/2005 | Sato ................................ 310/12 |
| 2011/0074231 A1 * | 3/2011 | Soderberg ....................... 310/44 |

OTHER PUBLICATIONS

Gurol, H. et al., "Status of the General Atomics Low Speed Urban Maglev Technology Program", 18th International Conference on Magnetically Levitated Systems and Linear Drives, Shanghai, China, Oct. 2004.  
Halbach, K., "Application of Permanent Magnets in Accelerators and Electron Rings", iJ. App. Phys., vol. 57, pp. 3605-3608, 1985.

(Continued)

Primary Examiner — Thanh Lam  
(74) Attorney, Agent, or Firm — Perkins Coie LLP

(57) ABSTRACT

Levitation devices and associated systems and methods are disclosed herein. A system configured in accordance with a particular embodiment includes an array of magnetic elements that have differently oriented magnetic fields and an inductive component. The inductive component provides a levitation force by magnetic communication with the magnetic fields of the array of magnetic elements. The inductive component includes an array of inductive elements, with individual inductive elements having a looped circuit that provides the levitation force. The inductive component also includes one or more switch element that controls current flow in one or more of the looped circuits responsive to translational motion between the inductive component and the array of magnetic elements.

28 Claims, 28 Drawing Sheets

(56) References Cited

OTHER PUBLICATIONS

Han, Q. et al., "Four- and Eight-Piece Halbach Array Analysis and Geometry Optimization for Maglev", IEE Proc.-Electr. Power Appl., vol. 152, No. 3, pp. 535-542, May 2005.

Hoburg, J.F. et al., "A Laminated Track for the Inductrack System: Theory and Experiment", Presented at the 18th International Conference on Magnetically Levitated Systems and Linear Drives (Maglev 2004), Shanghai, China, Appearing in Appendix C of "General Atomics Low Speed Maglev Technology Development Program", Oct. 2004.

Kehrer, K. et al., "Maglev Design for Permanent Magnet Levitation Electro-dynamic Suspension (EDS) System", Maglev 2002, Lausanne, Switzerland, Sep. 4-8, 2002.

Mallinson, J.C., "One-Sided Fluxes—A Magnetic Curiosity?", IEEE Transactions on Magnetics, vol. 9, pp. 678-682, 1973.

Mallinson, J.C., et al., "One-Sided Fluxes in Planar, Cylindrical and Spherical Magnetized Structures", IEEE Transactions on Magnetics, vol. 36, pp. 2, Mar. 2000.

Nguyen, Long, et al., "The Design of Halbach Arrays for Inductrack Maglev Systems, Report", Lawrence Livermore National Laboratory, Livermore, CA, 2008.

Post, R. F., "Inductrack Demonstration Model", Report UCRL-ID-129664, Lawrence Livermore National Laboratory, Feb. 1998.

Post, R.F. et al., "The Inductrack Concept: a New Approach to Magnetic Levitation", LLNL Report No. UCRL-30-124115, 1996.

Post, R.F. et al., "The Inductrack: A Simpler Approach to Magnetic Levitation", IEEE Transactions on Applied Superconductivity, vol. 10, pp. 901, 2000.

Trumper, Davis et al., "Magnet Arrays for Synchronous Machine", Proc of IEEE Industry Application Society Annual Meeting, Oct. 2-8, 1993.

U.S. Depart of Transportation, Federal Transit Administration, "General Atomics Low Speed Maglev Technology Development Program", (Supplemental #3), final Report FTA-CA-26-7025.2005, May 2002.

\* cited by examiner

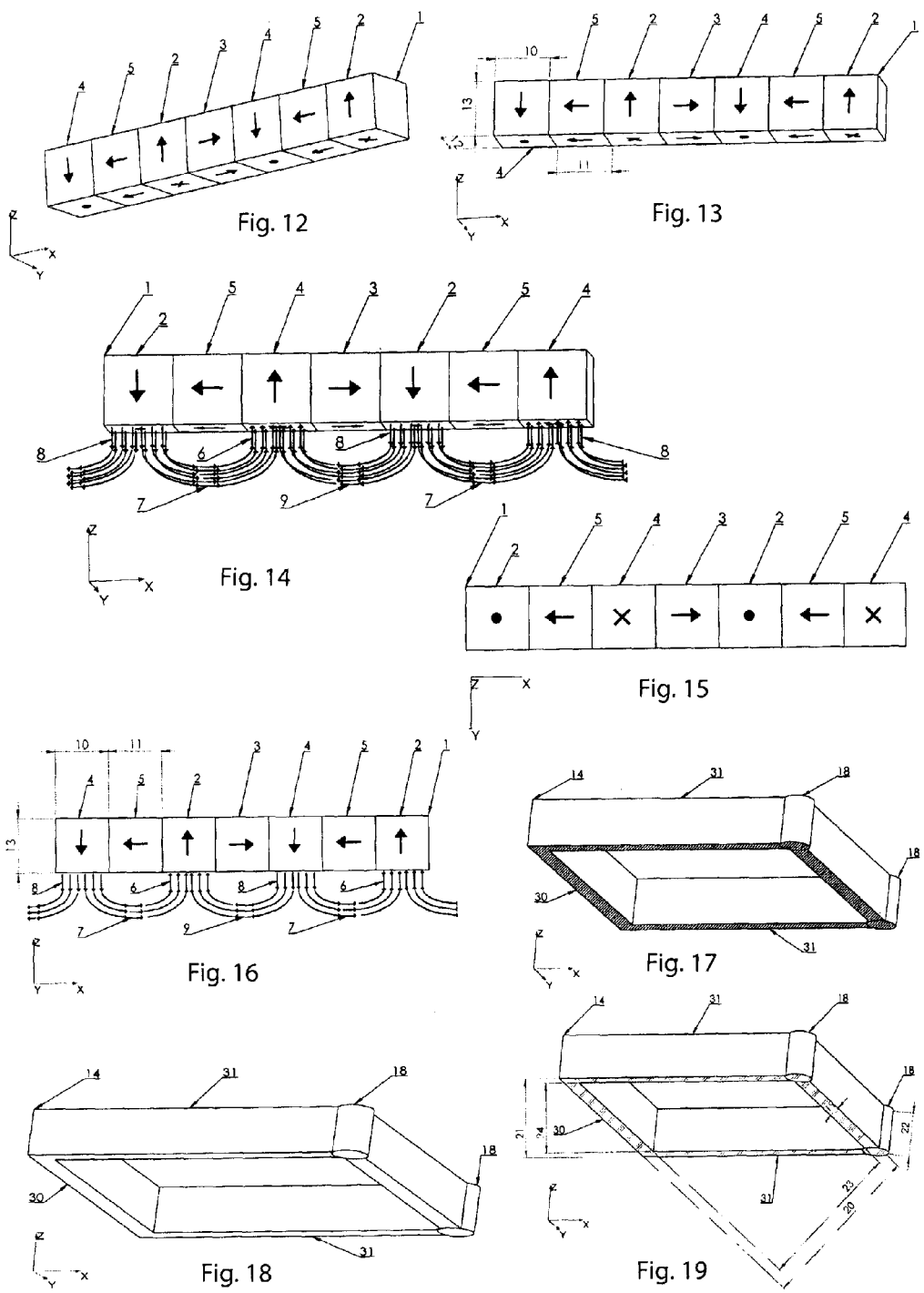

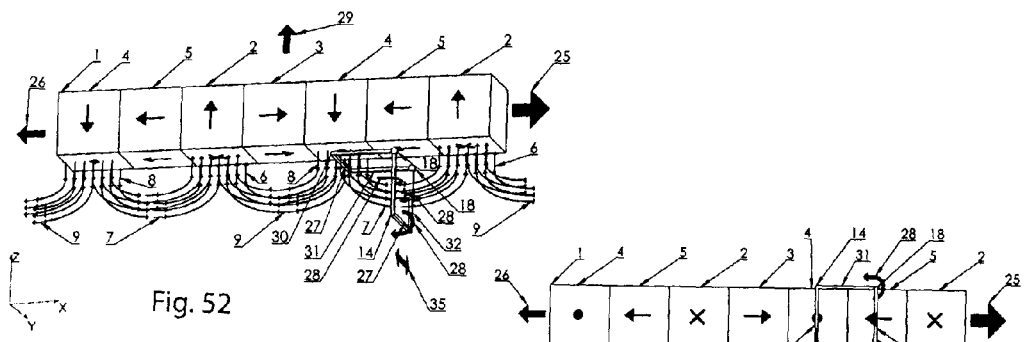
Fig. 52
Fig. 53
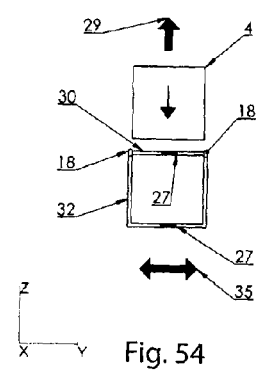
Fig. 54
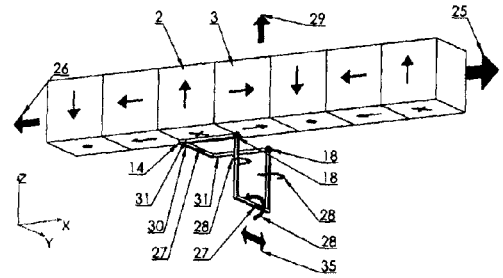
Fig. 55
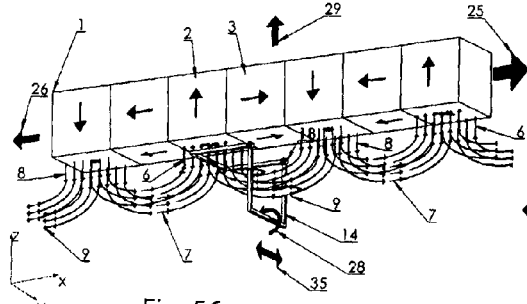
Fig. 56
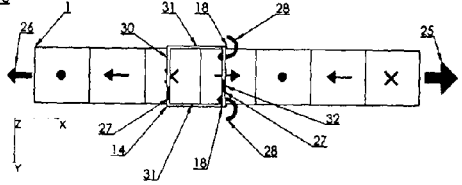
Fig. 57
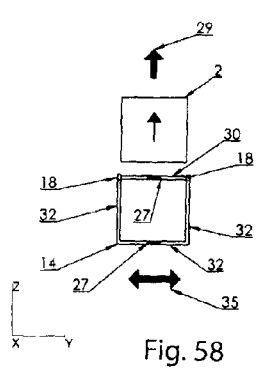
Fig. 58
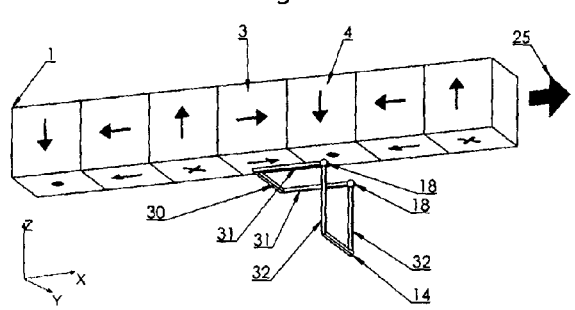
Fig. 59

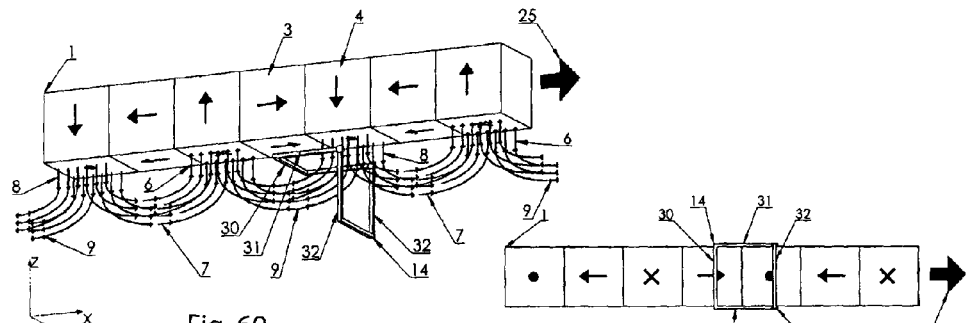
Fig. 60
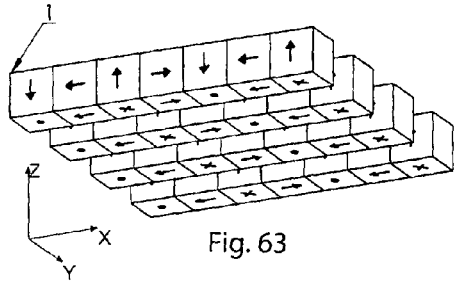
Fig. 61
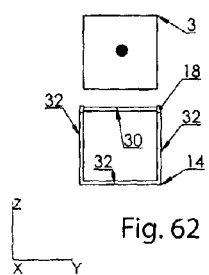
Fig. 62
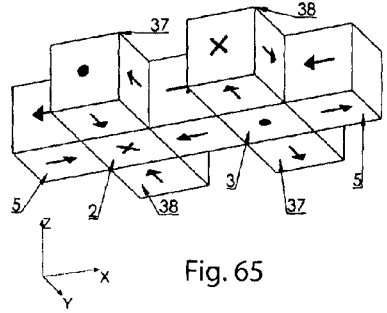
Fig. 63
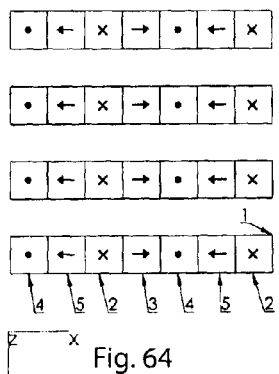
Fig. 64
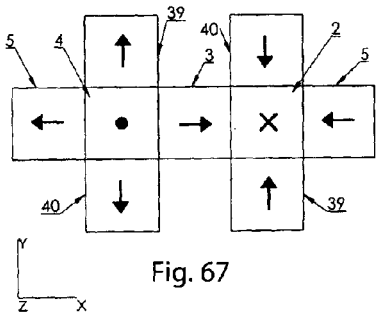
Fig. 65
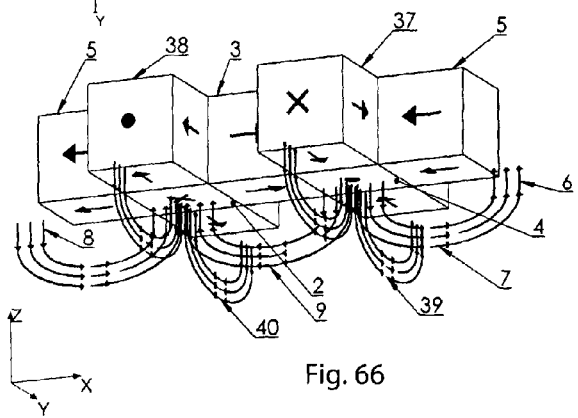
Fig. 66
Fig. 67

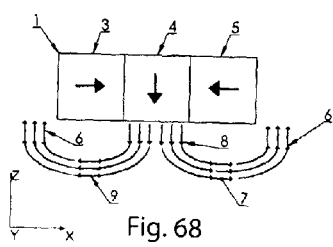
Fig. 68
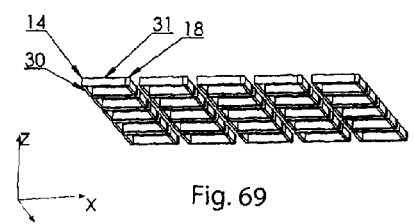
Fig. 69
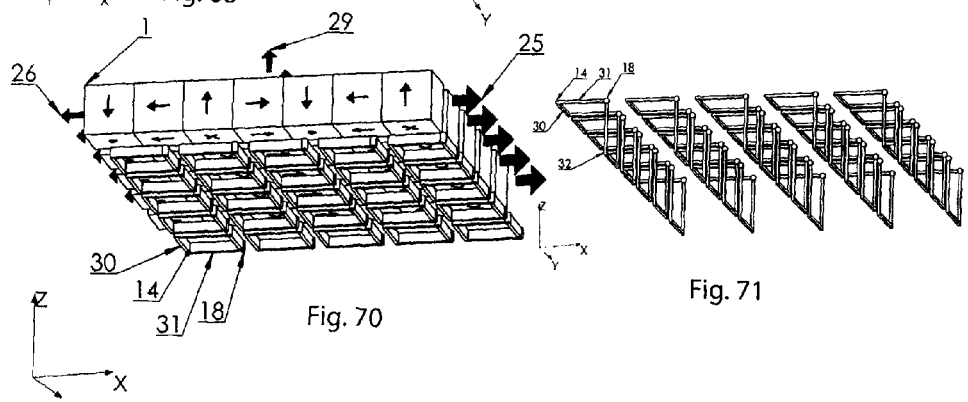
Fig. 70
Fig. 71
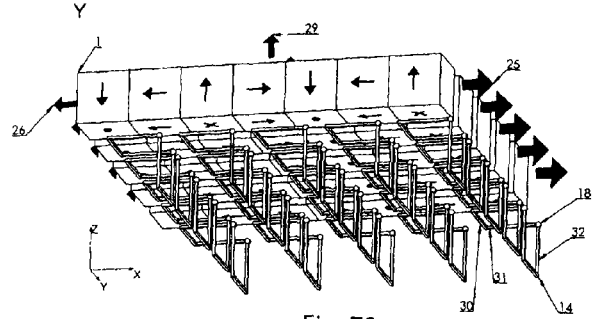
Fig. 72
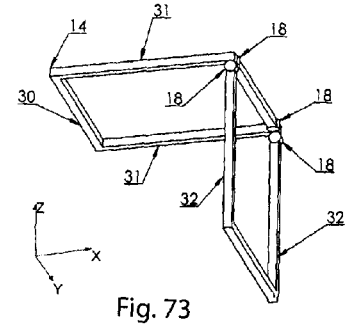
Fig. 73
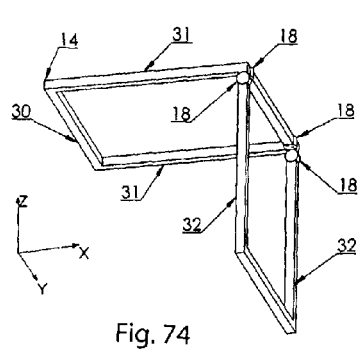
Fig. 74
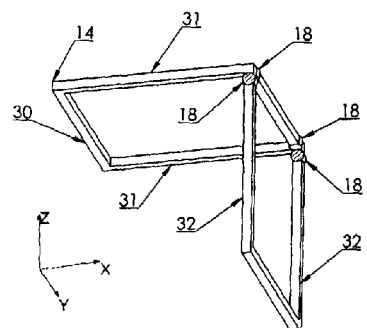
Fig. 75

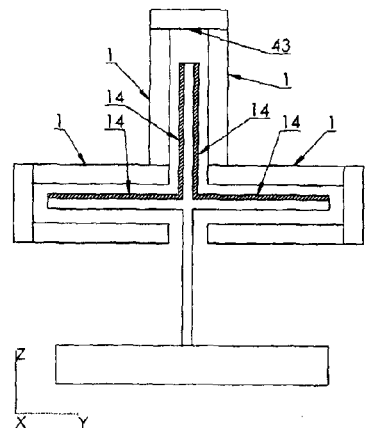
Fig. 86
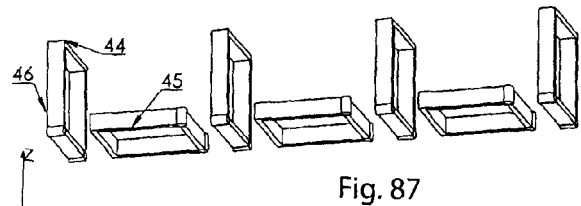
Fig. 87
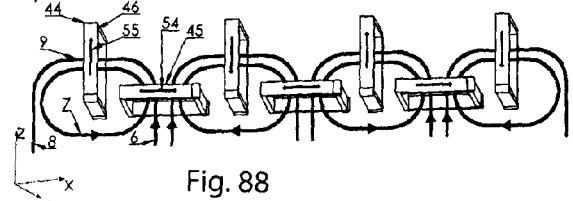
Fig. 88
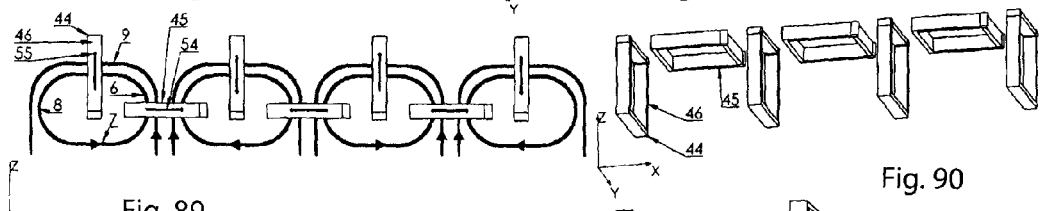
Fig. 89
Fig. 90
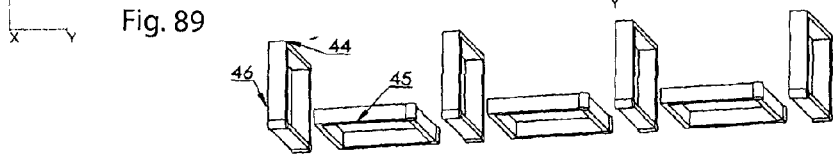
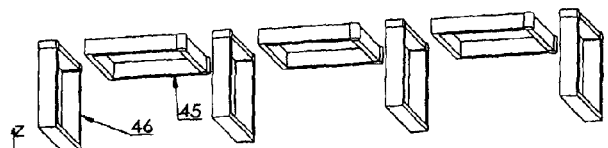
Fig. 91
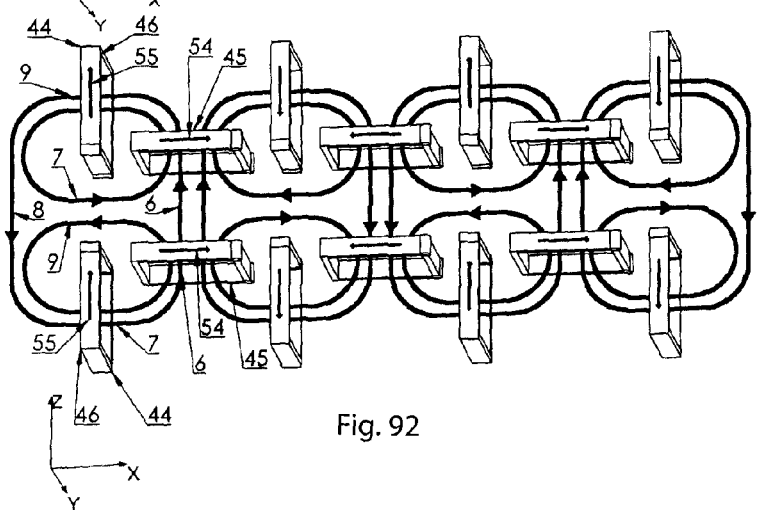
Fig. 92

LEVITATION WITH SWITCHABLE INDUCTIVE ELEMENT AND ASSOCIATED SYSTEMS, DEVICES, AND METHODS

CROSS-REFERENCE TO RELATED APPLICATIONS

The present application claims priority to and the benefit of U.S. Patent Application No. 61/561,198, filed on Nov. 20, 2011 and titled HARVESTING TRANSLATIONAL ENERGY FOR MAGNETIC LEVITATION VIA SWITCHED INDUCTIVE ELEMENTS, which is incorporated herein by reference. To the extent the foregoing application and/or other materials incorporated herein by reference conflict with the present disclosure, the present disclosure controls.

TECHNICAL FIELD

The present disclosure is related to electro-magnetic devices used to create forces, including levitation and alignment forces. In particular, the present disclosure is related to conserving, storing, and/or harvesting energy by translational movement of magnetic arrays proximal to switchable inductive elements.

BACKGROUND

Levitation is the process by which an object is suspended without physical contact. There are a number of types of levitation, including static levitation in the absence of motion of the suspended object, as well as dynamic levitation in which the suspended object undergoes some form of movement, such as rotational or translational movement.

Levitation can be achieved by applying a levitation force between an electromagnetic device and one or more magnetic materials, such as paramagnetic materials, diamagnetic materials, or superconducting materials. Dynamic levitation forces and other forces, such as alignment forces, can improve the efficiency and speed of the transportation of materials and people (e.g., via levitating trains or vehicles).

Conventional levitation systems can employ a moving magnetic array translating above immobile inductive elements. U.S. Pat. Nos. 5,722,326, 6,629,503, 6,633,217, 6,664,880, 6,758,146, 7,096,794, and 7,478,598 disclose one such system referred to as "Inductrack." One drawback to the Inductrack system is that the magnetic arrays in this system induce favorable and disfavorable directions of current flow in the inductive elements. Current that flows in the disfavorable direction produces magnetic forces that counteract levitation forces. This is especially the case at low translational speeds. Accordingly, there remains a need for improved levitational systems.

BRIEF DESCRIPTION OF THE DRAWINGS

FIGS. 12-98 are various views that illustrate other embodiments of the present technology.

DETAILED DESCRIPTION

Specific details of several embodiments of magnetic levitation systems are described herein along with related methods, devices, and systems. The terms "magnetic levitation system" and "magnetic levitation device" are used interchangeably herein to refer to any of a myriad of public, private, commercial, consumer, or recreational systems or devices that employ magnetic levitation. For example, a magnetic levitation system can include a public transportation system (e.g., a passenger train) or a freight delivery system. A magnetic levitation system or device can also include a car, bus, boat, or any other suitable vehicle that carries a person, animal, and/or material. Further, a magnetic levitation system or device can include recreational equipment, safety equipment, and sports equipment, to name a few examples. Such equipment can include shoes, skis, snowboards, bicycles, skates, or other suitable equipment. In some embodiments, this equipment can be worn by or attached to a user of the equipment. In other embodiments, the equipment does not require user intervention. A person skilled in the relevant art will understand that the present technology may have additional embodiments and that the technology may be practiced without several of the details of the embodiments described below with reference to FIGS. 1A-C87.

Figure 1A:
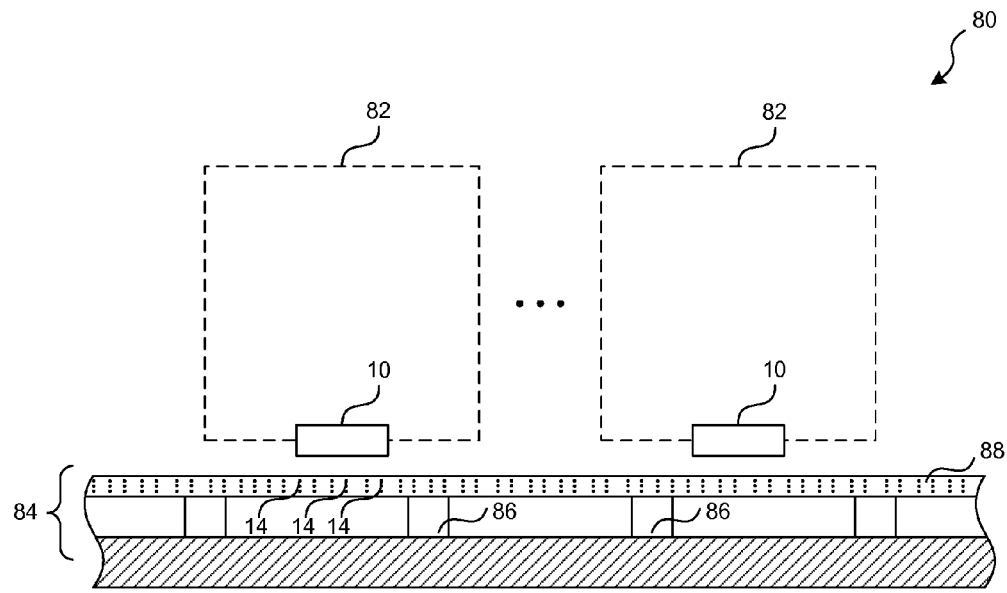
FIGS. 1A and 1B are schematic diagrams of a magnetic levitation system in accordance with embodiments of the present technology.

FIG. 1A is a schematic diagram of a magnetic levitation system 80 in accordance with embodiments of the present technology. The magnetic levitation system 80 includes magnetic components 10, inductive components or switchable switched (switchable) inductive elements (SIEs) 14, and individual units 82 that can be levitated by levitation forces between the magnetic components 10 and the SIEs 14. The units 82 can be any of a variety of structures or components, such as structures or components of any of the systems or devices discussed above. For example, the units 82 can include train cars. Also, although shown as having multiple units 82, the system 80 can include a single unit 82. For example, an individual unit 82 can include a passenger vehicle, a piece of equipment, or an item that can be worn by a user.

As illustrated, the units 82 are carried by a support structure 84 that includes supports 86 carrying a rail 88. The support structure 84 can be a material (such as concrete, wood, plastic, or fiberglass) that has low electrical conductivity, and high magnetic permeability. As described in further detail below, to allow a high magnetic permeability, the supporting structure 84 may have air-gaps (not shown) between individual SIEs or within the interior areas of the SIEs 14. A person skilled in the art will appreciate that the support structure 84 can have any of a myriad of configurations. As shown, the SIEs 14 can be located within the rail 88 of the support structure 84. In another embodiment, the SIEs 14 can be located at the unit 82 and the magnetic component 10 can be located at the rail 88 of the support structure 84. Also, while not visible in FIG. 1A, the support structure 84 can include another rail aligned with the visible rail 88 (e.g., to provide additional stability and/or control). Additionally or alternatively, the support structure 84 can carry the SIEs 14 or magnetic components 10 arranged for two-dimensional translational motion (described further with reference to 6A-7B).

The individual magnetic components 10 include an array of magnetic elements (not shown). As described in more detail below, the magnetic elements have differently oriented magnetic fields that are in magnetic communication with the SIEs 14.

The individual SIEs 14 provide levitation forces through magnetic communication with the magnetic fields of the magnetic components 10. As described in further detail below, the individual SIEs 14 can include a looped circuit (shown in later Figures) or other suitable inductive features that produce components of the levitation force. In accordance with the present technology, the SIEs 14 also include a switch element (shown in Later Figures) for controlling current flow in the SIE 14 based on translational motion between the SIEs 14 and the magnetic components 10.

Figure 1B:
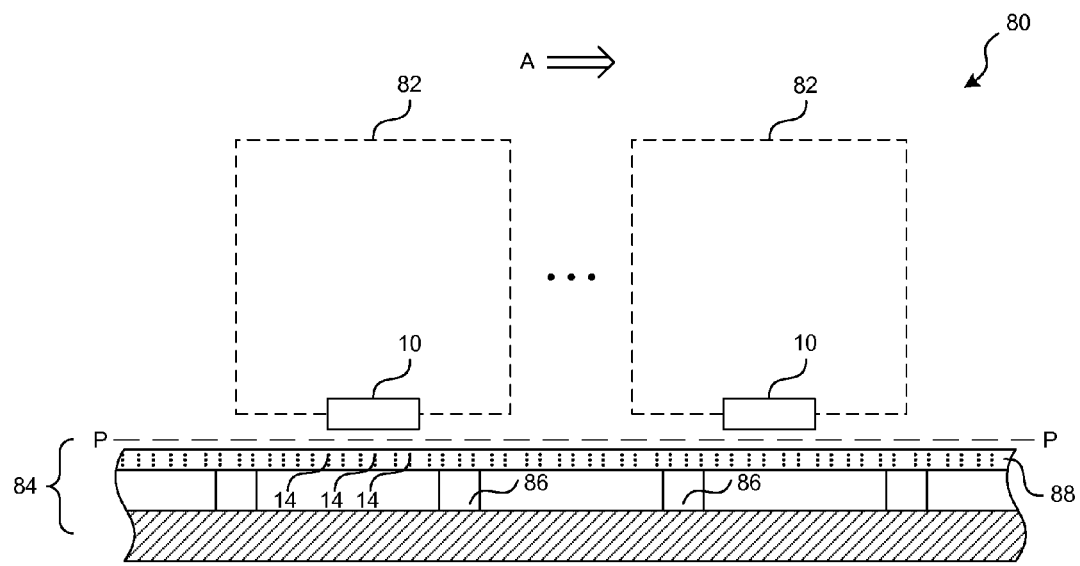

FIG. 1B shows the system 80 and an arrow "A" denoting translational motion between the magnetic components 10 and the SIEs 14. A translational force, applied to the units 82, causes translational motion of the magnetic components across a plane "P" created by the levitation forces between the magnetic components 10 and the SIEs 14. In accordance with embodiments of the present technology, the SIEs 14 convert the kinetic energy of the translational motion into an inductive current. In one embodiment, the SIEs 14 can use the converted kinetic energy to provide levitation forces and/or alignment forces. In additional or alternative embodiments, the converted kinetic energy can be used for other purposes, such as powering components at the units 82 (e.g., electrical motors, lights, control systems, etc.). In some embodiments, the converted kinetic energy can be used immediately and/or stored for use at a later time. For example, the converted kinetic energy can be stored by a capacitor, a battery, or the like.

Translational motion (and the conversion or storage thereof) can be provided by any of a variety of sources. In certain embodiments, a turbine or propeller can provide a translational force without requiring mechanical contact with the support structure 84. Additionally or alternatively, a wheel, gear, or other suitable mechanical component (driven, e.g., by an engine, motor, or actuator) can provide a lateral force by temporarily or periodically engaging the rail 88 of the support structure 84. In some embodiments, a wind force, a gravity force, and/or a hydraulic force provide the translational force or a portion of the translational force. The SIEs 14 can convert kinetic energy from these and other sources. For example, the SIEs 14 can convert energy from the motion provided by motorized or engine-powered locomotion (e.g., trains, subways, automobiles, buses, trucks, and motorcycles) or human or animal powered locomotion (e.g., bicycles) or forces of nature (e.g., gravity powered sleds, snowboards, skis, and/or various other sports and recreational devices). In these various applications, the available translational power available for conversion to electrical power can be in the range of several watts to many megawatts.

Although translational motion is described herein in the context of movement of a magnetic component relative to a stationary SIEs, in some embodiments, translational movement can include movement of SIEs relative to a stationary magnetic component. In some embodiments, both the magnetic components and the SIEs can undergo translational motion with respect to a common stationary location. In other embodiments, the magnetic components and the SIEs can be rotated. Also, in certain embodiments, magnetic components and SIEs can be positioned on a sloped or curved surface. In particular embodiments, the magnetic components and SIEs can be in relative movement on a sloped or curved surface.

Figure 2A:
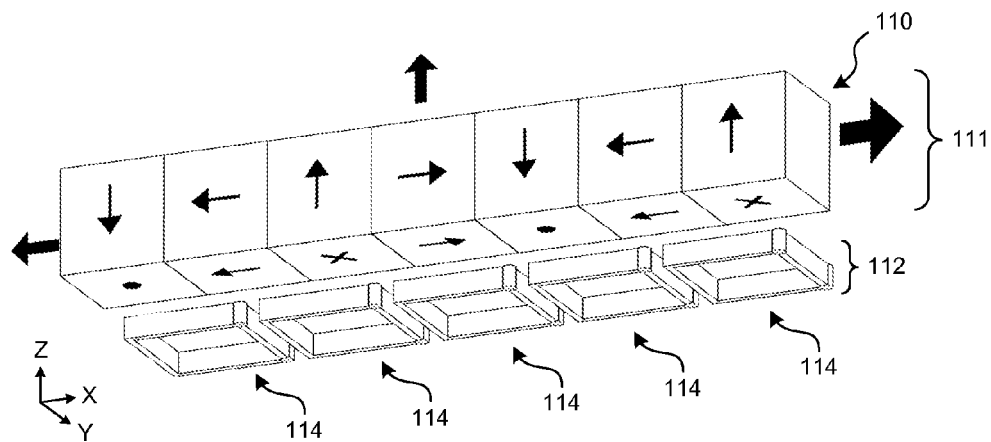
FIGS. 2A-2C are isometric views of magnetic and inductive components configured to provide levitation forces in accordance with embodiments of the present technology.
Figure 2B:
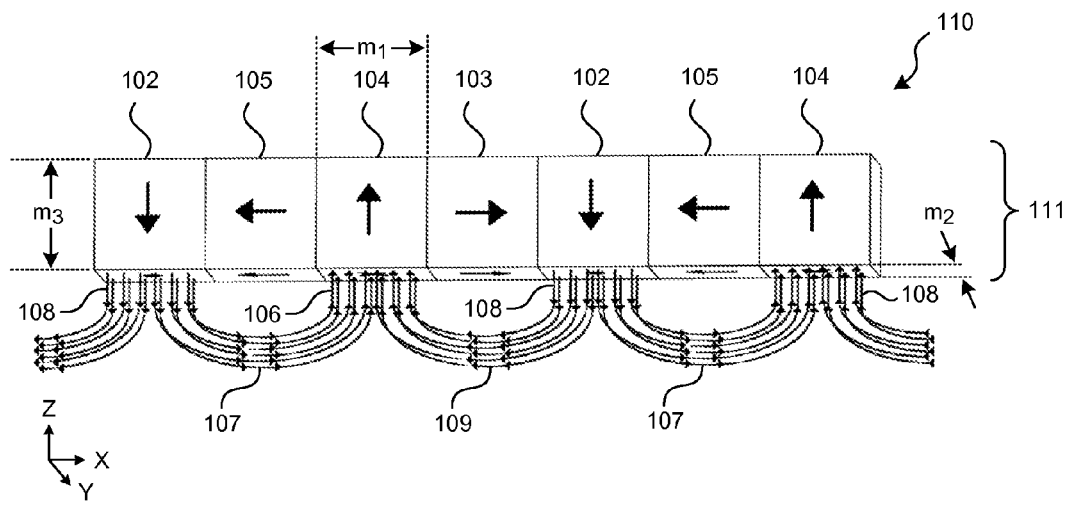

FIG. 2A is an isometric view of a magnetic component 110, an array 111 of magnetic elements of the magnetic component 110, an individual SIE 114, and an array 112 of individual SIEs configured in accordance with embodiments of the present technology. Referring to FIG. 2B, the magnetic component array 111 includes four types of magnetic elements (identified individually as first through fourth magnetic elements 102-105) having differently oriented magnetic fields (magnetic flux directed vertically upward through page is denoted by a small solid circle, and a magnetic flux directed vertically downward through page is denoted by an "X"). The magnetic array 111 is described herein in the context of a Halbach array (HA) with the magnetic elements 102-105 being permanent magnets. In other embodiments, an array of magnetic elements can be configured differently. For example, magnetic elements can include permanent magnets, electromagnets, or superconducting coils or combinations thereof. A person skilled in the art will recognize that the magnetic array 111 can have any of a variety of configurations of magnetic elements. Also, while shown as a linear array of six magnetic elements for purposes of clarity, a magnetic array 111 can include more of fewer elements. Further, magnetic arrays (as well as the arrays of SIEs) are not limited to linear arrays. As used herein, the term "array" can refer not only to a linear array of elements, but can also refer to a two-dimensional array or a three-dimensional array of elements.

As shown in FIG. 2B, the magnet elements 102-105 of the magnetic array 111 are rectilinearly arranged such that the first magnetic element 102 has first internal magnetic flux 106 directed upward, in the positive direction of the z-axis; the second magnetic element 103 has second internal magnetic flux 107 directed left to right, in the positive direction of the x-axis; the third magnetic element 104 has third internal magnetic flux 108 directed downward, in the negative direction of the z-axis; and the fourth magnetic element 105 has fourth internal magnetic flux 109 directed right to left, in the negative direction of the x-axis. Although shown as having a specific orientation in the Figures, a person skilled in the art will appreciate that the magnetic flux pattern can depend on the particular configuration of magnetic elements of a magnetic array. For example, the magnetic array 111 can include additional or alternative magnetic elements with flux directed at other angles, for example at 45 degrees to the x-, y-, and/or z-axis.

For purposes of clarity and to facilitate discussion of their various properties, the first through fourth magnetic elements 102-105 are shown as generally cubic in shape having a first length m1 in the x-axis direction, a second length m2 in the y-axis direction, and a third length m3 in the z-axis direction. In other embodiments, the first through fourth magnetic elements 102-105 can have other dimensions and/or shapes (e.g., wedge or circular), can be spaced apart from one another, and/or can include additional or alternative magnetic elements with field oriented differently than shown or described herein.

Figure 2C:
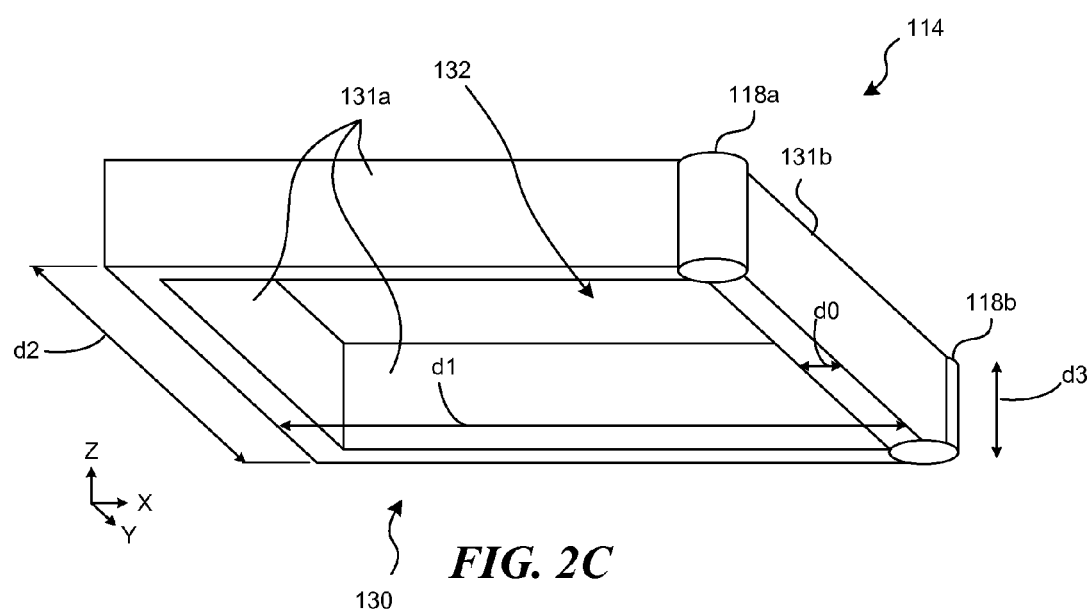

Referring to FIG. 2C, an individual SIE can 114 includes an inductive element 130 and switch elements 118 (identified individually as first and second switch elements 118a and 118b) operably coupled to the inductive element 130. For purposes of clarity and to facilitate discussion of its various properties, the inductive element 130 is shown as having a thickness $d_0$ and including a first portion 131a and a second portion 131b that define a rectangular loop having an opening 132 defined by the thickness $d_0$ dimensions $d_1$, $d_2$, and d3. A person skilled in the art will appreciate, however, that the inductive element 130 can have any of a variety of shapes and/or materials for providing component forces. In various embodiments, the inductive element 130 can include copper, aluminum, or other suitable materials arranged in a coil of wires, laminate films (e.g., of metal and expoxy), or other suitable structures.

The individual switch elements 118 can include, for example, a magnetic switch, an inductive switch, an optical switch or other suitable gating device that can be controlled to complete or interrupt a circuit path or otherwise regulate current flow. Although shown in the Figures as containing two switch elements, an SIE can include more or fewer than two switch elements. For example, a single switch element can be aligned with the center of the second portion 131b of the inductive element 130. In some embodiments, multiple switch elements can align and maintain the SIE in desired orientation during operation. For example, the first and second switch elements 118a and 118b can align the second portion 131b of the magnetic element 130 with the y-axis of FIG. 2C.

The switch elements 118 may operate in any of a variety of suitable ways. In one embodiment, the magnetic array 111 (FIG. 2A) has optically-detectable patterns and the switch elements 118 are optical switch elements that open or close based on the detected pattern. In another embodiment, the switch elements 118 are inductive switches, for example, reed switches, that detect the pattern of magnetic flux below the magnetic array 111. In other embodiments, the switch elements 118 can include other arrangements. For example, the switch elements 118 can include mechanical switches that are actuated by a magnetic field. As another example, the switch elements can be controlled by digital image processing (e.g., via camera) that detect the relative position of the magnetic elements within the magnetic array 111. In some embodiments, the switch elements 118 can operate automatically without intervention from an intermediary circuit. For example, the switch elements 118 can automatically increase in switching frequency as translational velocity increases. In other embodiments, the switches can be controlled by an intermediary device such as a controller device or controller circuit. Embodiments of controller circuits are described further with reference to FIG. 11.

In some embodiments, the switch elements 118 can be commonly coupled to the inductive elements of two or more SIEs. For example, every fourth SIE 114 (e.g., each of the SIEs 114 below the fourth magnetic element 105 shown in FIG. 2A) or every second SIE 114 (e.g., each of the SIES below the second and fourth magnet elements 103 and 105 shown in FIG. 2A) can be coupled to the same switch elements 118. Because some of the SIEs 114 will concurrently receive generally the same magnetic fields (or the same magnetic field magnitude), current can be removed or applied simultaneously. Further, in these and other embodiments, the switch elements 118 can be located remotely, such as at a controller circuit (not shown) that is electrically coupled to an SIE 114 through a signal wire or the like. The controller circuit could be connected to the switching elements via a wireless radio, optical, or other suitable link.

In general terms, the switch elements of the various embodiments of the individual SIEs described herein provide for efficient "harvesting" of the kinetic energy associated with the translational movement of the magnetic array (or translational movement of the SIE in alternate embodiments). In particular, the switch elements control current flow (or voltage differentials) in the inductive element (e.g., the inductive element 130) such that the magnetic field variations in the vicinity of the SIEs induce an electrical current that provides favorable magnetic field responses (or forces). For example, switch elements can be set ON (or ramp up current flow) when the induced current provides a favorable force component for levitation, alignment, and/or other purposes. Alternatively, the switch elements can be set OFF (or ramp down current flow) when the induced current would provide a disfavorable force component. For example, referring to the SIE 114, the switch elements 118 can be set OFF when the induced current would cause an attractive force between the SIE 114 and one or more magnetic elements adjacent the SIE 114. Accordingly, the SIE 114 operates to provide levitation forces that reduce friction and thus reduce energy required to provide translational motion. In various other embodiments, the SIEs can have different configurations for providing various other forces in addition to the levitation forces. In addition, as used herein the term "ON" can refer to a state in which current flow is immediately initiated in the SIE; however, the term can also refer to a state where the current flow is gradually increased. Similarly, as used herein the term "OFF" can refer to a state in which current flow is immediately ceased in the SIE; however, the term can also refer to a state where the current is gradually decreased.

As discussed above, SIEs can also store kinetic energy in electrical form and use the stored energy for purposes other than for providing levitation or alignment forces, such as for purposes that include powering components (e.g., electrical motors, lights, control systems, etc.) For example, as shown in FIG. 2C, the SIE 114 can include a charge storage device or component 116 (drawn schematically and in phantom), such as a capacitor or a battery, electrically connected to the inductive element 130 for storing converted kinetic energy. In various embodiments, a charge storage device can receive a portion of the induced current, store the charge associated with the current, and provide the charge to another component as needed. In other embodiments, a charge storage device can be located less proximal to an SIE. For example, a charge storage device can be located at a controller or at an intermediary circuit location between the controller and the SIE.

FIGS. 3A-3D illustrate the operation of an individual SIE as a magnetic array (proximal to the SIE) moves from the left side of the page to the right through a first position P0, second position P1, and third position P2. For purposes of clarity, only the operation of a single SIE 114 is described. A person skilled in the art will appreciate that operation of other SIEs (e.g., adjacent SIEs, alternatingly positioned SIEs, conductively linked SIEs, as well as other types of SIEs, such as those configured for alignment forces or multi-dimensional operation) can be similar but inverse and/or opposite that of the operation shown and described in the Figures. In general, these figures illustrate, as described below, (i) the translational movement of the magnetic array resulting in variations in the magnetic field in the vicinity of the inductive elements of the SIEs and (ii) dynamic operation of the switch elements controlling the induced electrical current flow in the SIEs.

Figure 3A:
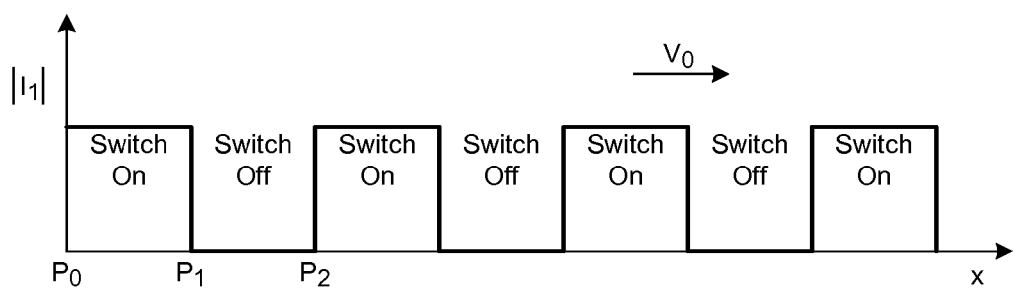
FIGS. 3A-3D are signal line diagrams corresponding to the operation of the magnetic and inductive components in accordance with embodiments of the present technology.
Figure 3B:
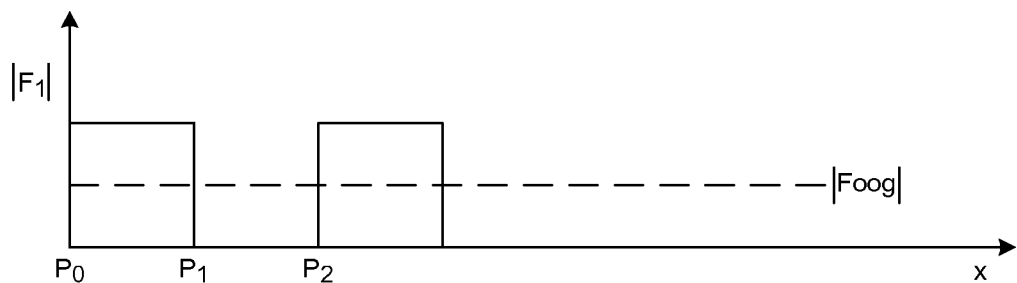
Figure 4A:
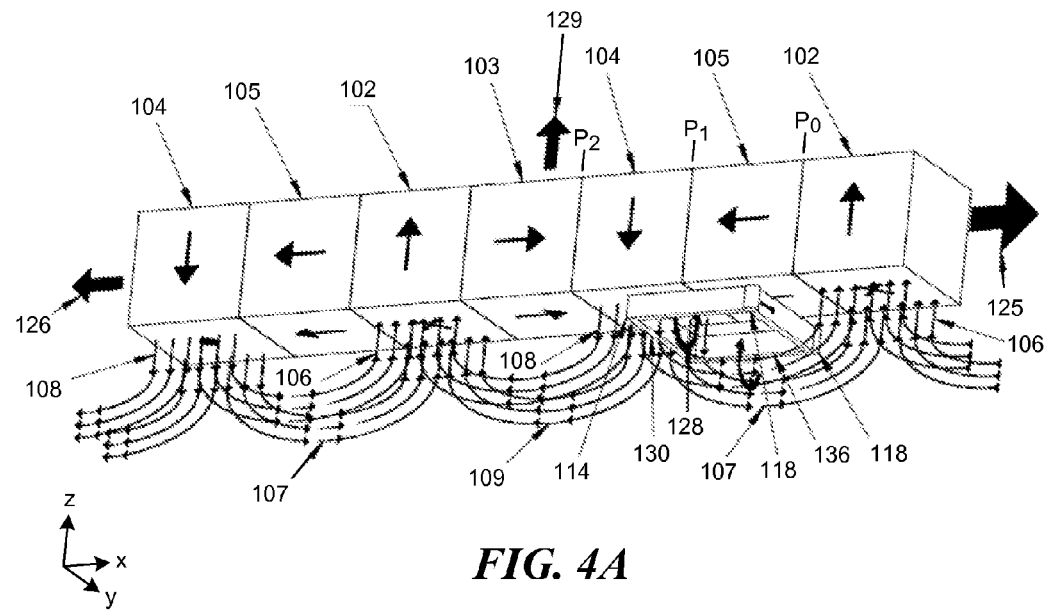
FIGS. 4A-4E are isometric, bottom plan, and side views of magnetic and inductive components showing an operational state of the magnetic and inductive components in accordance with embodiments of the present technology.

FIGS. 4A-4E illustrate various views of the SIE 114 and the magnetic array 111 during the operation shown in FIGS. 3A and 3B. FIG. 4A is an isometric view that show the SIE 114 and the first through third positions P0-P2 through which the magnetic array 111 can move translationally. FIGS. 4B-4E are bottom plan views that show the magnetic array 111 at the various positions of FIGS. 3A and 3B during movement (shown by an arrow 125) of the magnetic array 111 in the positive direction of the x-axis from left to right over the SIE 114. A resulting drag force (shown by an arrow 126), from the inductive energy-transfer from kinetic energy to electrical current, directed from right to left, in reverse of the direction of the magnetic array 111, is also shown. Referring again to FIG. 4A, a magnetic flux induced by the magnetic element 130 (shown by arrow 128) and a resulting levitation force (shown by an arrow 129) on the magnetic array 111 is also shown.

Referring again to FIGS. 3A and 3B together, the SIE induces current I1 (FIG. 3A) and a resultant force F1 (FIG. 3B) as the magnetic array is moved at a velocity $V_0$ relative to the SIE. The ranges of positions that provide favorable magnetic fields have the switch elements set ON (i.e., the range of positions between the first position P0 and the second position P1). The ranges of positions that provide disfavorable magnetic fields have the switch elements set OFF. As shown in FIG. 3B, an average levitation force Favg is based on the time-averaged value of the force F1 produced by the SIE. The magnitude of the current I1 is reduced substantially (or to zero) as the magnetic array is moved between the second position P1 and the third position P2. In this state, the switch elements are OFF and no current is induced. FIG. 3B shows the magnitude of the force F1 reduced as the magnetic array moves between the second and third positions P1 and P2.

Figure 4B:
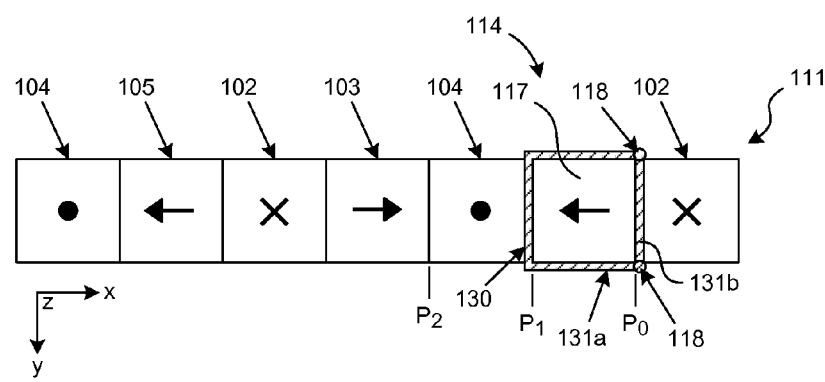
Figure 4C:
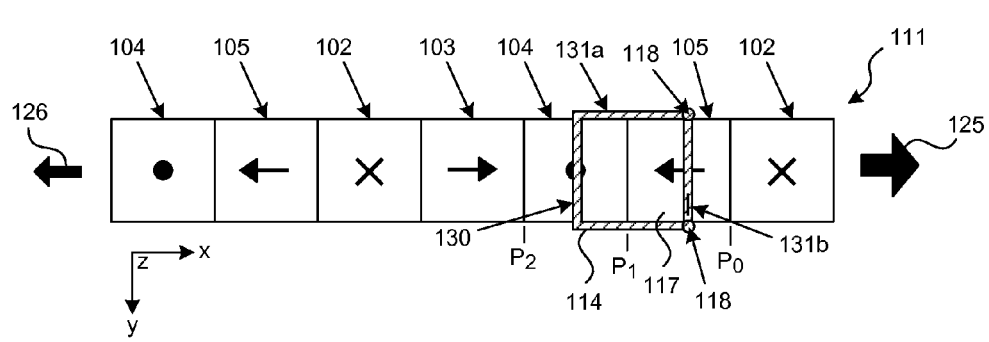
Figure 4D:
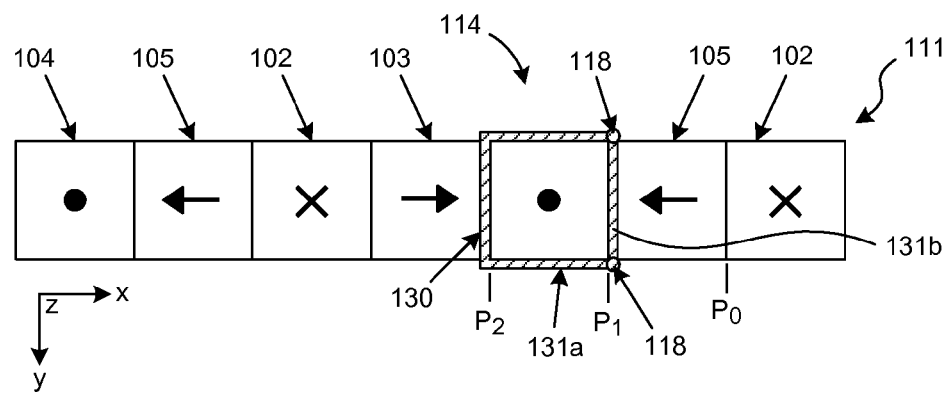
Figure 4E:
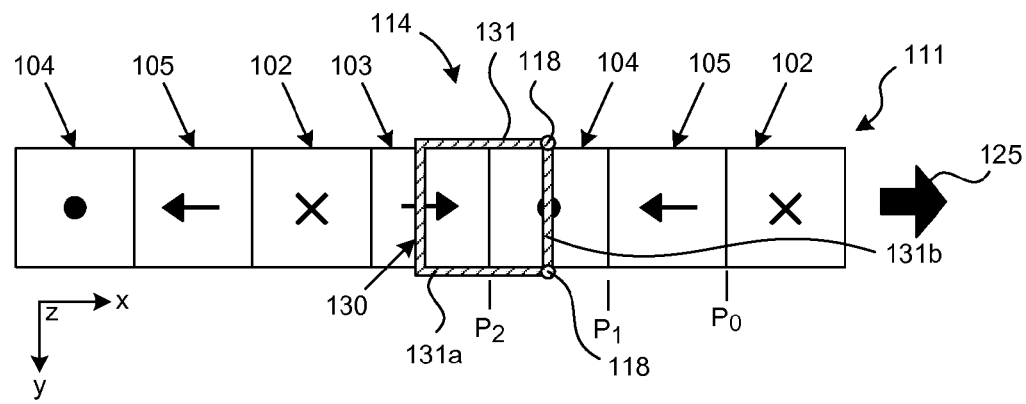

FIGS. 4B and 4C show the corresponding movement in which the second portion 131b of the magnetic element 130 of the SIE 114 is moved between the first position P0 and the second position P1. FIGS. 4B and 4C also show the induced magnetic field 117. FIGS. 4D and 4E, show the corresponding movement in which the second portion 131b of the magnetic element 130 of the SIE 114 is moved between the second position P1 and the third position P2.

Referring again to FIG. 3A, the induced current I1 may lag in some instances, such as due to capacitance stored in the SIE. As such, the switch elements may be set ON or OFF at a different position along the x-axis than the first position P0 or the second position P1, such as slightly before the first and second positions P0 or P1 or slightly after the first and second positions P0 or P1. Also, while shown as remaining generally constant, the magnitude of the current I1 can vary or change as the magnetic array 111 moves from the first position P0 to the second position P1. For example, the magnitude of the current I1 may increase and then decrease as the magnetic array moves from the first position P0 to the second position P1. Also, in some embodiments, fringe magnetic fields from adjacent SIEs or adjacent magnetic elements can influence the magnitude of the induced current I1 and the resultant induced force F1.

As discussed above, the switch elements control the induced current I1. The switch elements 118 can be switched ON (e.g., automatically or via a controller circuit or component) at appropriately favorable times when the current flow in the inductive elements induces magnetic fields that allow for intended levitation forces. The switch elements can be switched OFF (e.g., automatically or via a controller circuit or component) in circumstances when the induced current I1 would have induced magnetic fields that are not favorable for intended levitation.

Referring again to FIG. 3A, the magnetic array again induces the current I1 as the magnetic array moves beyond the third position P2. The induced current I1 will be in an opposite direction relative to the current I1 induced over the movement from the first position P0 to the second position P1. Also the resultant magnetic field will be in an opposite direction (but still provide levitation because the resultant magnetic field repels the oppositely oriented magnetic field of the magnetic array).

Figure 3C:
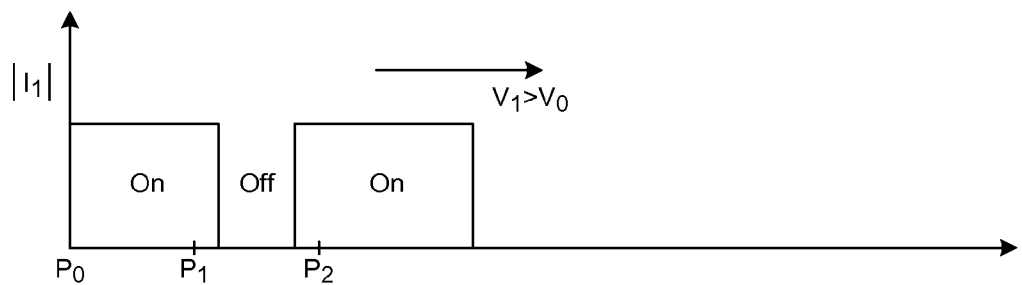
Figure 3D:
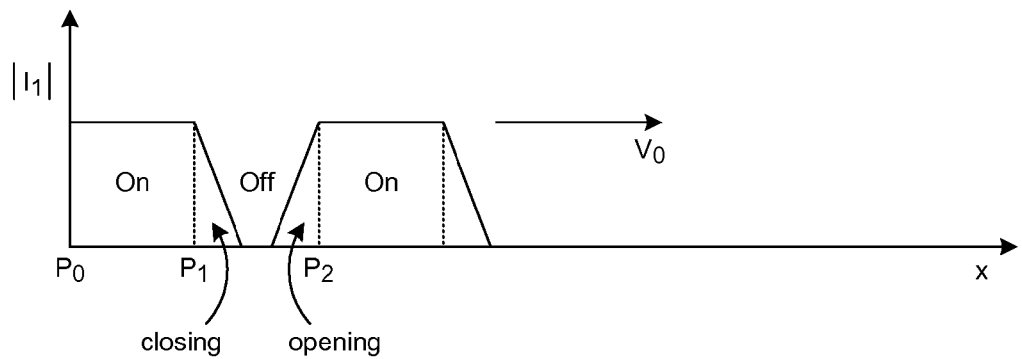

In some embodiments, the switch elements can be set ON or OFF based on the velocity of the translational motion between the magnetic array and the SIE 114 (e.g., automatically or via a controller circuit or component). In particular, operation at high velocities can provide fewer disfavorable induced current in the SIE. FIG. 3C shows that the SIEs can have a longer duty cycle in the ON state at higher velocities ($V_1 > V_0$). FIG. 3D shows another embodiment for which the transition between ON and OFF produces a linear change in the magnitude of the current I1. As shown, the current I1 can ramp down or ramp up when the switch elements of the SIEs transition from ON to OFF or OFF to ON, respectively. In some embodiments, the change in current can also be non-linear.

Example Section A (below) provides further electromagnetic and force analyses of the magnetic array moving over the SIE, including a determination of approximation formulas for the amounts of inductive current in the SIE 114, the induced magnetic flux 128 (FIG. 4A), and induced drag forces and levitation forces. These formulas depend on the physical dimensions, material properties (including the magnet's magnetic flux density, the SIE's electrical resistivity, magnetic permeability of the media within the opening 132 of the SIE), as well as the speed of the magnetic array. The analysis indicates that considerable levitation forces along the z-axis are produced even at low to moderate velocities.

Figure 5A:
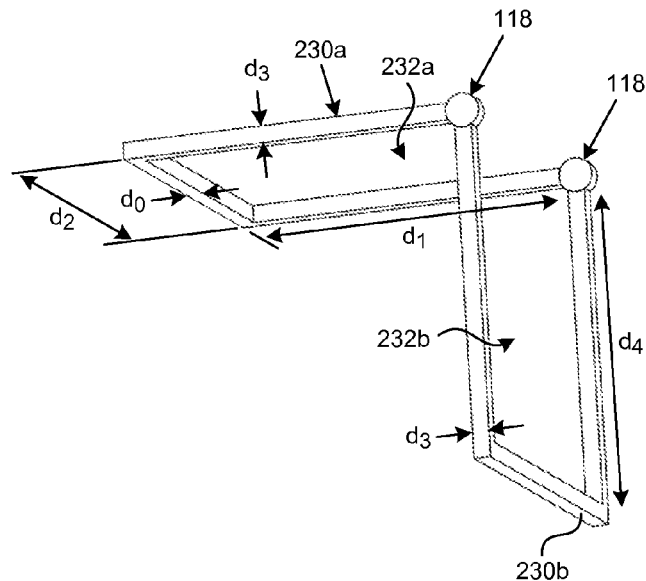
FIGS. 5A-5C are various isometric, top plan, and side views of magnetic and inductive components configured to provide alignment forces in accordance with embodiments of the present technology.
Figure 5B:
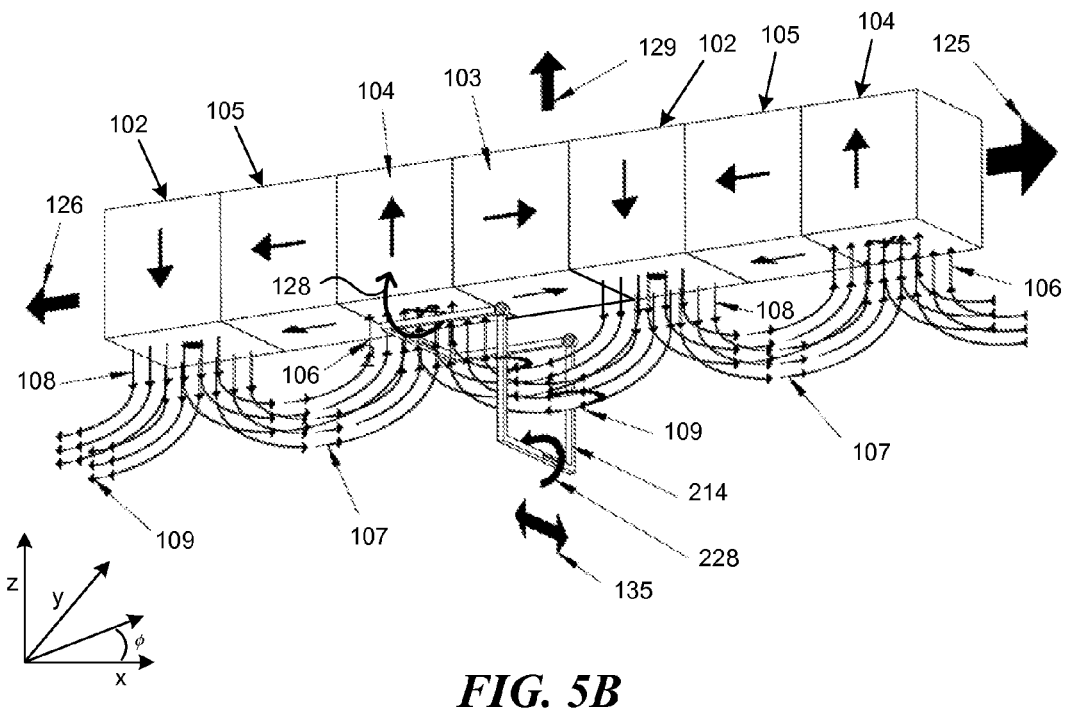
Figure 5C:
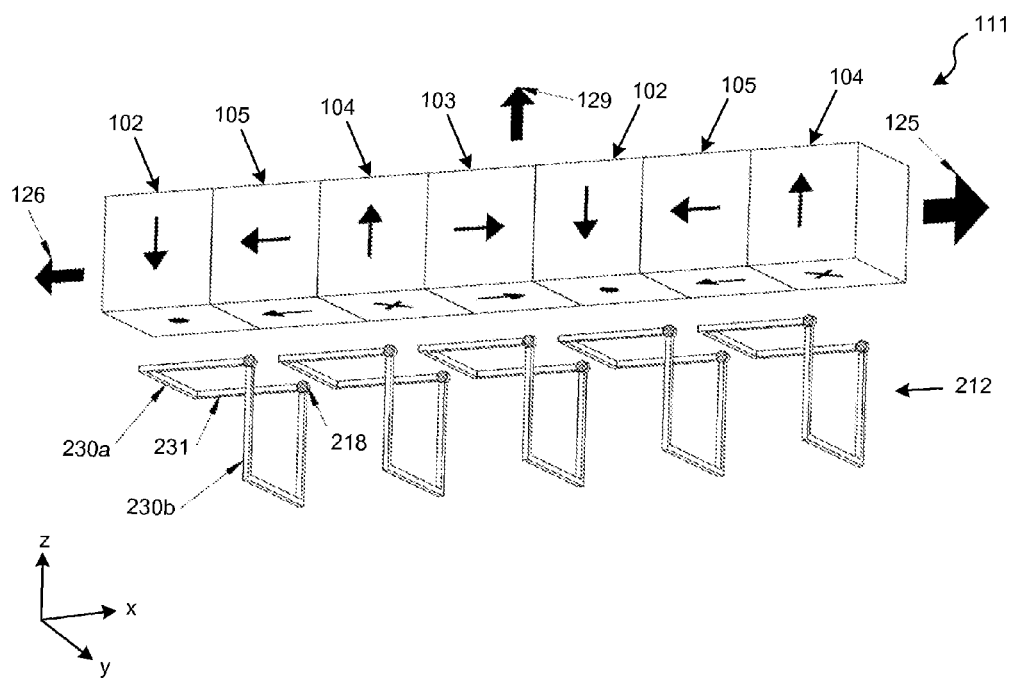

FIGS. 5A-5C illustrate embodiments of an inductive component and an SIE 214 configured to provide translational alignment forces that can be created in addition to levitation forces. In general, operation of the SIE 214 can be summarized as follows: (i) translational movement of the magnetic array results in variations in the magnetic field in the vicinity of the inductive elements of the SIE, (ii) translational kinetic energy of the magnetic component is harvested to generate voltage differentials and current flow within the SIE (iii) dynamic use of switch elements control induced electrical current flow, and (iv) electromagnetic elements create magnetic fields that are positioned to repel the magnetic elements of the magnetic array and induce levitation and alignment forces. A more detailed electromagnetic analysis is given in Example Section B.

As shown in FIG. 5A, the SIE 214 can include a first inductive element 230a and a second inductive element 230b. The first inductive element 230a can provide a levitation force in a manner similar to the inductive element 130 of the SIE 114 described above. The second inductive element 230b can be used to induce an electromagnetic field (and force) that is generally orthogonal to the levitation force (e.g., aligned parallel to the x-axis as shown in FIG. 5A). Also, while not illustrated, other embodiments of the SIE 214 can include additional inductive elements that provide other forces suitable for levitation, alignment, or other purposes. For example, the SIE 214 can include another inductive component coupled to the first inductive element 230a or the second inductive element 230b.

Similar to the SIE 114 described above, the SIE 214 can have a variety of shapes and configurations (including coils or laminate structures) and can include any of a variety of materials, including aluminum, copper, or other suitable materials. As shown, the SIE 214 can be L-shaped and have the first inductive element 230*a* in a plane aligned with the x-y plane and the second inductive element 230*b* in a plane aligned with y-z plane. However, the first and second inductive elements 230*a* and 230*b* can be positioned in different planes, including planes that are non-parallel and not orthogonal. As illustrated, the first and second inductive elements 230*a* and 230*b* have a rectilinear shape; however, in other embodiments, the first and second inductive elements 230*a* and 230*b* can have different shapes. For purposes of clarity and to facilitate discussion of its various properties, the first inductive element 230*a* is referenced with the dimensions $d_0$-$d_2$ described above with reference to the first inductive element 130 of the SIE 114 (and defining a first air gap 232*a* of the SIE 214) and the second inductive element 230*b* is referenced with these dimensions and a dimension $d_4$ in the z-axis (which define a second air gap 232*b* of the SIE 214). A person skilled in the art will appreciate, however, that the SIE 214 can have other dimensions.

As shown in FIG. 5A, the SIE 214 includes switch elements 218 (identified individually as first and second switch elements 218*a* and 218*b*) that are configured for control of electrical current within the SIE 214. Similar to the operation of the switch elements 118 of the SIE 114 described above, the switch elements 218 of the SIE 214 switch ON at appropriately favorable times when the current flow in the first and second inductive elements 230*a* and 230*b* induce magnetic fields that allow for levitation and alignment forces. The switch elements 218 are switched OFF in circumstances when the current flow would induce magnetic fields that are not favorable for intended forces. (e.g., automatically or via a controller circuit or component).

Referring to FIG. 5B, and similar to the discussion above, the translational movement of the magnetic array 111 results in variations in the magnetic field in the vicinity of the SIE 214. The switch elements 218 can operate dynamically to control (e.g., automatically or via a controller circuit or component) the induced current flow. In the illustrated embodiments of FIGS. 5A-5C, the switch elements 218 concurrently control the current flow through the first and second inductive elements 230*a* and 230*b*. That is, when the switches elements 218 are ON the induced current flows through both of the magnetic elements 230*a* and 230*b* and when the switch elements 218 are OFF, there is no induced current flow. In other embodiments, switched elements can operated independently to control levitation and alignment forces (see, e.g., FIGS. 7A-8E).

In operation, the first inductive element 230*a* uses the induced electrical current to create magnetic fields (and induced magnetic flux 128) that provides the levitation force 129. The second inductive element 230*b* uses the induced electrical current to create magnetic fields (and induced magnetic flux 228) that provide alignment forces (shown by an arrow 135). For example, the second inductive element 230*b* can generate an alignment force when at a position where there is considerable external magnetic flux in the right-to-left horizontal direction along the positive x-axis (although the internal flux of a magnetic element may be in the opposite direction, left-to-right, the second inductive element 230*b* is well below that magnet's internal flux). As discussed in Example Section B, the horizontal alignment forces produced can have considerable magnitude even at low velocities. This alignment force induces an alignment torque force which increases as tan(θ), where θ is the angle of deviation of the magnetic array 111 from the x-axis.

As illustrated in FIG. 5C, a linear array 212 of the SIE 214*s* can be used to harvest the translational motion 125 and provide the levitation force 129 and an alignment force 135 while reducing the drag force 126. The linear array 212 can be placed, for example, within a supporting substrate to form a linear track (such as the linear rail 88 of FIGS. 1A and 1B). The switch elements 218 within an individual SIE 214 of the array 112 are set to ON, for example, when the first inductive element 230*a* of the SIE 214 is moved through either of the region below the first and third magnetic elements 102 and 104 (having internal flux directed vertically, either upward or downward) and the switch elements 218 are set to OFF at all other positions of the magnetic array 111. In many aspects, the inductive current induced in the SIE 214*s* of the array 112 can have a waveform similar to the current I1 described with reference to FIGS. 3A-3D. However, in addition to levitation forces, the inductive current can generate alignment forces.

Example Section B (below) provides further electromagnetic and force analysis of the magnetic array moving over the SIE 214, including determination of approximation formulas for the amounts of inductive current in the SIE, induced magnetic flux 128, and induced drag forces, levitation forces, and horizontal alignment forces along the x-axis. Again, these formulas depend on the physical dimensions, material properties (including the magnet's magnetic flux density, the SIE's electrical resistivity, magnetic permeability of the airgaps 232*a* and 232*b* of the SIE 214), as well as the speed of the magnetic array. The analysis indicates that considerable levitation and horizontal alignment forces along the x-axis are produced even at low to moderate velocities.

Figure 6A:
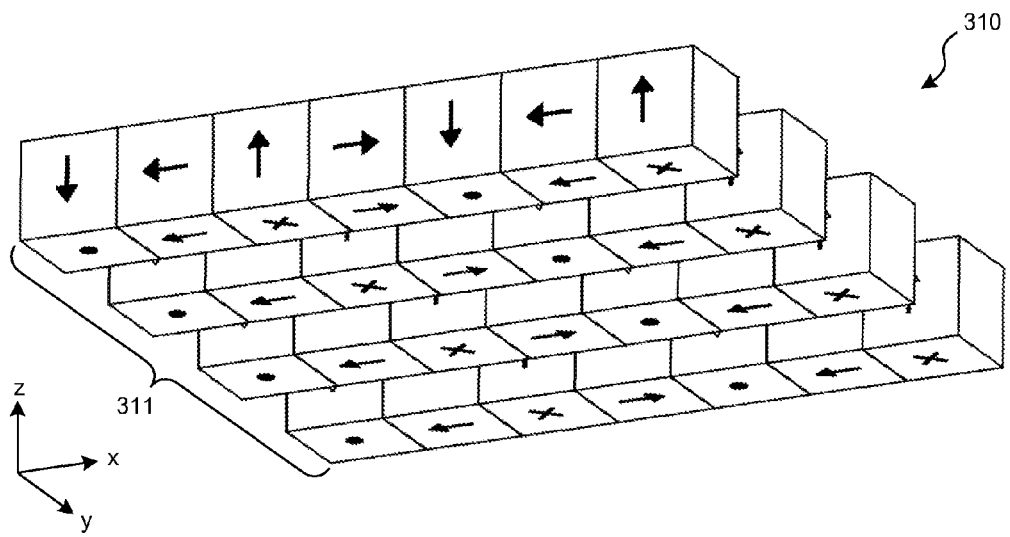
FIGS. 6A-7B are various isometric, top plan, and side views magnetic and inductive components arrayed in two dimensions and configured to provide levitation forces in accordance with embodiments of the present technology.
Figure 6B:
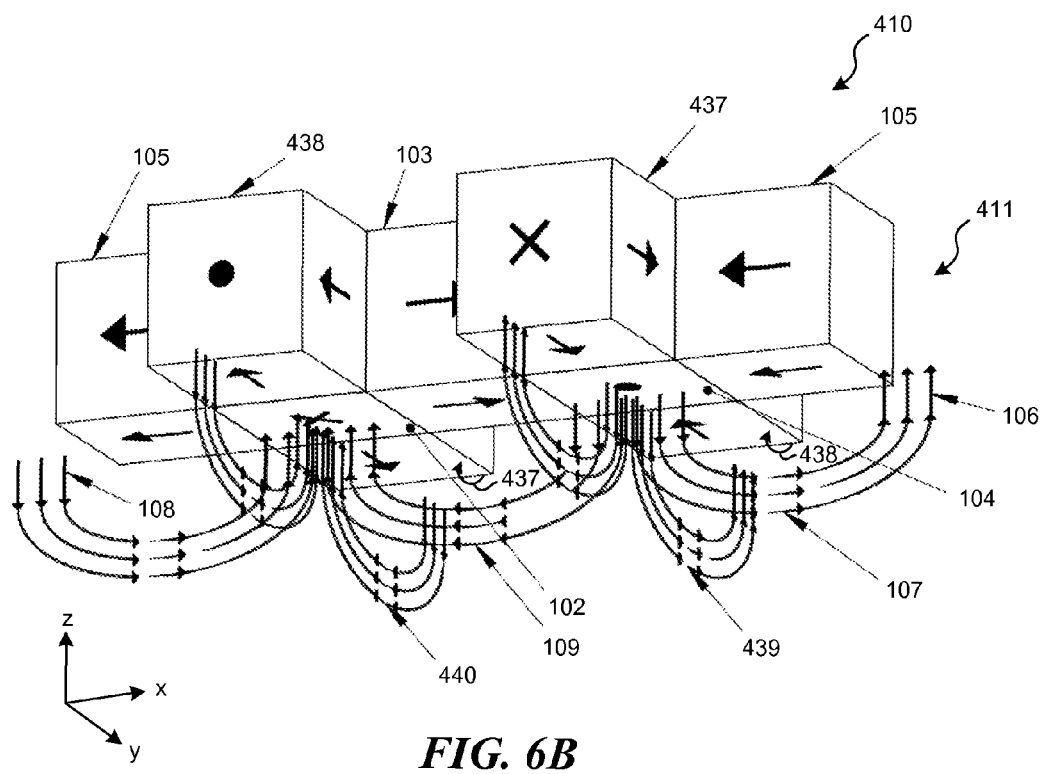

Referring to FIGS. 6A and 6B, in some embodiments, magnetic arrays can include two-dimensional ("2D") arrays of magnet elements arranged on a common plane and having regularly alternating polarities. Such 2D arrays can be configured for providing 2D translational motion with an SIE or array of SIEs. FIG. 6A shows a magnetic component 310 that includes a 2D magnetic array 311 having a sequence of magnetic arrays 111. As illustrated, each magnetic array 111 in FIG. 6A is aligned parallel to the x-axis, and separated along the y-axis to avoid the magnetic fields of neighboring magnetic arrays.

FIG. 6B shows a magnetic component 410 that includes a magnetic array 411 of magnetic elements. Unlike the magnetic elements of the magnetic array 311 of FIG. 6A, the magnetic elements of the magnetic array 411 are not separated along the y-axis. In particular, the magnetic array 411 includes the first through fourth magnetic elements 102-105, oriented in a manner similar to that described above, and fifth and sixth magnetic elements 437 and 438 adjacent the first and second magnetic elements 102 and 104. The fifth magnetic element 437 has fifth internal magnetic flux 439 directed horizontally, in the positive direction of the y-axis. The sixth magnetic element 438 has sixth internal magnetic flux 440 directed horizontally, in the negative direction of the y-axis.

In general, the magnetic elements of the magnetic arrays 311 and 411 can be rectilinearly shaped, and assembled to form rectilinear arrays. As discussed above, however, magnetic arrays and magnetic elements within the arrays can have any of a variety of shapes, arrangements, or configurations. In various embodiments, 2D magnetic arrays can provides a 2D arrangement of magnetic flux. Although shown as having a specific orientation in the Figures, a person skilled in the art will appreciate that magnetic patterns can depend on the particular configuration of magnetic elements of a 2D magnetic array. For example, either of the magnetic arrays 311 and 411 can include additional or alternative magnetic elements with flux directed at other angles, for example at 45 degrees to the x-, y-, and/or z-axis.

Figure 7A:
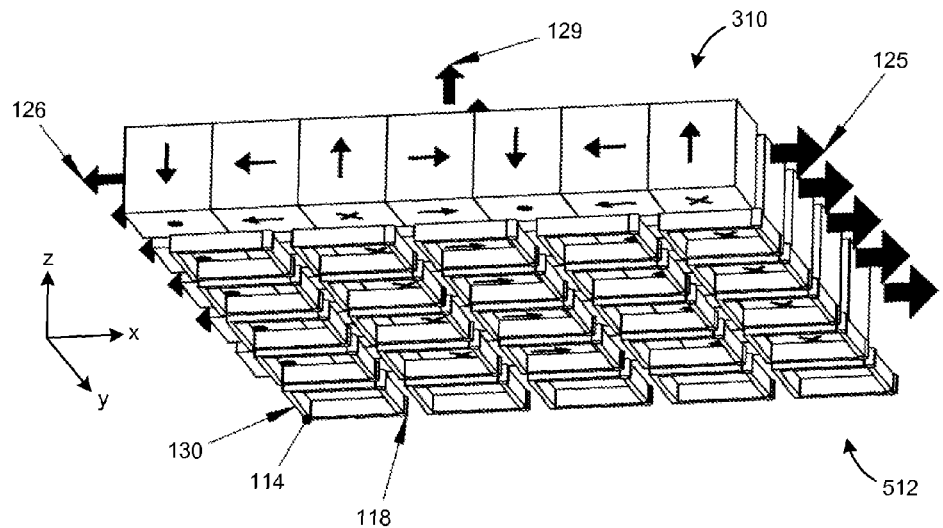
Figure 7B:
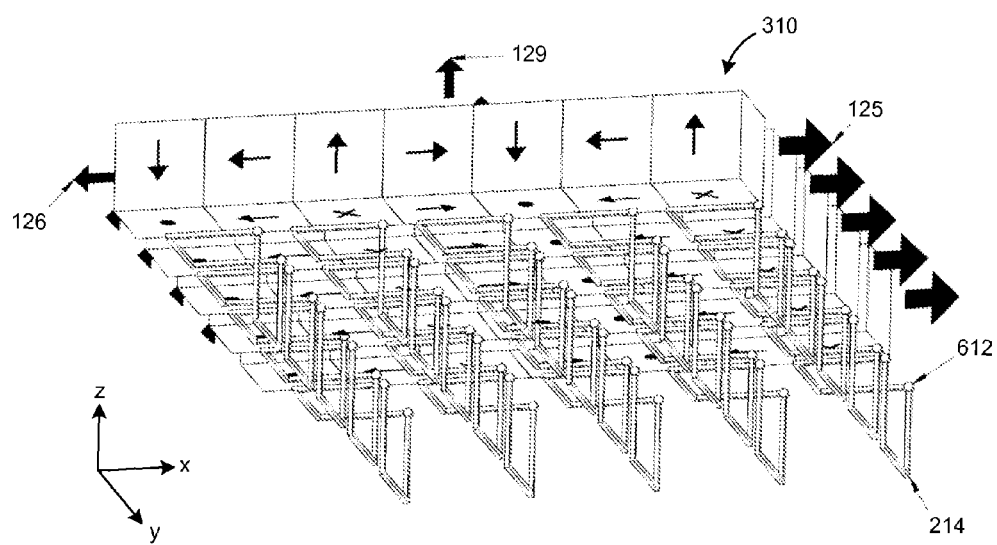

Referring to FIGS. 7A and 7B, in some embodiments, SIEs can be formed in 2D arrays. In particular, such 2D arrays can provide levitation forces that allow for translational motion in multiple (steerable) directions. Such 2D arrays can be placed, for example, within a supporting substrate to form a 2D surface on which an object can be steered. For example, the 2D surface can include an skating rink, a warehouse floor, or other suitable surface. The steering can be controlled, for example, by application of a 2D translational force.

FIG. 7A, for example, shows a 2D array 512 of SIEs 114 in combination with the magnetic component 310 of FIG. 6A. Similar to the operation of the array 112 of SIEs 114 described above, the SIE 114s can be used to harvest the energy of the translational motion 125 and provide the levitation force 129 while reducing the drag force 126. However, unlike the array 112, the 2D array 512 allows the motion 125 to occur over a 2D plane (e.g., the x-y plane as shown in FIG. 7A).

FIG. 7B, as another example, shows a 2D array 612 of SIEs 214 in combination with the magnetic component 310 of FIG. 6A. Similar to the operation of the array 212 of SIEs 214 described above, the SIE 214s can be used to harvest energy from the translational motion 125 and provide the levitation force 129 and the alignment force 135 while reducing the drag force 126. However, unlike the array 212, the 2D array 612 allows the motion 125 and the alignment force 135 to occur over a 2D plane (e.g., the x-y plane as shown in FIG. 7A).

Figure 8A:
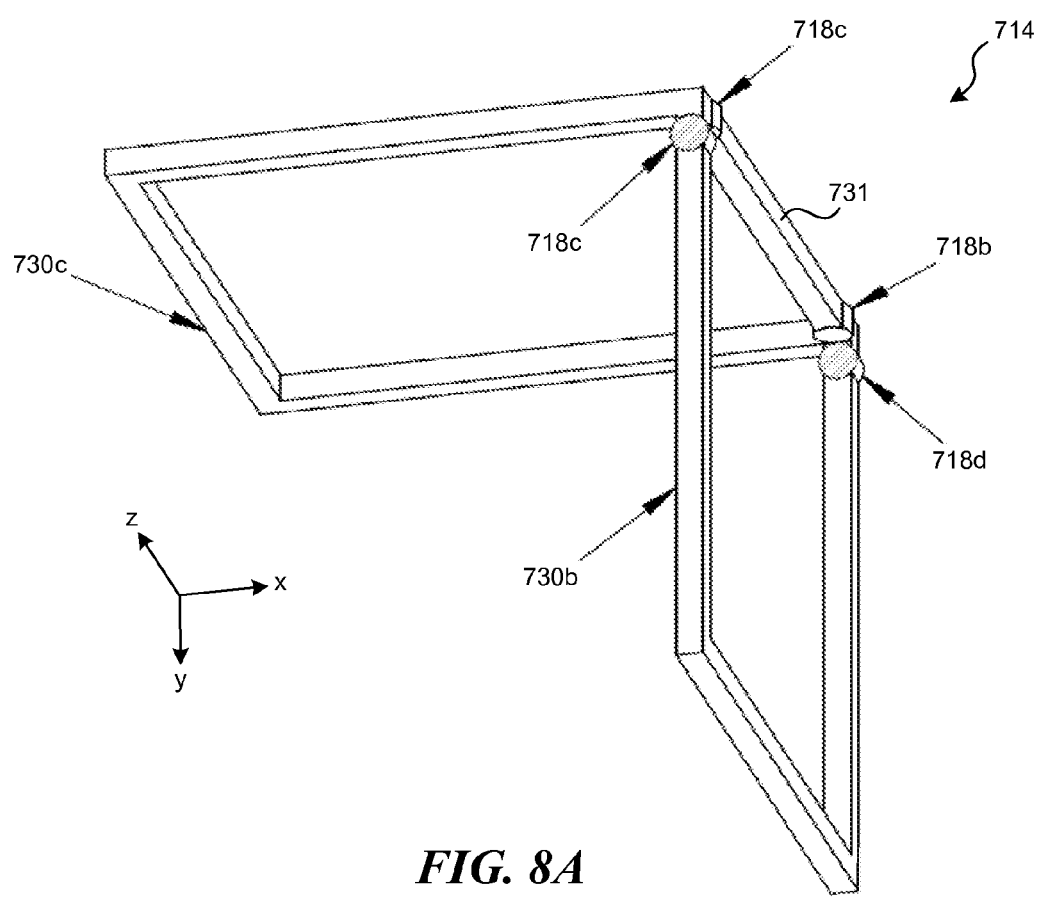
FIGS. 8A-8E are various isometric views of inductive components having switching elements that operate independently in accordance with embodiments of the present technology.
Figure 8B:
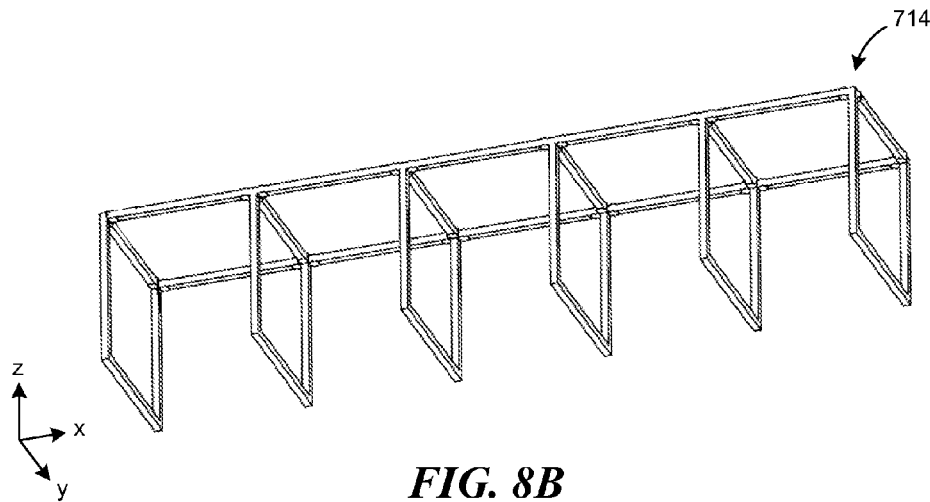
Figure 8C:
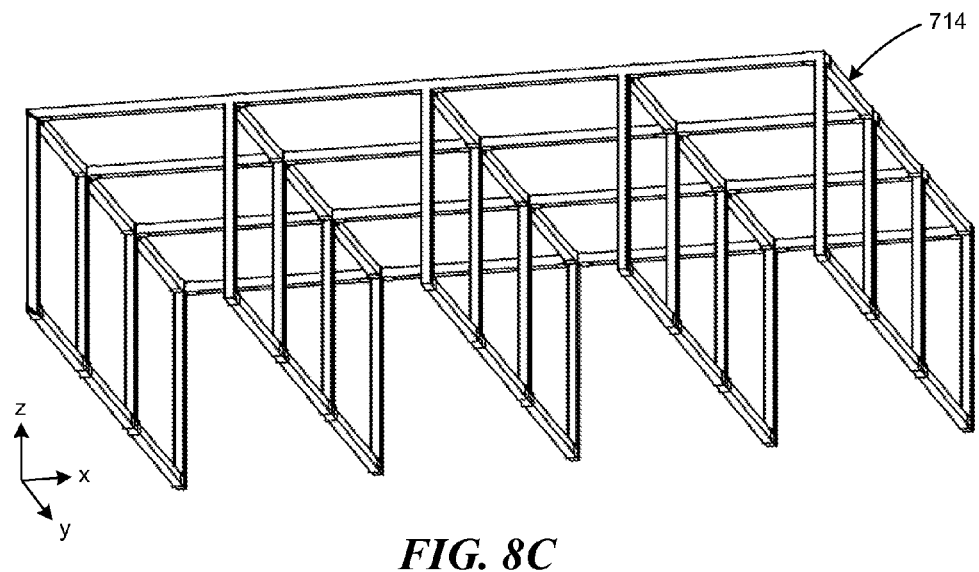

Referring to FIGS. 8A-8D, in some embodiments, SIEs can have switch elements that operate independently from one another (e.g., automatically or via a controller circuit or component). FIG. 8A shows an SIE 714 that includes switch elements 718 (identified individually as first through fourth switch elements 718a-d). To produce no forces, all of the first through fourth switch elements 718a-d can be set OFF. To provide levitation and alignment forces the first through fourth switch elements 718a-d can be set ON such that the induced current flows through both of first and second inductive elements 730a and 730b. For example, all the switch elements 718 can be set ON. Alternatively, one of the first switch element 718a or the second switch element 718b can be set OFF (with the other switch elements 718 set ON). This alternative configuration can induce current through a portion 731 of the first inductive element 730a. To produce only levitation forces, the first and second switch elements 718a and 718b can be set ON with the third and fourth switch elements 718c and 718d set OFF. To produce only alignment forces, the first and second switch elements 718a and 718b can be set OFF and the third and fourth switch elements 718c and 718d can be set ON. As shown, in FIGS. 8B and 8C, the SIEs 714 can be form in a linear array or a 2D-array.

In many aspects, the inductive current induced in the SIE 714s can have a waveform similar to the current I1 described with reference to FIGS. 3A-3D. However, in other embodiments, the waveform can differ depending on the resistance and other properties of the current path within the SIE. For example, the induced current can have a different magnitude when the SIE 714 is producing both levitation and alignment forces compared to when the SIE 714 is only producing a levitation force or an alignment force.

Figure 8D:
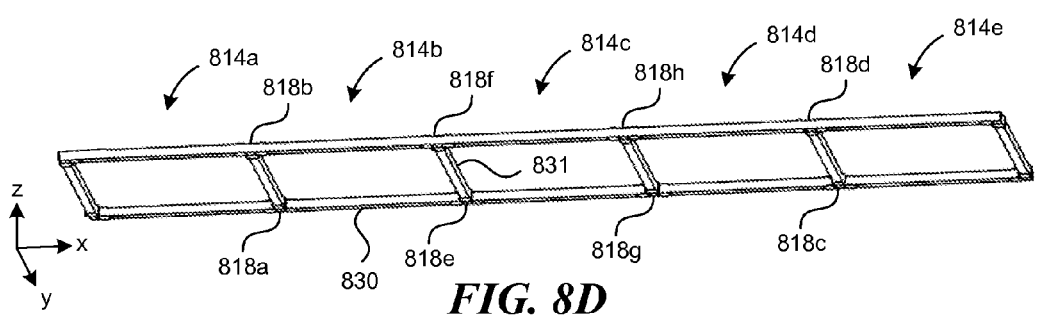
Figure 8E:
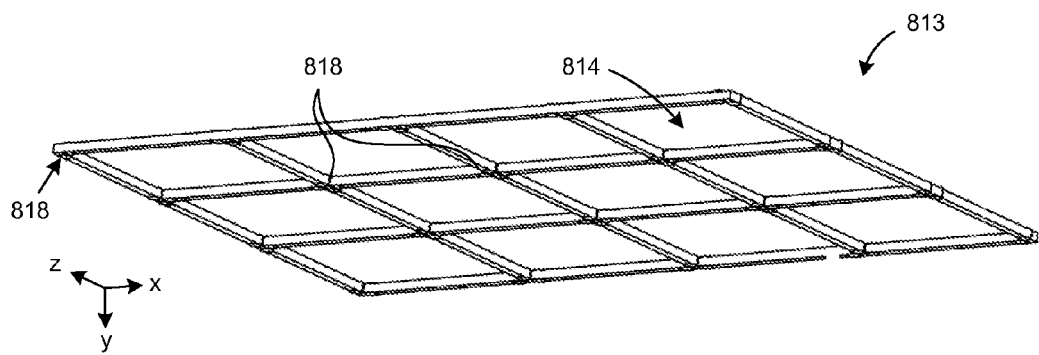

FIG. 8D shows SIEs 814 (identified individually as first through fifth SIEs 814a-814e) that are integrated into a common frame 812 in which adjacent SIEs 814 share a common portion 831 of an inductive element 830. Switch elements 818 (identified individually as first through eighth switch elements 818a-h) can control which of the SIEs 814 induce a current. For example, when the first through fourth switch elements 818a-818d are set OFF and the fifth through eighth switch elements 818e through 818h are set ON, the third SIE 814c will induce a current, while the second and fourth SIEs 814b and 814d will not. FIG. 8E shows the SIEs 814 integrated into common 2D frame 813 and interconnected with switch elements 818. The SIEs 814 in the 2D frame can operate in a similar manner as the SIEs in the frame 812 of FIG. 8B, but the switch elements can control current at multiple locations across the frame 813 in multiple dimensions.

Figure 9A:
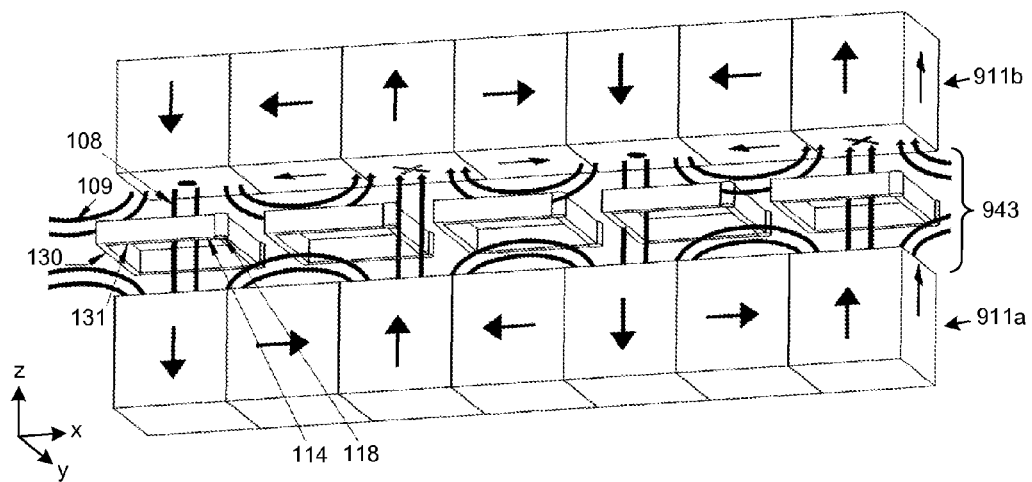
FIGS. 9A-10 are various isometric, top plan, and side views of magnetic and inductive components in accordance with other embodiments of the present technology.
Figure 9B:
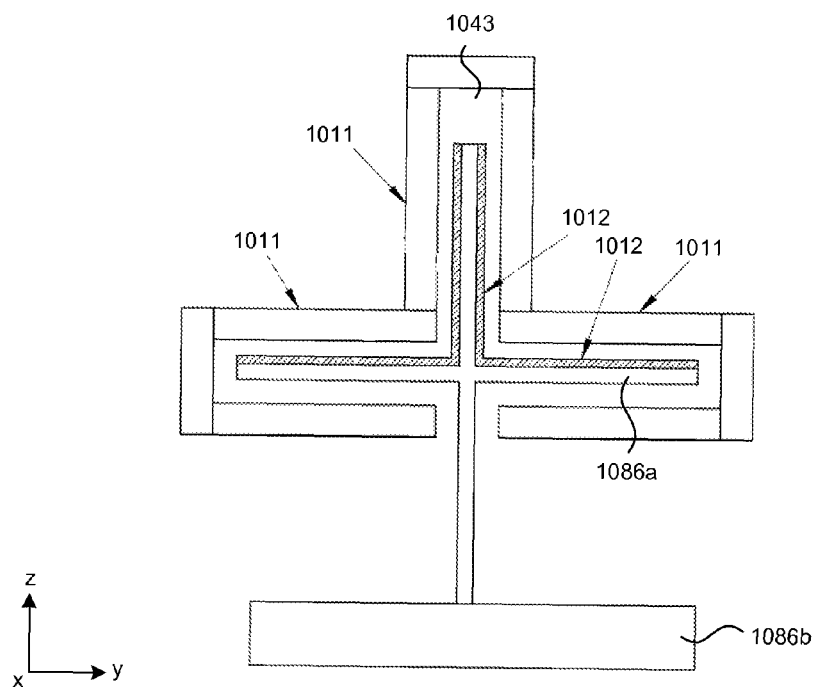

Referring to FIGS. 9A and 9B, in some embodiments magnetic arrays can be positioned above and below one another in a manner that increases vertical flux between the corresponding pairs of magnets of the two arrays. For example, as shown in FIG. 9A first and second magnetic arrays 911a and 911b are positioned such that inductive elements 114 can move through a channel 943 defined by the magnetic arrays 911a and 911b. FIG. 9B shows a cross-sectional side view of a channel 1043 that can be formed between individual magnetic arrays 1011 with arrays 1012 of SIEs carried by support components 1086a and 1086b. In one embodiment, the support components 1086a and 1086b can be a component of the support structure 84 of FIGS. 1A and 1B. For example, the support component 1086b can be a portion of the rail 88. In general, the configuration of magnetic arrays 1011, arrays 1012 of SIEs, and the support components 1086a and 1086b can provide alignment forces in multiple directions, such as the y- and z-axes shown in FIG. 9B.

Figure 10:
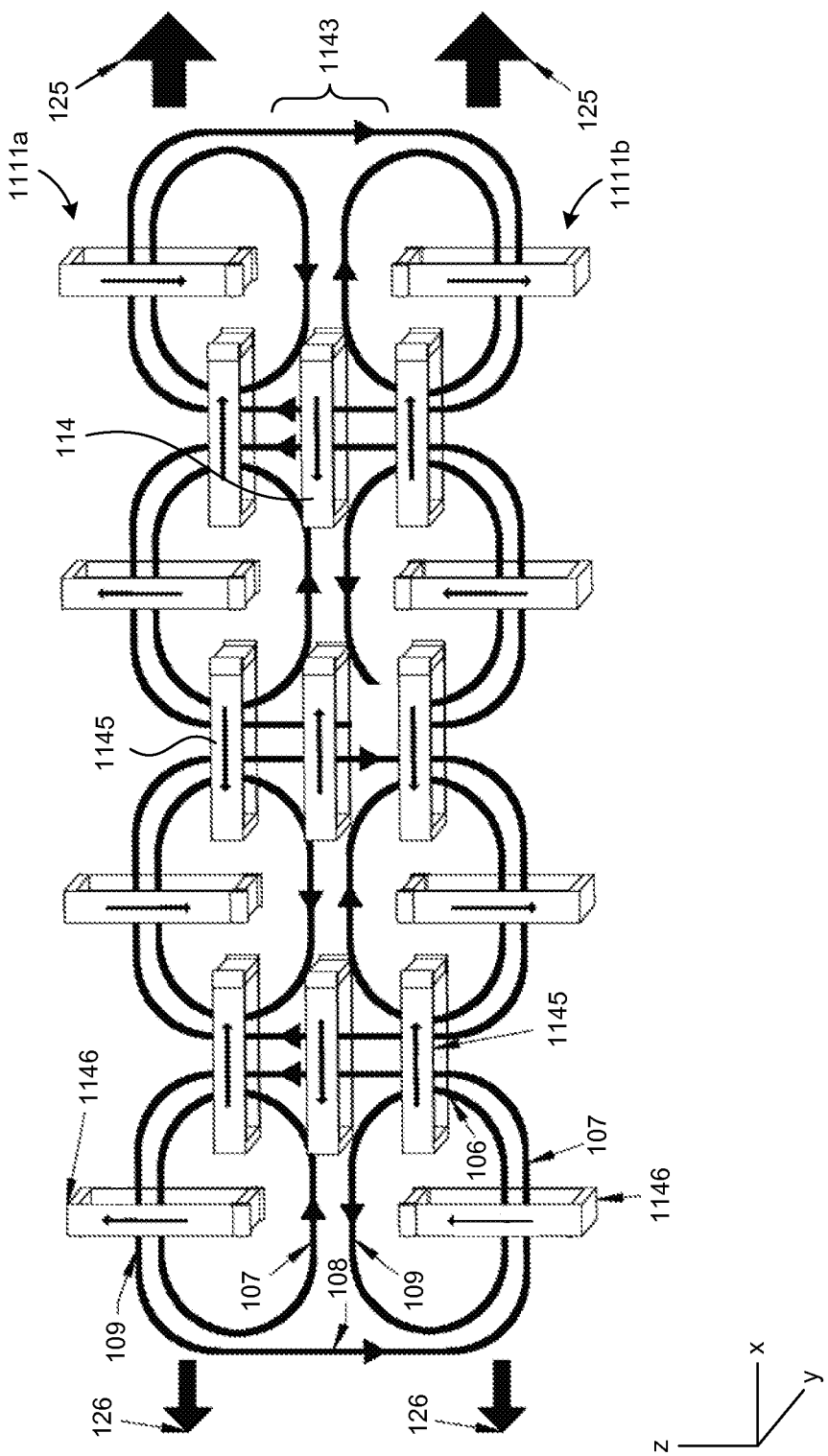

Referring to FIG. 10, in some embodiments a magnetic component includes electromagnetic elements. FIG. 10 shows a magnetic component that includes electromagnetic (EM) arrays 1111 (identified individually as first and second EM arrays 1111a and 1111b). In the illustrated embodiments, the EM arrays 1111 are Electro-Magnetic Halbach array (EM-HA) that include horizontally aligned first inductive elements 1145 and vertically aligned second inductive elements 1146. However, in other embodiments, the EM arrays 1111 can be configured differently. For example, an EM array can include permanent magnetic elements and/or superconducting elements in combination with the inductive elements. The first and second inductive elements 1145 and 1146 can include coils, laminate layers, or other suitable structures that include any of a variety of materials, including aluminum, copper, or other suitable materials. The first and second inductive elements 1145 and 1146 can also contains ferromagnetic material.

In some embodiments, the first and second inductive elements 1145 and 1146 may be powered by external electrical power, or may be powered by external induction, or may be powered by inductive effects from relative movement of the EM arrays 1111 with respect to individual SIEs (shown, for example, as SIEs 114 in FIG. 10). In some embodiments, the EM arrays 1111 are powered by induction from relative movement of the EM array 1111s with respect to the SIEs 114 in a channel 1143 between the EM arrays 1111. In certain embodiments, a current or inductive load may needs to be initially present within the individual EM Arrays 1111.

As shown in FIG. 10, the magnetic flux of the EM arrays 1111 can be similar to the magnetic flux of the magnetic array 111 described above. In particular, the majority of the magnetic flux can be directed in a direction that is aligned with the z-axis as shown in FIG. 10.

In operation, a current within the EM Array 1111 is initially present and induces a magnetic flux within the first inductive element 1145. (the current within the EM Array 1111 will diminish due to resistive loss, unless it is supplemented by some source of power, which can power harvested from the from relative movement of the EM Array 1111 with respect to the SIEs 114. The magnetic flux of the second inductive element 1146 then induces a current within the SIEs 114, from relative movement of the EM Array 1111 with respect to the SIEs 114 (as discussed above). This current within the SIEs induces a magnetic flux from the SIEs. The induced magnetic flux of the SIEs in turn induces, from relative movement of the EM Arrays 1111 with respect to SIEs, an inductive current within the first inductive element 1145 of the individual EM Arrays 1111. Hence, ultimately the current and induced flux within both the SIEs and the individual EM Arrays 1111 are induced from the relative movement of the EM Arrays 1111 with respect to SIEs.

Figure 11:
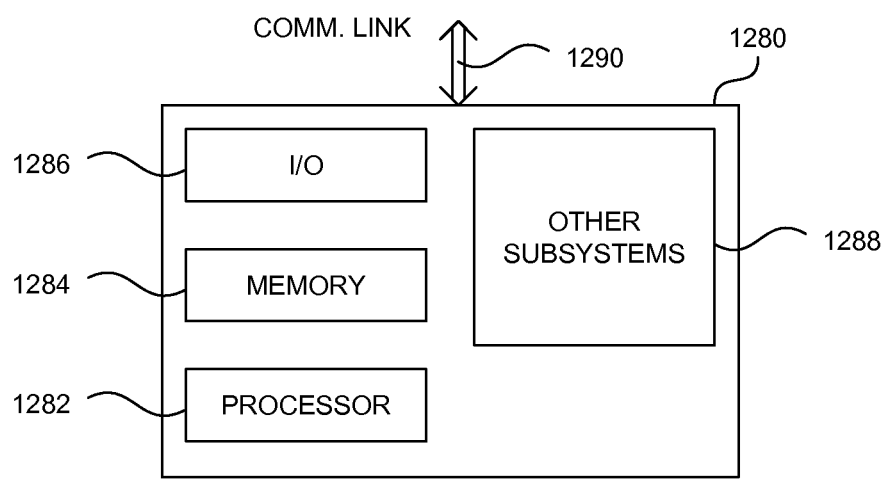
FIG. 11 is a block diagram of a controller in accordance with embodiments of the present technology.

As discussed above, an inductive device can include a controller communicatively coupled to an inductive component, including an individual SIE and the switches of an SIE. FIG. 11 is a block diagram of controller 1280 that can be employed in accordance with the present technology. The controller 1280 can include a processor 1282, a memory 1284, input/output devices 1186, and/or other subsystems or components 1188. The controller 1180 can be connected, for example, to one or more inductive components through a communication link 1290, e.g., a flexible wired communication link. In another embodiment, the communication link 1280 can include a wireless link. In either embodiment, the controller 1280 can control or regulate the current in the inductive components by controlling individual switch elements. For example, the controller 1280 can be configured to detect translational motion through an input signal optical detector (not shown) and control the switch elements based on the speed or velocity of the translational motion.

The controller 1280 can be a computer-based controller that includes hardware and software for executing computer-based instructions. Accordingly, certain embodiments may take the form of computer-executable instructions, including routines executed by a processor or programmable computer. Accordingly, representative examples of the controller 1280 can be housed in a single unit or distributed over multiple interconnected units, e.g., through a communication network. The components of the controller 1280 can accordingly include local and/or remote memory storage devices and any of a wide variety of suitable computer-readable media. In some embodiments, the controller 1280 can include computers and/or other data processors, such as desktop computers, laptop computers, Internet appliances, or hand-held devices.

From the foregoing, it will be appreciated that specific embodiments of the technology have been described herein for purposes of illustration, but that various modifications may be made without deviating from the technology. For example, although particular embodiments were described above with respect to particular planes in an x-, y-, z-axis and/or as having a vertical or horizontal orientations, in other embodiments, similar components can have other orientations. In some embodiments the switch elements operate autonomously so as to open and close in direct response to the relative movement between a magnetic element and an inductive component. In other embodiments, a controller directs the operation of the switch elements based on the foregoing motion. In addition, certain aspects of the technology described in the context of particular embodiments may be combined or eliminated in other embodiments. SIEs and magnetic arrays described in the context of particular embodiments may be combined with other SIEs and magnetic arrays devices in other embodiments. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

Example A

Analysis of the Levitation-Inducing L-SIE

This Appendix provides an electromagnetic and force analysis of a representative magnetic array moving over a representative levitation-inducing SIE ("L-SIE"), including determination of approximation formulas for the amounts of inductive current in the L-SIE, induced magnetic flux, and induced drag forces and levitation forces. These formulas depend on the L-SIE's and HA's physical dimensions, their material properties (including the magnet's magnetic flux density, the L-SIE's electrical resistivity, magnetic permeability of the media within the air-gap of the L-SIE), as well as the speed of the HA. The analysis indicates that considerable levitation forces along the z-axis are produced even at low to moderate velocities.

Throughout the analysis, certain assumptions and approximations are made. Such assumptions and approximations may be appropriate for some but not all of the embodiments of the technology disclosed herein. Accordingly, at least some embodiments of the disclosed technology may not fit within or be fully characterized by the following analysis.

The HA is aligned parallel to the x-axis and is composed of a series of magnets with internal magnetic orientation alternatively vertical and horizontal, as indicated in the various figures. The magnetic flux density is the amount of magnetic flux through a unit area taken perpendicular to the direction of the magnetic flux, gauged in units of Tesla.

For purposes of analysis assume the magnets of the HA with vertically aligned internal magnetic flux have near their lower surfaces external magnetic flux density B directed vertically along the z-axis, but have external magnetic flux density close to 0 elsewhere. For purposes of analysis assume the magnets of the HA with horizontally aligned internal magnetic flux have near their surfaces external magnetic flux density 0, but somewhat below their lower surfaces there is external magnetic flux density B directed horizontally along the x-axis.

For purposes of analysis will to the size dimensions of the magnetic elements of the magnetic array of FIG. 2B:
  $m_1$ is the length in the x-axis direction of a magnet in HA with magnetic flux directed vertically upward or downward, parallel with the z-axis.
  $m'_1$ is the length in the x-axis direction of a magnet in HA with magnetic flux directed sidewise, parallel with the x-axis.
  $m_2$ is the length in the y-axis direction of a magnet in HA.
  $m_3$ is the length in the z-axis direction of a magnet in HA.
Hence the magnets with flux directed vertically upward or downward have size $m_1 \times m_2 \times m_3$ and the magnets with flux directed sidewise have size $m'_1 \times m_2 \times m_3$.

The levitation-inducing L-SIE will be assumed to be composed of conductive nonmagnetic material (e.g., copper, aluminum or similar material) with electrical resistivity ρ in SI units of ohm meter (Ωm). For purposes of analysis refer to the dimensions of the L-SIE shown in FIG. 2C:
  $d_0$ is the L-SIE's side-wall thickness.
  $d_1$ is the L-SIE's external dimension in the x-axis direction.
  $d_2$ is the L-SIE's external dimension in the y-axis direction.
  $d_3$ is the L-SIE's height in the z-axis direction.

The air-gap of the of the L-SIE's coil is the rectilinear region of size $d'_1 \times d'_2 \times d_3$ enclosed by the L-SIE, where $d'_1 = d_1 - 2d_0$ is the L-SIE's internal dimension in the x-axis direction.

$d'_2 = d_2 - 2d_0$ is the L-SIE's internal dimension in the x-axis direction.

Let $\mu$ be the magnetic permeability (in SI units of $N/A^2$) of the media within the air-gap of the L-SIE (which typically will be air).

The inductive element of the L-SIE is the rectangular section of size $d_0 \times d'_2 \times d_3$ that borders left side of the air-gap of the L-SIE and is parallel to the y-axis. The two electrogeneration parts of the L-SIE are the rectangular sections of size $d_0 \times d'_1 \times d_3$ that border the air-gap of the L-SIE and are parallel to the x-axis.

For purposes of analysis assume that $d'_1 = m_1$, $d_1 = m_1 + 2d_0$, $d'_2 = m_2$, $d_2 = m_2 + 2d_0$, and $d_3 = m_3$, so the air-gap of the L-SIE has the same dimensions ($m_1 \times m_2$) in the y-axis and z-axis direction as the magnets of the HA. Note that as a consequence, the overall dimensions of the air-gap is ($m_1 \times m_2 \times d_3$).

To simplify the discussion below, define $\alpha_0 = 2/((d_1 - 2d_0)/d_2 + 1)$.

Also, define the following factors:

$\alpha_1 = (d'_1/d_1)$, which is near 1 when $d_0 \ll d_1$.

$\alpha_2 = (d'_2/d_2)$, which is near 1 when $d_0 \ll d_2$.

In typical cases, there is relatively small side-wall thickness $d_0 \ll \min(d_1, d_2)$ so in those typical cases, $\alpha_1$ and $\alpha_1$ are near 1.

The L-SIE switches are set ON only when the electrogeneration part of the SIE 214 is under a magnet of the HA with internal flux directed vertically, either downward or upward. Assume the resistance across the switches is near 0, the electrical resistance and magnetic inductance of the L-SIE when the L-SIE switches are ON allowing induced current flow within L-SIE are estimated below.

To estimate the resistance of L-SIE one can view the L-SIE as a single coil with wire cross-section area approximately $d_0 d_3$. To estimate the length to this coil, one can use the perimeter of an $(d_1 - d_0) \times (d_2 - d_0)$ rectangle, which has length $2(d_1 - d_0) + 2(d_2 - d_0) = 4\alpha_0 d_2$ where $\alpha_0 = ((d_1 - 2d_0)/d_2 + 1)/2$. Let $\rho$ be the L-SIE's electrical resistivity. The electrical resistance R of the L-SIE is estimated as the product of electrical resistivity $\rho$ times the length $4\alpha_0 d_2$ divided by the cross-section area $d_0 d_3$. Hence $R = 4\alpha_0 \rho d_2/(d_0 d_3)$.

To estimate the magnetic inductance of L-SIE, the L-SIE can be viewed as a single coil solenoid. Let $\mu$ be the magnetic permeability of the media within the air-gap of the L-SIE (which typically will be air or a supporting material such as concrete). The air-gap of the L-SIE when cross-sectioned by a plane perpendicular to the z-axis has area $A = d'_1 d'_2$. The magnetic inductance L of the L-SIE when viewed as a single coil solenoid is approximately the product of $\mu$ times its interior area $A = d'_1 d'_2 = \alpha_1 \alpha_2 d_1 d_2$ divided by its height $d_3$. Hence $L = \mu A/d_3 = \alpha_1 \alpha_2 \mu d_1 d_2/d_3$.

Let v denote the velocity magnitude of a translational movement of the HA in the positive direction of the x-axis from left to right over the immobile L-SIE. First analyzed is the levitation force at a position where L-SIE is below an individual magnetic element with internal flux directed downward, in the negative direction of the z-axis, and the L-SIE switches are ON allowing induced current flow.

Observe that the magnetic flux of the HA crosses the L-SIE coil at velocity v, across the electrogeneration part of the L-SIE of distance $d'_2$ in the y-axis direction. Recall the electrogeneration part of the L-SIE is the rectilinear section of size $d_0 \times d'_2 \times d_3$ that borders left side of the air-gap L-SIE and is parallel to the y-axis. When the L-SIE switches are ON, a resulting induced current $I_{ON}$ runs across the electrogeneration part of the L-SIE in the negative direction of the y-axis. This induced electric current magnitude is approximately $I_{ON} = vBd'_2/R$. By substituting the previously determined estimate for $R = 4\alpha_0 \rho d_2/(d_0 d_3)$, it can be shown that $I_{ON} = vBd'_2/R = vBd'_2/(4\alpha_0 \rho d_2/(d_0 d_3))$ which simplifies to $I_{ON} = vBd_0 d_3 \alpha_2/(4\rho\alpha_0)$. Hence it can be concluded that the induced current $I_{ON}$ has magnitude growing linear both in the velocity v and magnetic flux density B. (Note that due to inductive resistance of the L-SIE coil, the current running entirely around the coil would initially be less than this.).

The generation of the induced electric current $I_{ON}$ across the electrogeneration part of the L-SIE when the L-SIE's switches are ON induces a reverse drag force $F_{drag}$ per L-SIE in the opposite direction of the HA, that is in the right to left direction that is a negative direction in the x-axis. (Note that the drag force is near 0 when the L-SIE's switches are OFF.) This drag force is $F_{drag} = -I_{ON} d'_2 B$, which when substituted with $I_{ON} = vBd'_2/R$, gives $F_{drag} = -I_{ON} d'_2 B = -(vBd_0 d_3 \alpha_2/(4\rho\alpha_0))d'_2 B$, which simplifies to $F_{drag} = -v(Bd_2\alpha_2)^2 d_0 d_3/(4\rho\alpha_0)$. Hence the magnitude of the drag force grows linearly with the velocity v. Since the drag force is near 0 when the switches are OFF, which occurs half the time, the average drag force is $F_{avg-drag} = F_{drag}/2 = -v(Bd_2\alpha_2)^2 d_0 d_3/(8\rho\alpha_0)$. Since the interior area of each L-SIE is $A = d'_1 d'_2 = \alpha_1 \alpha_2 d_1 d_2$, the average drag force on all L-SIEs per square meter of area is $F_{avg-drag}/A = -v(Bd_2\alpha_2)^2 d_0 d_3/(8\rho\alpha_0(\alpha_1\alpha_2 d_1 d_2))$, which simplifies to $F_{avg-drag}/A = -vB^2 \alpha_2 d_0 d_2 d_3/(8\rho\alpha_0 \alpha_1 d_1)$.

Recall the electromagnetic parts are the rectilinear sections of size $d_0 \times d'_1 \times d_3$ that border the air-gap of the L-SIE and are parallel to the x-axis. The induced magnetic flux density per L-SIE generated by the current $I_{ON}$ in each electromagnetic part of the L-SIE is the product of $\mu I_{ON}$ times a factor that drops off by a factor of $1/(1 + y\pi/d_3)$, where y is the distance from the electromagnetic part. Hence the induced magnetic field has flux density approximately $B'_y = \mu I_{ON}/(1 + y\pi/d_3)$. The induced magnetic flux extends from y=0 to y=$d'_2$. The integral of $1/(1 + y\pi/d_3)$ from y=0 to y=$d'_2$ is the same as the integral of $1/y'$ from y'=1 to y'=$1 + \pi d'_2/d_3$, which is $\beta = \ln(1 + \pi d'_2/d_3) = \ln(1 + \pi\alpha_2 d_2/d_3)$. Hence the integral of $B'_y$ from y=0 to y=$d'_2$ is $\mu I_{ON}\beta$.

That induced magnetic field $B'_y$ has flux directed upward, in the positive direction of the z-axis. This is in the opposite direction of the magnetic flux of the HA magnet directly above the L-SIE, whose flux is directed downward, in the negative direction of the z-axis. Hence these two opposing magnetic fields generate a levitation force.

Let x be the distance the magnet M in the HA has moved in the x-axis direction over the L-SIE. Note that when x=0, the left-most part of the magnet M is just overhead the electrogeneration part (the left-most part) of the L-SIE, and the L-SIE's switches are just turned ON. Also note that when x=$d_1$, the left-most part of the magnet M is just overhead the electrogeneration part of the L-SIE, and the L-SIE's switches are turned just turned OFF. Further that when x=$2d_1$, the right-most part of the magnet M is just overhead the electrogeneration part of the L-SIE.

The levitation forces induced by the L-SIE's two elements (the electrogeneration part and the section to its right) parallel to the y-axis, averaged over x, can be seen to cancel each other. Hence the analysis can include the levitation forces induced by the L-SIE's two electromagnetic parts.

For each x between 0 and $d_1$, note that the L-SIE extends under the magnet M distance x. Hence the levitation force $F_x$ per L-SIE electromagnetic part varies with x, and is given by $xB/(2\mu)$ times the integral of $B'_y$ from 0 to $d_2$. Hence the levitation force $F_x$ for both of its two L-SIE electromagnetic parts is $F_x=2(xB/(2\mu))(\mu I_{ON}\beta)$, which simplifies to $F_x=xB\beta I_{ON}$.

At $x=d_1$ one gets the maximum levitation force $F_{max}=d_1B\beta I_{ON}$. Substituting into this the current magnitude $I_{ON}=vBd_0d_3\alpha_2/(4\rho\alpha_0)$, one gets $F_{max}=d_1B\beta(vBd_0d_3\alpha_2/(4\rho\alpha_0))$, which can be written as $F_{max}=vB^2d_0d_1d_3\alpha_2\beta/(4\rho\alpha d_0)$.

The average levitation force of $F_x$ per L-SIE over the range of x from 0 to $d_1$ is $F'_{avg}=F_{max}/2=vB^2d_0d_1d_3\alpha_2\beta/(8\rho\alpha_0)$.

Let the time $t=0$ at the time the L-SIE switches are turned ON. Since the HA moves in the positive x-axis direction at velocity v, and x is the length in the x-axis of the overlap between the L-SIE and the magnet M, it follows that at time t, $x=tv$. From $x=0$ to $x=d_1$ there is a linear increase of the levitation force.

Let $t_0=d_1/v$ be the time when $x=d_1$ and the L-SIE switches are turned OFF. Let $t'=t-t_0$ be the time duration after L-SIE switches are turned OFF. After time $t_0$ when the switches are set OFF, the current $I=I_{ON}$ is within the coil of the L-SIE, but then the L-SIE still has magnetic field energy is $I^2L/2$ but suffers a power loss rate of $I^2R$, so in the absence of further electrical power, the induced magnetic flux, and levitation force decrease with time t by $\exp(-t'/\tau)$, where the time constant is $\tau=L/R$.

Substituting the previously determined estimates of $R=4\alpha_0\rho d_2/(d_0d_3)$ and $L=\alpha_1\alpha_2\mu d_1d_2/d_3$, one gets a time-delay constant $\tau=L/R=(\alpha_1\alpha_2\mu d_1d_2/d_3)/(4\rho\alpha_0d_2/(d_0d_3))$ which simplifies to $\tau=d_0d_1\mu\alpha_1\alpha_2/(4\alpha_0\rho)$.

For a valid analysis, can assume the HA (and hence the magnet M) moves no further than $\tau v \ll \epsilon d_1$ within a time constant $\tau$ for some small $\epsilon$ where $0<\epsilon\ll 1$. Note this implies the velocity v should not exceed $v_{max}=\epsilon d_1/\tau$, which can be written as $v_{max}=4\epsilon\alpha_0\rho/(d_0\mu\alpha_1\alpha_2)$.

Since it is assumed that $\tau \ll v/d_1$, it follows that $\exp(-t'/\tau)$ is approximately 0 when $t'=vd_1$ and $x=2d_1$ so at that time electrical power, the current, induced magnetic flux, and levitation force are all approximately 0.

Since $\tau \ll v/d_1$, the integral of $\exp(-t'/\tau)$ from $t'=0$ to $t'=vd_1$ is approximately $\tau$. Hence, averaging over all the x over the interval from $x=d_1$ to $x=2d_1$, the average remaining current, induced magnetic flux, and levitation force are all a factor of approximately $\tau$ of their values when $x=d_1$. In particular, since the levitation force is $F_x=d_1B\beta I_{ON}/2=2F'_{avg}$ when $x=d_1$, it follows that the average levitation force over the interval $x=d_1$ to $x=2d_1$ is $F''_{avg}=\tau 2F'_{avg}$.

Combining these averages, one can conclude the average levitation force $F_{avg-lev}$ per L-SIE over the full interval $x=0$ to $x=2d_1$ is $F_{avg-lev}=(F'_{avg}+F''_{avg})/2=(\tau+\frac{1}{2})F'_{avg}$. Substituting the estimate for $F'_{avg}=vB^2d_0d_1d_3\alpha_2\beta/(8\rho\alpha_0)$, one can derive the estimate for the overall average levitation force (averaged over all x positions) per L-SIE: $F_{avg-lev}=(\tau+\frac{1}{2})F'_{avg}=(\tau+\frac{1}{2})vB^2d_0d_1d_3\alpha_2\beta/(8\rho\alpha_0)$.

There is a similar levitation force at a position of the HA where L-SIE is below a magnetic element with internal flux directed upward (rather than downwards, as considered above), in the negative direction of the z-axis, and the L-SIE switches are ON allowing induced current flow within L-SIE. In this case, the induced current is the same magnitude, but in the opposite direction (that is in the positive direction of the y-axis). The resulting induced magnetic flux $B'_y$ is directed downward, in the negative direction of the z-axis. This is in the opposite direction of the magnetic flux directed upward of the HA magnet directly above the L-SIE. Hence these two opposing magnetic fluxes again generate a levitation force on the HA directed upward. Also, the drag forces in this case remain the same.

Since the interior area of each L-SIE is $A=d'_1 d'_2 = \alpha_1\alpha_2 d_1 d_2$, the overall average levitation force for all L-SIEs per square meter of area is $F_{avg-lev}/A=(\tau+\frac{1}{2})vB^2d_0d_1d_3\alpha_2\beta/(8\rho\alpha_0(\alpha_1\alpha_2 d_1 d_2))$, which simplifies to $F_{avg-lev}/A=(\tau+\frac{1}{2})vB^2d_0d_3\beta/(8\rho\alpha_0\alpha_1 d_2)$.

For purposes of analysis the levitation frictional coefficient can be defined as the ratio of the magnitude of the average drag force divided by the magnitude of the average levitation force. (Note that the levitation frictional coefficient is defined here is similar to the usual definition of rolling friction coefficient, which is the ratio of the magnitude of the horizontal rolling friction drag force divided by the magnitude of the vertical load force.) Recalling that the average drag force per L-SIE is $F_{avg-drag}=-v(Bd_2\alpha_2)^2 d_0 d_3/(8\rho\alpha_0)$, one can determine that the levitation frictional coefficient $=|F_{avg-drag}|/|F_{avg-lev}|=(v(Bd_2\alpha_2)^2 d_0 d_3/(8\rho\alpha_0))/((\tau+\frac{1}{2})vB^2d_0d_3\beta(8\rho\alpha_0\alpha_1 d_2))$, which simplifies to $|F_{avg-drag}|/|F_{avg-lev}|=(d_2)^3\alpha_1(\alpha_2)^2/((\tau+\frac{1}{2})\beta)$.

One can define a typical class C of examples: where (i) $\tau$ is near 0 and (ii) there are relatively small side-wall thickness $d_0 \ll \min(d_1,d_2)$, so $\alpha_1$, and $\alpha_2$ are both near 1, and (iii) and where $d_1 \gg d_2$, so $\alpha_0 = 2/((d_1-2d_0)/d_2+1)$ is approximately $2d_2/d_1$).

Summarizing the estimates, it can be shown:

(a) the velocity v should not exceed $v_{max}=4\epsilon\alpha_0\rho/(d_0\mu\alpha_1\alpha_2)$, which in example class C is approximately $v_{max}=8\epsilon d_2\rho/(d_0 d_1\mu)$. Note that $d_0$, $d_1$, $d_2$ and $\epsilon$ are the parameters that determine $v_{max}$, and by appropriately setting these, $v_{max}$ can be set to insure the usual operating speeds are less than $v_{max}$.

(b) The induced current is 0 when the switches are OFF and when the switches are ON is $I_{ON}=vBd_0d_3\alpha_2/(4\rho\alpha_0)$ per L-SIE, which in example class C is approximately $I_{ON}=vBd_0d_1d_3/(8d_2\rho)$.

(c) The average drag force per L-SIE is $F_{avg-drag}=-v(Bd_2\alpha_2)^2 d_0 d_3/(8\rho\alpha_0)$, which in example class C is approximately $F_{avg-drag}=-v(Bd_2)^2 d_0 d_1 d_3/(16\rho d_2)$. The average drag force on all L-SIEs per square meter of area is $F_{avg-drag}/A=-vB^2\alpha_2 d_0 d_2 d_3/(8\rho\alpha_0\alpha_1 d_1)$, which in example class C is approximately $F_{avg-drag}/A=-vB^2 d_0 d_3/(16\rho)$.

(d) The induced magnetic flux density, and levitation force magnitude linearly increases for x when the switches are ON and when the switches are OFF, drops by an exponential function with time constant $\tau=d_0d_1\mu\alpha_1\alpha_2/(4\alpha_0\rho)$. In example class C, $\tau$ is near 0.

(e) Recalling $\beta=\ln(1+\pi\alpha_2 d_2/d_3)$ (which is near constant $\beta=\ln(1+\pi\alpha_2)$ if $d_2=d_3$), the maximum levitation force is $F_{max}=vB^2d_0d_1d_3\alpha_2\beta/(4\rho\alpha_0)$, which is approximately $F_{avg-lev}=v(Bd_1)^2 d_0 d_3 \beta/(8\rho d_2)$ in example class C. The overall average levitation force per L-SIE is $F_{avg-lev}=(\tau+\frac{1}{2})vB^2d_0d_1d_3\alpha_2\beta/(8\rho\alpha_0)$, which is approximately $F_{avg-lev}=vB^2d_0d_3\beta/(32\rho d_2)$ in example class C. The average levitation force on all L-SIEs per square meter of area is $F_{avg-lev}/A=(\tau+\frac{1}{2})vB^2d_0d_3\beta/(8\rho\alpha_0\alpha_1 d_2)$, which in example class C is approximately $F_{avg-lev}/A=(\tau+\frac{1}{2})vB^2d_0d_1d_3\beta/(32\rho(d_2)^2)$.

(f) The levitation frictional coefficient $=|F_{avg-drag}|/|F_{avg-lev}|=|F_{avg-drag}|/|F_{avg-lev}|=(d_2)^3\alpha_1(\alpha_2)^2/((\tau+\frac{1}{2})\beta)$, which in example class C is approximately $2(d_2)^3(\alpha_2)^2/\beta$.

For the following further examples in the table below, make the following further assumptions:

assume the coil of the L-SIE is composed of copper, which has approximate resistivity $\rho=1.69*10^{-6}$.

assume magnetic flux density $B=1$ Tesla of the HA magnets.

assume the air-gap is in air, and the magnetic permeability of air is $\mu=1.256637*10^{-8}$.

approximate $\pi=3.1415$.

| Input: | Example 1 | Example 2 | Example 3 | Units | |
|---|---|---|---|---|---|
| $d_0 =$ | 0.008 | 0.008 | 0.008 | m | L-SIE wall thickness |
| $d_1 =$ | 0.25 | 0.5 | 1 | m | L-SIE x-axis length |
| $d_2 =$ | 0.05 | 0.05 | 0.05 | m | L-SIE y-axis length |
| $d_3 =$ | 0.2 | 0.2 | 0.2 | m | L-SIE z-axis length |
| $v =$ | 10 | 10 | 10 | m/s | Velocity in m/s |
|  | 36 | 36 | 36 | Km/hr | Velocity in Km/hr |
| epsilon = | 0.05 | 0.05 | 0.05 | | |
| Constants: | | | | | |
| pi = | 3.14 | 3.14 | 3.14 | | |
| B = | 1.4 | 2.4 | 3.4 | Tesla | Magnetic flux density |
| rho = | 1.69E−06 | 1.69E−06 | 1.69E−06 | Ωm | L-SIE resistivity |
| mu = | 1.26E−08 | 1.26E−08 | 1.26E−08 | N/A² | Air-gap permeability |
| Outputs: | | | | | |
| $d^1_1 =$ | 0.234 | 0.484 | 0.984 | m | L-SIE y-axis interior length |
| $d^1_2 =$ | 0.034 | 0.034 | 0.034 | m | L-SIE y-axis interior length |
| alpha$_0$ = | 0.352 | 0.187 | 0.097 | | |
| alpha$_1$ = | 0.936 | 0.968 | 0.984 | | |
| alpha$_2$ = | 0.680 | 0.680 | 0.680 | | |
| Tau = | 6.72E−06 | 2.61E−05 | 1.03E−04 | s | Time Constant |
| $v_{max}$ | 1.86E+03 | 9.57E+02 | 4.86E+02 | m/s | Max Velocity (red if error) |
|  | 6.70E+03 | 3.44E+03 | 1.75E+03 | km/hr | |
| $I_{ON} =$ | −6.40E+03 | 2.06E+04 | 5.66E+04 | Amps | Induced current per SIE |
| $F_{avg\text{-}drag} =$ | −7.62E+00 | −4.21E+01 | −1.64E+02 | N | Drag force per L-SIE |
|  | −7.76E−01 | −4.29E+00 | −1.67E+01 | Kg | |
| $F_{avg\text{-}drag}/A =$ | −9.57E_02 | −2.56E+03 | 4.89E+03 | N | Drag force per m² of area |
|  | −9.76E+01 | −2.61E+02 | 4.98E+02 | Kg | |
| Beta = | 4.28E−01 | 4.28E−01 | 4.28E−01 | | |
| $F_{max} =$ | 9.58E+02 | 1.06E+04 | 8.23E+04 | N | Max levitation force/L-SIE |
|  | 9.77E+01 | 1.08E+03 | 8.39E+03 | Kg | |
| $F_{avg\text{-}lev} =$ | 2.40E+02 | 2.65E+03 | 2.06E+04 | N | Max levitation force/L-SIE |
|  | 2.44E+01 | 2.70E+02 | 2.10E+03 | Kg | |
| $F_{avg\text{-}lev}/A =$ | 3.01E+04 | 1.61E+05 | 6.15E+05 | N | Avg levitation force/m² area |
|  | 3.07E+03 | 1.64E+04 | 6.27E+04 | Kg | |
| Lev Friction | 3.18E−02 | 1.59E−02 | 7.94E−03 | | Avg drag/Avg lev. Force |

Example B

Analysis of Horizontal-Force-Inducing AL-SIE

This Appendix provides an electromagnetic and force analysis of a representative HA moving over a representative alignment-force-inducing SIE ("AL-SIE"), including determination of approximation formulas for the amounts of inductive current in the AL-SIE, induced magnetic flux, and induced drag forces, levitation forces, and alignment forces. These formulas depend on the AL-SIE's and HA's physical dimensions, their material properties (including the magnet's magnetic flux density, the AL-SIE's electrical resistivity, magnetic permeability of the media within the air-gap of the AL-SIE), as well as the speed of the HA.

Throughout the analysis, certain assumptions and approximations are made. Such assumptions and approximations may be appropriate for some but not all of the embodiments of the technology disclosed herein. Accordingly, at least some embodiments of the disclosed technology may not fit within or be fully characterized by the following analysis.

The horizontal-force-inducing AL-SIE will be assumed to be composed of conductive nonmagnetic material (e.g., copper or similar material) with low electrical resistivity ρ. The HA will also be assumed to be sized as in the magnetic array 110 illustrated in the figures. For simplicity, it will be assumed that almost all the external magnetic flux of the HA (below magnets of the HA with sidewise internal flux) extends no further than distance $m_1$ below the HA.

For purposes of analysis of the horizontal-force-inducing AL-SIE, refer to the dimensions illustrated in FIG. 5A. As such, the horizontal-force-inducing AL-SIE has the following parts:

(i) The electrogeneration part (used to harvest electrical current) of size ($d_0 \times d_2 \times d_3$), that extends across horizontally distance $d_2$ in the y-axis direction, which connects at either end to:

(ii) The levitation-electromagnetic parts, of size ($d_0 \times d_1 \times d_3$), which extend horizontal distance $d_1$ in the positive x-axis direction. These sections, when current flows through them, generate an electromagnetic field that induces levitation forces along the z-axis. They connect at their right ends end to:

(iii) The alignment-electromagnetic parts, of size ($d_0 \times d_4 \times d_3$), which extend downward vertical distance $d_4$ in the negative z-axis direction, which connect at their upper ends end to the electromagnetic part, of size ($d_0 \times d_2 \times d_3$), extending across distance $d_2$ in the y-axis direction. Together, these sections form a vertical U that, when current flows through them, generate an electromagnetic field that induces the intended alignment along the x-axis.

To simplify the discussion below, again define the following factors:

$\alpha_0 = 2/((d_1 - 2d_0)/d_2 + 1)$.
$\alpha_1 = d'_1/d_1$, which is near 1 when $d_0 \ll d_1$.
$\alpha_2 = d'_2/d_2$, which is near 1 when $d_0 \ll d_2$.

Again, in typical cases, assume relatively small wall thickness $d_0 \ll \min(d_1, d_2)$ so in those typical cases, $\alpha_1$ and $\alpha_1$ are near 1.

The air-gaps of the AL-SIE's coil are the following two rectilinear regions:

A horizontal air-gap region of size ($d'_1 \times d'_2 \times d_3$) located in its upper section.

An air-gap region of size ($d'_4 \times d'_2 \times d_3$) on its right extending vertically downward distance $d'_4$.

Let μ again be the magnetic permeability of the media within the air-gaps of the AL-SIE (which typically will be air).

In this example's analysis, assume that $d'_1=m_1$, $d_1=m_1+2d_0$, $d'_2=m_2$, $d_2=m_2+2d_0$, $d_3=m_3$, and $d_4=m_1$ so the first air-gap of size ($d'_1 \times d'_2 \times d_3$) has the same dimensions ($m_1 \times m_2$) in the y-axis and z-axis direction as the magnets of the HA, so both air-gaps have overall dimensions ($m_1 \times m_2 \times d_3$).

The AL-SIE switches are set ON only when the electro-generation part of the AL-SIE is under a magnet of the HA with internal flux directed vertically, either downward or upward. Assume the resistance across the switches is near 0, the electrical resistance and magnetic inductance of the AL-SIE when the AL-SIE switches are ON allowing induced current flow within L-SIE are estimated below.

To estimate the resistance of AL-SIE, the AL-SIE will be viewed as a single coil with wire cross-section area approximately $d_0d_3$. To estimate the length to this coil, one can use the perimeter of an $(2d_1-d_0) \times (d_2-d_0)$ rectangle, which has length $2(2d_1-d_0)+2(d_2-d_0)=4\alpha'_0 d_2$ where $\alpha'_0=((2d_1-2d_0)/d_2+1)/2$. Let ρ be the AL-SIE's electrical resistivity. The electrical resistance R' of the AL-SIE is estimated as the product of electrical resistivity ρ times the length $4\alpha'_0 d_2$ divided by the cross-section area $d_0d_3$. Hence $R'=4\alpha'_0\rho d_2/(d_0d_3)$.

To estimate the magnetic inductance of AL-SIE, one can view the AL-SIE as a coil solenoid. Let μ be the magnetic permeability of the media within the air-gap of the AL-SIE (which typically will be air). Each of the horizontal and vertical air-gap regions of the AL-SIE have area $A=d'_1d'_2$, so the total area is $A'=2d'_1d'_2$. The magnetic inductance L' of the AL-SIE when viewed as a single coil solenoid is approximately the product of μ times area $A'=2d'_1d'_2$ divided by its height $d_3$. Hence $L'=\mu A'/d_3=2\alpha_1\alpha_2\mu d_1 d_2/d_3$.

Let v denote the velocity magnitude of a translational movement 122 of the HA in the positive direction of the x-axis from left to right over the immobile AL-SIE. First analyzed is the case of a position where AL-SIE is below a HA magnet M (e.g., magnetic element 104 in the figures) with internal flux directed downward, in the negative direction of the z-axis, and the AL-SIE switches are ON allowing induced current flow.

Observe that the magnetic flux of the HA crosses the AL-SIE coil at velocity v, across the electrogeneration part of the AL-SIE of distance $d'_2$ in the y-axis direction. When the AL-SIE switches are ON, a resulting induced current $I'_{ON}$ runs across the electrogeneration part in direction parallel to the y-axis in the negative direction of the y-axis. This induced electric current magnitude is approximately $I'_{ON}=vBd'_2/R'$. Substituting the previously determined estimate for $R'=4\alpha'_0\rho d_2/(d_0d_3)$, one arrives at $I'_{ON}=vBd'_2/R'=vBd'_2/(4\alpha'_0\rho d_2/(d_0d_3))$ which simplifies to $I'_{ON}=vBd_0d_3\alpha_2/(4\rho\alpha'_0)$. Again the induced current $I'_{ON}$ has magnitude growing linear both in the velocity v and magnetic flux density B. (Note again that due to inductive resistance of the AL-SIE coil, the current running entirely around the coil would initially be less than this.)

The generation of the induced electric current $I'_{ON}$ across the electrogeneration part of the AL-SIE in direction parallel to the y-axis when the AL-SIE's switches are ON induces a reverse drag force $F'_{drag}$ per AL-SIE in the opposite direction of the HA, that is in the right to left direction that is a negative direction in the x-axis. (Note that the drag force is near 0 when the AL-SIE's switches are OFF.) This drag force is $F'_{drag}=-I'_{ON}d'_2B$, which when is substituted with $I'_{ON}=vBd_0d_3\alpha_2/(4\rho\alpha'_0)$, gives $F'_{drag}=-I_{ON}d'_2 B=-(vBd_0d_3\alpha_2/(4\rho\alpha'_0))d'_2 B$, which simplifies to $F'_{drag}=-v(Bd_2\alpha_2)^2 d_0 d_3/(4\rho\alpha'_0)$. Since the drag force is near 0 when the switches are OFF, which occurs half the time, the average drag force is $F'_{avg-drag}=F'_{drag}/2=-v(Bd_2\alpha_2)^2 d_0 d_3/(8\rho\alpha'_0)$. Since the area of the horizontal air-gap of each AL-SIE is $A=d'_1 d'_2=\alpha_1\alpha_2 d_1 d_2$, the average drag force on all AL-SIEs per square meter of area is $F'_{avg-drag}/A=-v(Bd_2\alpha_2)^2 d_0 d_3/(8\rho\alpha'_0(\alpha_1\alpha_2 d_1 d_2))$, which simplifies to $F'_{avg-drag}/A=-vB^2\alpha^2_2 d_0 d_2 d_3/(8\rho\alpha'_0 \alpha_1 d_1)$.

First the levitation forces produced by the levitation-electromagnetic parts of the AL-SIE are considered. These have exactly the same shape as those of Example A. However, the overall resistance and inductance of the levitation-inducing AL-SIE is R' and L' (instead of R and L), resulting in some slight changes that can be observed. From the analysis of Example A, if x is the horizontal overlap in the x-axis direction of the magnet M over the AL-SIE, then from $x=0$ to $x=d_1$, while the switches are ON, there is a linear increase of the levitation force to a maximum of $vB^2 d_0 d_1 d_3 \alpha_2 \beta/(8\rho\alpha'_0)$, where $\beta=\ln(1+\pi\alpha_2 d_2/d_3)$.

But from $x=d_1$ to $x=2d_1$ the switches are set OFF and in absence of further electrical power, the induced magnetic flux, and levitation force decrease with time t by $\exp(-t'/\tau)$, where the time constant τ' is in this case $L'/R'=2(\alpha_1\alpha_2\mu d_1 d_2/d_3)/(4\rho\alpha'_0 d_2/(d_0 d_3))$ which simplifies to $\tau'=d_0 d_1 \mu\alpha_1\alpha_2/(2\alpha'_0\rho)$. For this analysis of Example A to be valid, one needs to assume the HA moves at velocity v not exceeding $v'_{max}=\epsilon d_1/\tau'=2\epsilon\alpha_0\rho/(d_0\mu\alpha_1\alpha_2)$, for some small ε where $0<\epsilon<<1$. Since $\tau'<<v/d_1$, the integral of $\exp(-t'/\tau')$ from $t'=0$ to $t'=vd_1$ is approximately τ'. Hence the average levitation force, over all values of x, is $F'_{avg-lev}=(\tau'+\frac{1}{2})vB^2 d_0 d_1 d_3 \alpha_2 \beta/(8\rho\alpha'_0)$.

Again, since the area of the horizontal air-gap of each AL-SIE is $A=d'_1 d'_2=\alpha_1\alpha_2 d_1 d_2$, the average levitation force on all AL-SIEs per square meter of area is $F'_{avg-lev}/A=(\tau'+\frac{1}{2})vB^2 d_0 d_1 d_3 \alpha_2 \beta/(8\rho\alpha'_0(\alpha_1 \alpha_2 d_1 d_2))$, which simplifies to $F'_{avg-lev}/A=(\tau+\frac{1}{2})vB^2 d_0 d_3 \beta/(8\rho\alpha'_0 \alpha_1 d_2)$.

The levitation frictional coefficient can be the ratio of the magnitude of the average drag force divided by the magnitude of the average side-wise-alignment force. Recalling that the average drag force per AL-SIE is $F'_{avg-drag}=-v(Bd_2\alpha_2)^2 d_0 d_3/(8\rho\alpha'_0)$, one can determine that the levitation frictional coefficient=$|F'_{avg-drag}|/|F'_{avg-lev}|=(v(Bd_2\alpha_2)^2 d_0 d_3/(8\rho\alpha'_0))/(\tau'+\frac{1}{2})vB^2 d_0 d_1 d_3 \alpha_2 \beta/(8\rho\alpha'_0)$ which simplifies to $|F'_{avg-drag}|/|F_{avg-lev}|=(d_2)^2\alpha_2/(\tau+\frac{1}{2})d_1\beta$, which is the same formula as in Example A for the levitation-inducing AL-SIE.

Next is considered the alignment-electromagnetic parts of the AL-SIE, which form a vertical U that, when current flows through them, generate an electromagnetic field that induces the intended alignment along the x-axis. Recall two of these electromagnetic parts (which will be referred to as type 1) are of size ($d_0 \times d_4 \times d_3$), extending downward vertical distance $d_4$ in the negative z-axis direction. Recall these connect at their upper ends end to the electromagnetic part (which will be referred to as type 2) of size ($d_0 \times d_2 \times d_3$), extending across distance $d_2$ in the y-axis direction.

As in Example A, the induced magnetic flux density generated by the current $I'_{ON}$ in each type 1 alignment-electromagnetic part of the AL-SIE at distance y from it is approximately $B'_y=\mu I'_{ON}/(1+y\pi/d_3)$. Also as in Example A, the integral of $B'_y$ from $y=0$ to $y=d'_2$ is $\mu I'_{ON}\beta$, where again $\beta=\ln(1+\pi\alpha_2 d_2/d_3)$.

Also, the induced magnetic flux density generated by the current $I'_{ON}$ in the type 12 alignment-electromagnetic part of the AL-SIE at distance z from it is approximately $B'_z=\mu I'_{ON}/(1+z\pi/d_3)$, and the integral of $B'_z$ from $z=0$ to $y=d'_1$ is $\mu I'_{ON}\beta$, where $\beta'=\ln(1+\pi\alpha_1 d_1/d_3)$.

As shown in FIG. 9B, the induced magnetic flux (denoted 228) $B'_y$ provided by the alignment-electromagnetic parts of the AL-SIE, which is in the left-to-right horizontal direction along the positive x-axis. When the electrogeneration part 130 is under a magnetic element (e.g., magnetic element 102 in the figures) whose internal flux is directed upward, these alignment-electromagnetic parts 32 are suspended under a magnet M' (e.g., magnetic element 104 in the figures) of the HA at a position where there is external magnetic flux B in the left-to-right horizontal direction along the positive x-axis. (Note that magnet M' has right-to-left internal flux, but the electromagnetic parts 232 do not encounter this internal flux. Also, recall the assumption that the external magnetic flux of the HA, below magnets of the HA with sidewise internal flux, extends no further than distance $m_1=d'_1$ below the HA.)

These two similarly-directed magnetic flux induces an alignment torque force that grows proportionally to $\tan(\theta)$, where $\theta$ is the angle of deviation of the HA from the x-axis. In particular, the alignment torque force is $|F_{align} \tan(\theta)|$ where the side-wise alignment force $F_{align}$ is approximated below.

The side-wise alignment force $F_{align1}$ per each type 1 alignment-electromagnetic part is given by $d'_1\beta/(2\mu)$ times the integral of $B'_y$ from $y=0$ to $y=d_2$. Hence the side-wise alignment force $F_{align1}$ for each of its two type 1 alignment-electromagnetic parts is $F_{align1}=2(d'_1B/(2\mu))(\mu I'_{ON}\beta)$, which simplifies to $F_{align1}=d'_1B\beta I'_{ON}/2$.

The side-wise alignment force $F_{align2}$ for the type 2 alignment-electromagnetic part is given by $d'_2B/(2\mu)$ times the integral of $B'_z$ from $z=0$ to $z=d_1$. Hence the side-wise alignment force $F_{align2}$ for the type 2 alignment-electromagnetic part is $F_{align2}=d'_2B/(2\mu))(\mu I'_{ON}\beta')$, which simplifies to $F_{align2}=d'_2B\beta'I'_{ON}/2$.

Hence the side-wise alignment force $F_{align}$ in the direction of the x-axis, totaled for all the alignment-electromagnetic parts is $F_{align}=2F_{align1}+F_{align2}=d'_2B\beta'I'_{ON}+d'_1B\beta I'_{ON}/2=(d'_2\beta+d'_1\beta'/2)BI'_{ON}$, which can be substituted with $I'_{ON}=vBd_0d_3\alpha_2/(4\rho\alpha'_0)$, is $F_{align}=(d'_2\beta+d'_1\beta'/2)B(vBd_0d_3\alpha_2/(4\rho\alpha'_0))=vB^2\gamma d_0d_3\alpha_2/(4\rho\alpha'_0)$, where $\gamma=(d'_2\beta+d'_1\beta'/2)$.

This side-wise alignment force $F_{align}$ remains approximately the same from $x=0$ to $x=d_1$. However, recall from Example A that from $x=d_1$ to $x=2d_1$ the switches are set OFF and in absence of further electrical power, the induced magnetic flux, and induced force decrease with time t exponentially with the time constant $\tau'=d_0d_1\mu\alpha_1\alpha_2/(2\alpha'_0\rho)$. The integral of these forces from $x=d_1$ to $x=2d_1$ are approximately a factor of $\tau'$ times their value at $x=d_1$. Hence the average (averaged over all x positions) side-wise alignment force $F_{avg-align}$ is a factor $(\tau'+½)$ times its value at $x=d_1$ and hence $F_{avg-align}=(\tau'+½)F_{align}=(\tau'+½)vB^2\gamma d_0d_3\alpha_2/(4\rho\alpha'_0)$.

There is a similar side-wise alignment force at a position of the HA where the AL-SIE is below a HA magnet M (e.g., magnetic element 104 in the figures) with internal flux directed upward (rather than downwards, as considered above), in the negative direction of the z-axis, and the AL-SIE switches 17 are ON allowing induced current flow within AL-SIE. As shown in FIG. 9B, the induced magnetic flux 228 provided by the alignment-electromagnetic parts of the AL-SIE, which is in the right-to-left horizontal direction along the negative x-axis. In this case, the alignment-electromagnetic parts of the AL-SIE are suspended below a magnet of the HA at a position where there is external magnetic flux B in the right-to-left horizontal direction along the negative x-axis. Again, these two similarly-directed magnetic flux induces an average alignment torque force $|F_{avg-align}| \sin(\theta)$ that grows, where $\theta$ is the angle of deviation of the HA from the x-axis, and where the side-wise alignment force magnitude $|F_{avg-align}|$ is approximated above. Also, the drag forces in this case remain the same.

Since the interior horizontal region of each AL-SIE is $A=d'_1d'_2=\alpha_1\alpha_2d_1d_2$, the overall average alignment force for all AL-SIEs per square meter of area is $|F_{avg-align}|/A=(\tau+½)vB^2\gamma d_0d_3\alpha_2/((4\rho\alpha'_0)(\alpha_1\alpha_2d_1d_2))$, which simplifies to $|F_{avg-align}|/A=(\tau+½)vB^2\gamma d_0d_3\alpha_2/(4\rho\alpha'_0d_1d_2)$.

The levitation-alignment frictional coefficient $=|F_{avg-drag}|/(|F'_{avg-lev}|+|F_{avg-align}|)$ is defined as the ratio of the magnitude of the average drag force divided by the sum of magnitudes of the average levitation force and side-wise-alignment force. Recalling that the average drag force per AL-SIE is $F_{avg-drag}=-v(Bd_2\alpha_2)^2d_0d_3/(8\rho\alpha'_0)$, one can determine that the levitation-alignment frictional coefficient $=|F_{avg-drag}|/(|F'_{avg-lev}|+|F_{avg-align}|)=(v(Bd_2\alpha_2)^2d_0d_3/(8\rho\alpha'_0))/(((\tau+½)vB^2d_0d_1d_3\alpha_2\beta/(8\rho\alpha'_0))+(\tau'+½)vB^2\gamma d_0d_3\alpha_2/(4\rho\alpha'_0))$ which simplifies to $|F_{avg-drag}|/(|F'_{avg-lev}|+|F_{avg-align}|)=8\alpha_2(d_2)^2/((\tau+½)d_3(2d_1\beta+\gamma))$.

Again, define a typical class C of examples: where (i) $\tau'$ is near 0 and (ii) there is a relatively small side-wall thickness $d_0<<\min(d_1,d_2)$), so $\alpha_1$, and $\alpha_2$ are both near 1, and (iii) and where $d_1>>d_2$, so $\alpha_0=2/((d_1-2d_0)/d_2+1)$ is approximately $2d_2/d_1$, and $\alpha'_0=((2d_1-2d_0)/d_2+1)/2$ is approximately $d_2/d_1$.

Summarizing the estimates:

(a) The velocity v should not exceed $v'_{max}=4\epsilon\alpha'_0\rho/(d_0\mu\alpha_1\alpha_2)$, which in example class C is approximately $v'_{max}=4\epsilon d_2\rho/(d_0d_1\mu)$.

(b) The induced current is 0 when the switches are OFF and when the switches are ON is $I_{ON}=vBd_0d_3\alpha_2/(4\rho\alpha'_0)$ per AL-SIE, which in example class C is approximately $I_{ON}=vBd_0d_1d_3/(4\rho d_2)$.

(c) The drag force in the x-axis direction is 0 when the switches are OFF and when the switches are ON is $F'_{drag}=-v(Bd_2\alpha_2)^2d_0d_3/(4\rho\alpha'_0)$ per AL-SIE, which in example class C is approximately $F'_{drag}=-vB^2d_0d_1d_2d_3/(4\rho d_2)$. The average drag force per AL-SIE is $F'_{avg-drag}=-v(Bd_2\alpha_2)^2d_0d_3/(8\rho\alpha'_0)$, which in example class C is approximately $F'_{avg-drag}=-vB^2d_0d_2d_3/(8d_1\rho)$. The average drag force on all AL-SIEs per square meter of area is $F'_{avg-drag}/A=-vB^2\alpha_2d_0d_2d_3/(8\rho\alpha'_0\alpha_1d_1)$, which in example class C is approximately $F'_{avg-drag}/(2d_1d_2)=-vB^2d_0d_3/(8\rho)$.

(d) The induced magnetic flux density, and levitation force magnitude linearly increases for x when the switches are ON and when the switches are OFF, drops by an exponential function with time constant $\tau'=d_0d_1\mu\alpha_1\alpha_2/(2\alpha'_0\rho)$, which in example class C is near 0.

(e) Recalling $\beta=\ln(1+\pi\alpha_2d_2/d_3)$ (which is near constant $\beta=\ln(1+\pi\alpha_2)$ if $d_2=d_3$), the average levitation force is $F'_{avg-lev}=(\tau'+½)vB^2d_0d_1d_3\alpha_2\beta/(8\rho\alpha'_0)$, which is approximately $F_{avg-lev}=vB^2d_0(d_1)^2d_3\beta/(8\rho d_2)$ in example class C. The average levitation force on all AL-SIEs per square meter of area is $F'_{avg-lev}/A=(\tau'+½)vB^2d_0d_3\beta/(8\rho\alpha'_0\alpha_1d_2)$, which in example class C is approximately $F'_{avg-lev}/A=vB^2d_0d_1d_3\beta/(32\rho\alpha_1(d_2)^2)$. The levitation frictional coefficient $=|F'_{avg-drag}|/|F'_{avg-lev}|=(d_2)^2\alpha_2/(\tau'+½)d_1\beta$, which is the same formula as in Example A for the levitation-inducing AL-SIE, and which in example class C is approximately $2(d_2)^2/(d_1\beta)$.

(f) The average alignment force per AL-SIE is $F_{avg-align}=(\tau'+½)vB^2\gamma d_0d_3\alpha_2/(4\rho\alpha'_0)$, where $\beta=\ln(1+\pi\alpha_2d_2/d_3)$, $\beta'=\ln(1+\pi\alpha_1d_1/d_3)$, and $\gamma=(d'_2\beta+d'_1\beta'/2)$. In example class C this is approximately $F_{align}=vB^2\gamma d_0d_1/(8\rho)$. This alignment force induces an alignment torque force $|F_{align} \tan(\theta)|$, where $\theta$ is the angle of deviation of the HA from the x-axis.

(g) The overall average alignment force for all AL-SIEs per square meter of area is $|F_{avg-align}|/A=(\tau+½)vB^2\gamma d_0d_3\alpha_2/(4\rho\alpha'_0d_1d_2)$, which in example class C is approximately $|F_{avg-align}|/A=vB^2\gamma d_0d_3/(8\rho(d_2)^2)$.

(h) The levitation-alignment frictional coefficient= $|F_{avg-drag}|/([F'_{avg-lev}|+F_{avg-align}|)=8\alpha_2(d_2)^2/((\tau'+\frac{1}{2})d_3(2d_1\beta+\gamma))$. In example class C this is approximately $16(d_2)^2/(d_3(2d_1\beta+\gamma))$.

In the following further examples, make the following further assumptions:

Assume the coil of the AL-SIE is composed of copper, which has approximate resistivity $\rho=1.69*10^{-6}$.

Assume magnetic flux density B=1 Tesla of the HA magnets.

Assume the air-gap is in air, and the magnetic permeability of air is $\mu=1.256637*10^{-8}$.

Approximate $\pi=3.1415$.

2D view as x-z plane cross-section). The component magnets are rectilinear shaped, and assembled to form the HA, denoted 1, so that:

(a) Magnet 2 has internal magnetic flux 6 directed vertically upward, in the positive direction of the z-axis; it has a magnet 3 to its right in the positive x-axis direction.

(b) Magnet 3 has internal magnetic flux 7 directed horizontally left to right, in the positive direction of the x-axis; it has a magnet 4 to its right in the positive x-axis direction.

(c) Magnet 4 has internal magnetic flux 8 directed vertically downward, in the negative direction of the z-axis; it has a magnet 6 to its right in the positive x-axis direction.

| Input: | Example 1 | Example 2 | Example 3 | Units | |
|---|---|---|---|---|---|
| $d_0 =$ | 0.008 | 0.008 | 0.008 | m | AL-SIE wall thickness |
| $d_1 =$ | 0.25 | 0.5 | 1 | m | AL-SIE x-axis length |
| $d_2 =$ | 0.05 | 0.05 | 0.05 | m | AL-SIE y-axis length |
| $d_3 =$ | 0.2 | 0.2 | 0.2 | m | AL-SIE z-axis length |
| $d_4 =$ | 0.1 | 0.1 | 0.1 | m | |
| v = | 10 | 10 | 10 | m/s | |
| epsilon = | 0.05 | 0.05 | 0.05 | | |
| Constants: | | | | | |
| pi = | 3.14 | 3.14 | 3.14 | | |
| B = | 1 | 2 | 3 | Tesla | Magnetic flux density |
| rho = | 1.69E−06 | 1.69E−06 | 1.69E−06 | Ωm | L-SIE resistivity |
| mu = | 1.26E−08 | 1.26E−08 | 1.26E−08 | N/A² | Air-gap permeability |
| Outputs: | | | | | |
| $d^1_1 =$ | 0.234 | 0.484 | 0.984 | m | |
| $d^1_2 =$ | 0.034 | 0.034 | 0.034 | m | |
| $alpha_0 =$ | 0.352 | 0.187 | 0.097 | | |
| $alpha_1 =$ | 0.936 | 0.968 | 0.984 | | |
| $alpha_2 =$ | 0.680 | 0.680 | 0.680 | | |
| $alpha^1_0 =$ | 5.340 | 10.340 | 20.340 | | |
| Beta = | 4.28E−01 | 4.28E−01 | 4.28E−01 | | |
| $Beta^1 =$ | 1.54E+00 | 2.15E+00 | 2.80E+00 | | |
| $R^1 =$ | 1.13E−03 | 2.18E−03 | 4.30E−03 | | AL-SIE's Electrical Resistance |
| $L^1 =$ | 1.00E−09 | 2.07E−09 | 4.20E−09 | | AL-SIE's Magnetic Inductance |
| $Tau^1 =$ | 8.86E−07 | 9.47E−07 | 9.78E−07 | s | Time Constant |
| $V_{max} =$ | 1.86E+03 | 9.57E+02 | 4.86E+02 | m/s | Max Velocity (red if error) |
| | 6.70E+03 | 3.44E+03 | 1.75E+03 | km/hr | |
| $I^1_{ON} =$ | 3.01E+02 | 3.11E+02 | 2.37E+02 | Amps | Induced current per SIE |
| $F^1_{drag} =$ | −5.12E−01 | −1.06E+00 | −1.21E+00 | N | Max drag force per SIE |
| | −5.22E−02 | −1.08E−01 | −1.23E−01 | kg | |
| $F^1_{avg-drag} =$ | −2.56E−01 | −5.29E−01 | −6.05E−01 | N | Ave drag force per SIE |
| | −2.61E−02 | −5.39E−02 | −6.17E−02 | Kg | |
| $F_{drag}/A =$ | −6.44E+01 | −6.43E+01 | −3.62E+01 | N/m² | Drag force per m² of area |
| | −6.56E+00 | −6.56E+00 | −3.69E+00 | Kg | |
| $F^1_{Avg-Lev} =$ | 8.06E+00 | 3.33E+01 | 7.62E+01 | N | Avge levitation force per SIE |
| | 8.22E−01 | 3.39E+00 | 7.77E+00 | kg | |
| $F_{Avg\_Lev}/A =$ | 1.01E+03 | 2.02E+03 | 2.28E+03 | N/m² | Avg levitation force per SIE |
| | 1.03E+02 | 2.06E+02 | 2.32E+02 | kg/m² | |
| Ratio = | 3.18E−02 | 1.59E−02 | 7.95E−03 | | Avg drag force/Avg levitation |
| $B^1_Y =$ | 1.62E−06 | 1.67E−06 | 1.28E−06 | | Integral of $B^1_y$ from 0 to $d^1_2$ |
| $B^1_Z =$ | 5.84E−06 | 8.42E−06 | 8.35E−06 | | Integral of $B^1_z$ from z + 0 to y = $d^1_2$ |
| $F_{Align1} =$ | 1.51E+01 | 1.51E+01 | 1.51E+01 | N | Alignment force for type 1 part |
| $F_{Align2} =$ | 7.90E+00 | 2.28E+01 | 3.39E+01 | N | Alignment force for type 2 part |
| $F_{Align} =$ | 3.81E+01 | 5.30E+01 | 6.41E+01 | N | Total alignment Force per AL-SIE |
| $F_{Avg-Align} =$ | 1.90E+01 | 2.65E+01 | 3.20E+01 | N | Avg alignment force per AL-SI |
| $F_{Avg-Align}/A =$ | 2.39E+03 | 1.61E+03 | 9.58E+02 | N/m² | Avg levitation force/m2 area |
| Ratio = | 1.35E−02 | 2.00E−02 | 1.89E−02 | | Avg drag/(Avg lev. + align. force) |

Example C

Figure 98:
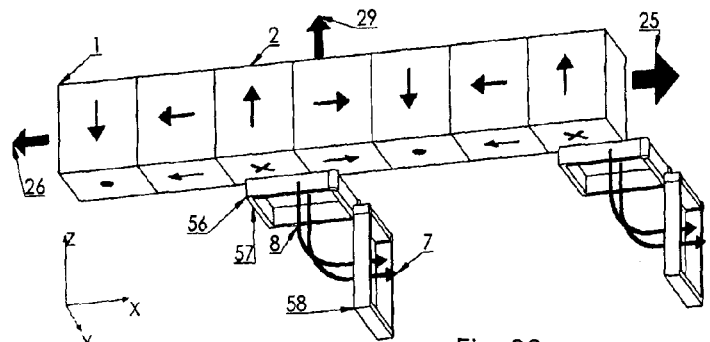

FIGS. 12-98 illustrate other embodiments of the present technology that are similar, at least in part, to those described above with reference to FIGS. 2A-2C and 4A-10.

Illustrations of a linear Halbach Array (HA) aligned on the x-axis are given in FIG. 12 (in 3D), FIG. 13 (in 3D with lengths indicated), FIG. 14 (in 3D with external magnetic flux indicated), FIG. 15 (underside 2D view), FIG. 15 (sidewise (d) Magnet 6 has internal magnetic flux 9 directed horizontally right to left, in the negative direction of the x-axis; it has a magnet 2 to its right in the positive x-axis direction.

FIG. 12 is a 3D illustration of HA with rectilinear shaped magnets, without indication of external flux lines.

FIG. 13 is a 3D illustration of HA with rectilinear shaped magnets, without indication of external flux lines, but with indication of length dimensions of the magnets and with the 3D coordinate axis.

FIG. 14 is a 3D illustration of HA with rectilinear shaped magnets, with external flux lines indicated.

FIG. 15 is an underside 2D view of a HA with rectilinear shaped magnets, with indication of the magnetic flux through the underside of the HA, and with indication of its length dimensions along the x-axis and y-axis.

FIG. 16 is a sidewise 2D view (x-z plane cross-section) of a HA with rectilinear shaped magnets, with internal and external flux lines indicated, with indication of its length dimensions along the x-axis and z-axis.

Figure 20:
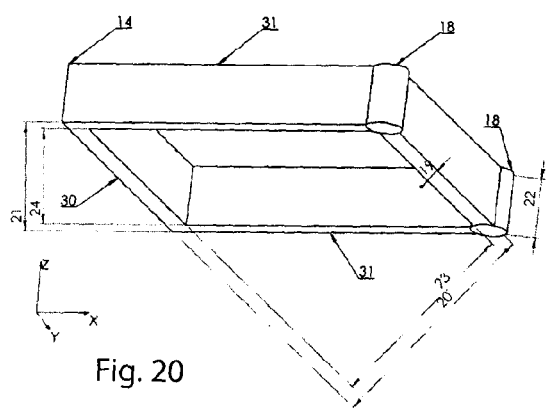

FIG. 17 and FIG. 18 (with both switches set ON) as well as FIG. 19 and FIG. 20 (with both switches set OFF) give illustrations of an example SIE, termed a L-SIE and used to generate levitation forces, and consisting of a loop of non-magnetic conductive material indicated by cross-hatching, with two switches 18 located at its right-most section that control electrical current within the L-SIE.

FIG. 17 is a 3D illustration of a L-SIE 14, without length dimensions, with both switches set ON.

FIG. 18 is a 3D illustration of L-SIE, with both switches set ON, with indication of its length dimensions and with the 3D coordinate axis.

FIG. 19 is a 3D illustration L-SIE, without length dimensions, with both switches set OFF.

FIG. 20 is a 3D illustration of L-SIE, with both switches set OFF, with indication of its length dimensions and with the 3D coordinate axis.

Figure 21:
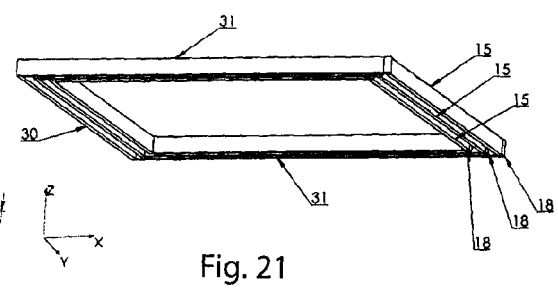

FIG. 21 is a 3D illustration of L-SIE 14 similar to FIG. 17, but with laminations 15.

Figure 22:
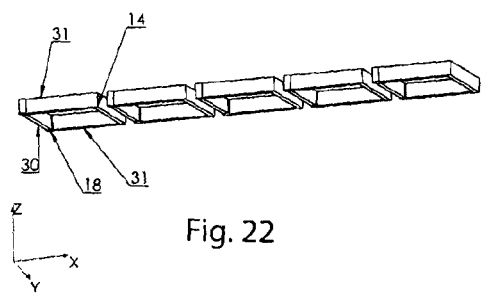

FIG. 22 gives a 3D illustration of a linear array of L-SIEs forming a linear track, each as illustrated in FIG. 16 and used to generate levitation forces.

Figure 23:
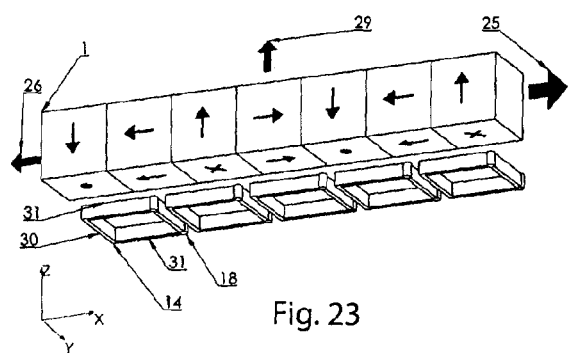

FIG. 23 gives a 3D illustration of a linear array of L-SIEs forming a linear track as in FIG. 22, with a HA 1 moving from right to left above the L-SIEs along the x-axis, with indication of resulting levitation forces.

FIG. 24, FIG. 25, FIG. 26, FIG. 27, FIG. 28, FIG. 29, and FIG. 30 give Illustrations of transverse positions of HA 1 moving from left to right, with an immobile L-SIE 14, indicating when the switches 18 are in ON state or OFF state, and indication of resulting induced electrical current within the L-SIE.

Figure 24:
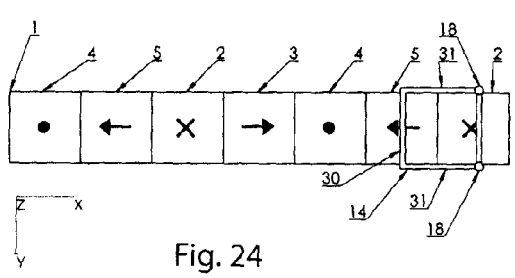

FIG. 24 is an underside 2D view of transverse position of HA 1, where the electrogeneration element 30 (the left-most part of the L-SIE) is under the middle section of a HA magnet 5 with internal flux directed from right to left, with both the switches 18 in OFF state and with no current flow indicated.

Figure 25:
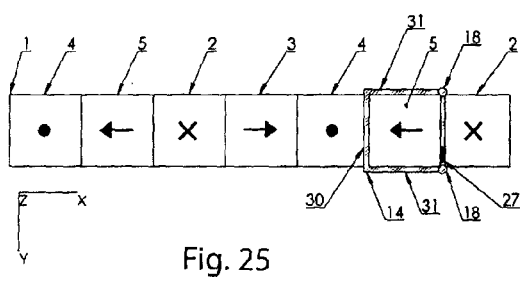

FIG. 25 is an underside 2D view of transverse position of HA 1, where the electrogeneration element 30 of the L-SIE is under the right-most section of a HA magnet with internal flux directed downward 4, where both the switches 18 have just been switched to ON state, and indication of initial induced electrical current within the L-SIE.

Figure 26:
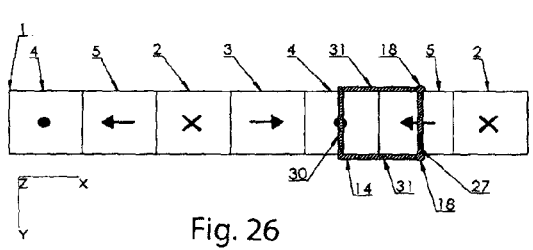

FIG. 26 is an underside 2D view of midway-ON transverse position of HA 1, where the entire L-SIE is directly under a HA magnet 4 with internal flux directed downward, where both the Switches 18 remain in ON state, and indication of induced electrical current within the L-SIE.

Figure 27:
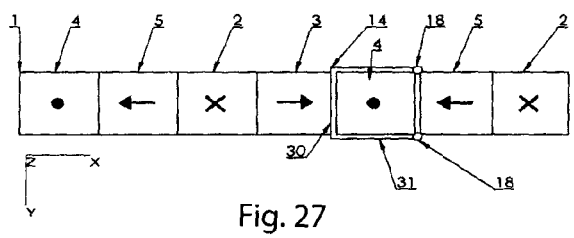

FIG. 27 is an underside 2D view of relative transverse positions of HA 1, where the electrogeneration element 30 of the L-SIE is under the right-most section of a HA magnet 3 with internal flux directed from left to right, where both Switches 18 have just been switched to OFF state, with no current flow indicated.

Figure 28:
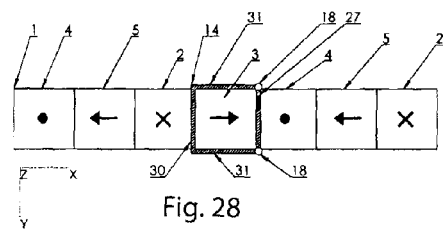

FIG. 28 is an underside 2D view of transverse position of HA 1, where the electrogeneration element 30 of the L-SIE is under the right-most section of a HA magnet with internal flux 2 directed upward, where both the switches 18 have just been switched to ON state, and indication of initial induced electrical current within the L-SIE.

Figure 29:
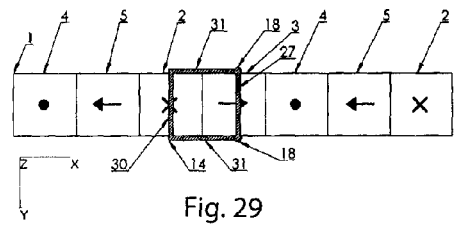

FIG. 29 is an underside 2D view of midway-ON transverse position of HA 1, where the entire L-SIE is directly under a HA magnet 2 with internal flux directed upward, where both the switches 18 have remain in ON state, and indication of induced electrical current within the L-SIE.

Figure 30:
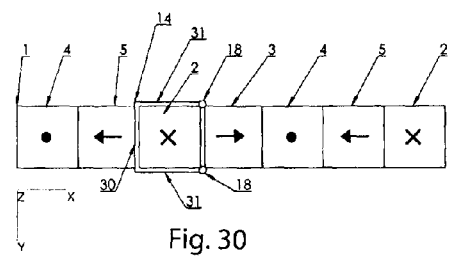

FIG. 30 is an underside 2D view of relative transverse positions of HA 1, where the electrogeneration element 30 is under the right-most section of a HA magnet 5 with internal flux directed from right to left, where both the Switches 18 have just been switched to OFF state, with no current flow indicated.

Figure 31:
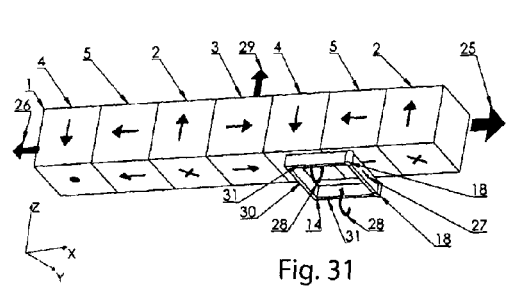

FIG. 31 (in 3D), FIG. 32 (in 3D with external flux lines), FIG. 33 (underside 2D view), and FIG. 34 (sidewise 2D view as x-z plane cross-section) are illustrations of electrical current 27 within L-SIE 14 induced by movement 25 of an HA in the positive direction of the x-axis from left to right over the L-SIE, at a position where the left-most part of the L-SIE is just below a HA magnet 4 with internal flux directed downward, and where the Switches 18 are ON allowing induced current flow within L-SIE. Illustrations give the resulting drag force 26 on the HA (resulting from the inductive energy-transfer from kinetic energy to electrical current) is directed from right to left, in reverse of the direction of the HA. Also indication of induced magnetic flux 28 of L-SIE. The resulting levitation force 29 on the HA (resulting from the opposition of the downward vertical external magnetic flux of the HA with the reverse-directed upward magnetic flux of the EME) is illustrated to be directed vertically upward.

FIG. 31 is a 3D illustration of inductive current induced by left to right movement of a HA over an L-SIE 14 of FIG. 17 at a position where the left-most part of the L-SIE 14 of FIG. 17 is just below the HA magnet 4 with internal flux directed downward, and where the Switches 18 are ON allowing induced current flow within L-SIE, and resulting drag force on the HA from right to left. Also, indication of induced magnetic flux of L-SIE, and resulting vertical levitation force on the HA. The external flux lines of the HA are not indicated.

Figure 32:
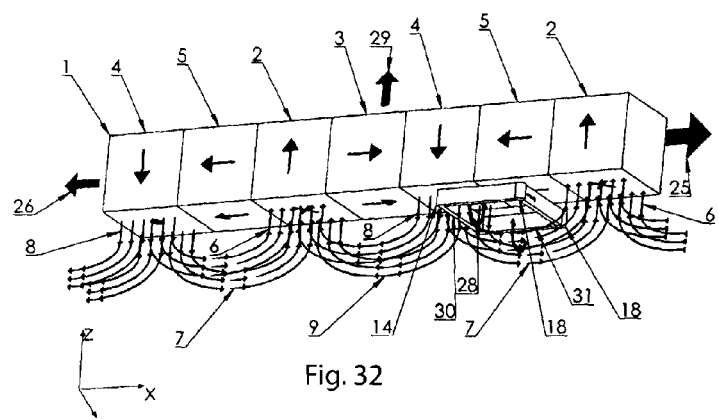

FIG. 32 is identical to FIG. 31, but the external flux lines of the HA are also indicated.

Figure 33:
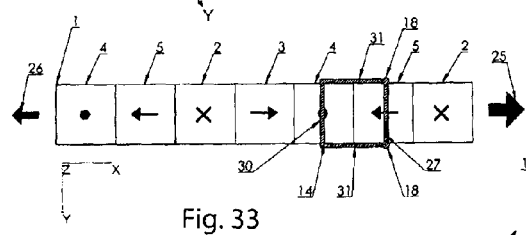

FIG. 33 is an underside 2D view of FIG. 31 in the positive z-axis direction.

Figure 34:
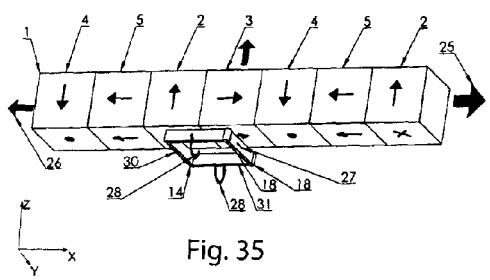

FIG. 34 is a sidewise 2D view (x-z plane cross-section) of FIG. 31 in the positive y-axis direction.

Figure 35:
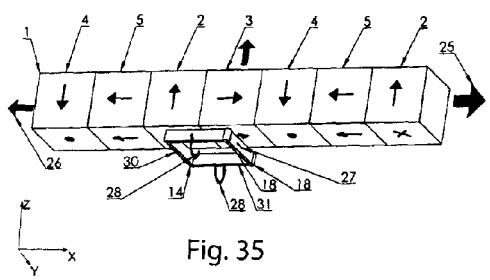

FIG. 35 (in 3D), FIG. 36 (in 3D with external lux lines), FIG. 37 (underside 2D view), and FIG. 38 (sidewise 2D view as x-z plane cross-section) are illustrations of inductive electrical current 27 within L-SIE 14 induced by movement 25 of an HA in the positive direction of the x-axis from left to right over the L-SIE, at a position where the electrogeneration element 30 (the left-most part of the L-SIE) is just below a HA magnet 2 with internal flux directed upward, and where both the Switches 18 are ON allowing induced current flow. Illustrations give the resulting drag force 26 on the HA (resulting from the inductive energy-transfer from kinetic energy to electrical current) is directed from right to left, in reverse of the direction of the HA. Also indication of induced magnetic flux 28 of L-SIE. The resulting levitation force 29 on the HA (resulting from the opposition of the upward vertical external magnetic flux of the HA with the reverse-directed downward magnetic flux of the EME) is illustrated to be directed vertically upward.

FIG. 35 is a 3D illustration of left to right movement of a HA over the L-SIE 14, at a position where the electrogeneration element 30 (the left-most part of the L-SIE) is just below a HA magnet 2 with internal flux directed upward, and where both the Switches 18 are ON allowing induced current flow, with indication of inductive current induced and of resulting drag force on the HA from right to left. Also, indication of induced magnetic flux of L-SIE, and resulting vertical levitation force on the HA. The external flux lines of the HA are not indicated.

Figure 36:
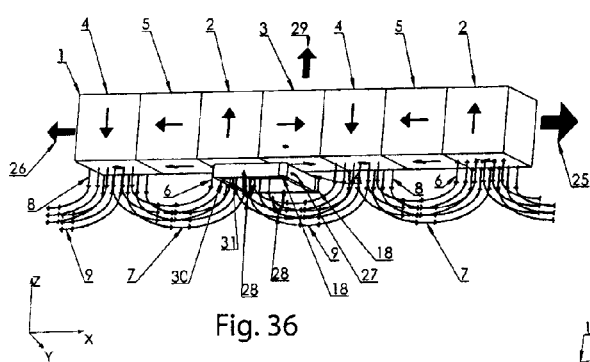

FIG. 36 is identical to FIG. 35, but the external flux lines of the HA are also indicated.

Figure 37:
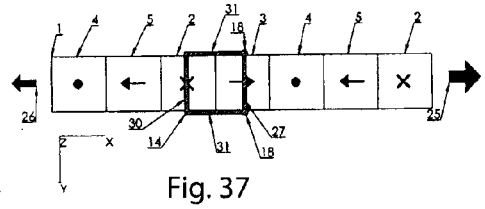

FIG. 37 is an underside 2D view of FIG. 35 in the positive z-axis direction.

Figure 38:
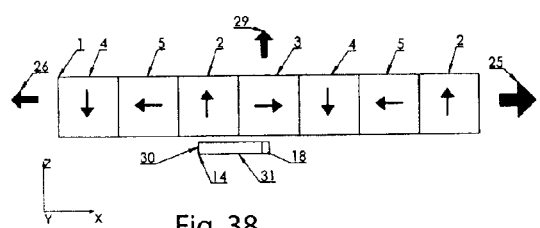

FIG. 38 is a sidewise 2D view (x-z plane cross-section) of FIG. 24 in the positive y-axis direction.

Figure 39:
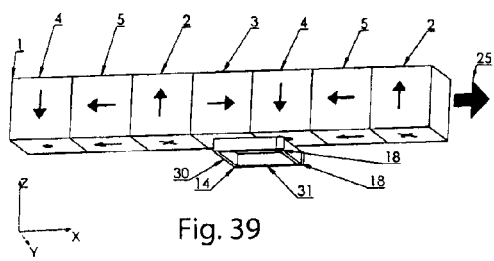

FIG. 39 (in 3D), FIG. 40 (in 3D with external lux lines), FIG. 41 (underside 2D view), and FIG. 42 (sidewise 2D view as x-z plane cross-section) are illustrations of movement 25 of an HA in the positive direction of the x-axis from left to right over the L-SIE 14, at a position where the electrogeneration part 30 is just below a HA magnet 5 with internal flux directed sideways left-to-right and where both the Switches 18 are OFF allowing within the zero induced current flow 27, and no drag force 26.

FIG. 39 is a 3D illustration of inductive current induced by left to right movement 25 of a HA over the L-SIE 14, at a position where the electrogeneration element 30 is just below a HA magnet 5 with internal flux directed sideways left-to-right and where both the Switches 18 are OFF allowing within the L-SIE zero induced current flow 27, and no drag force 26.

Figure 40:
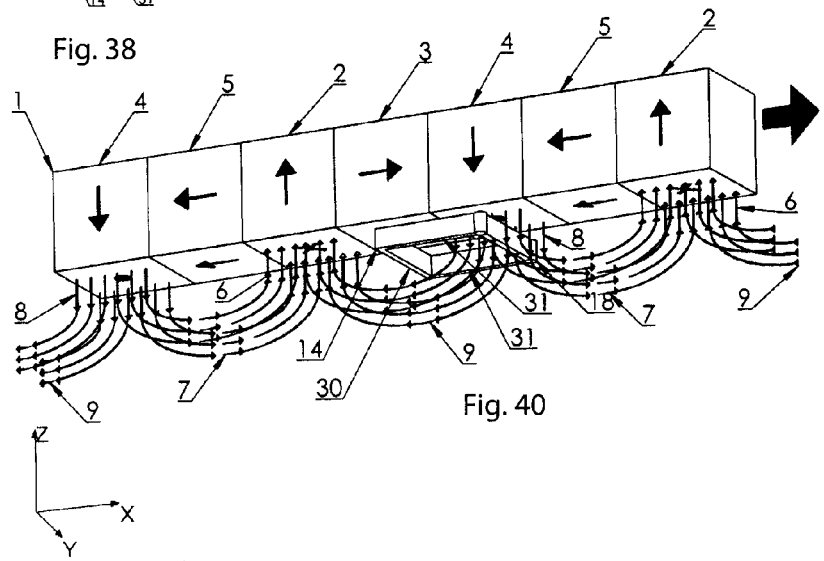

FIG. 40 is identical to FIG. 39, but the external flux lines of the HA are also indicated.

Figure 41:
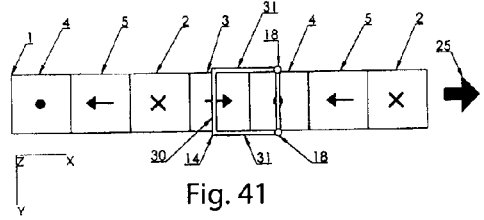

FIG. 41 is an underside 2D view of FIG. 39 in the positive z-axis direction.

Figure 42:
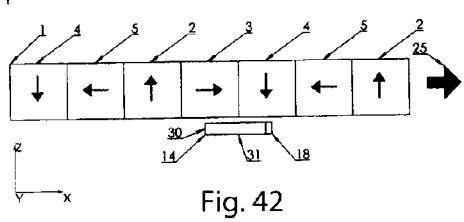

FIG. 42 is a sidewise 2D view (x-z plane cross-section) of FIG. 39 in the positive y-axis direction.

Figure 43:
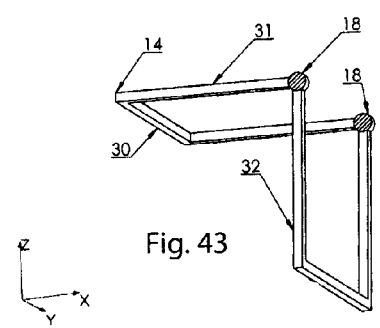
Figure 44:
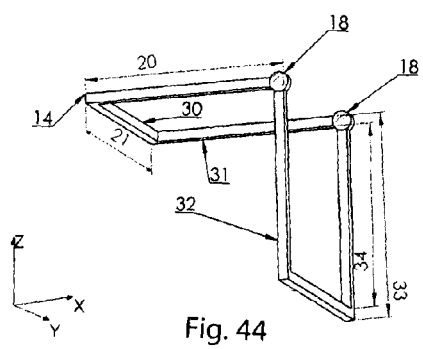
Figure 45:
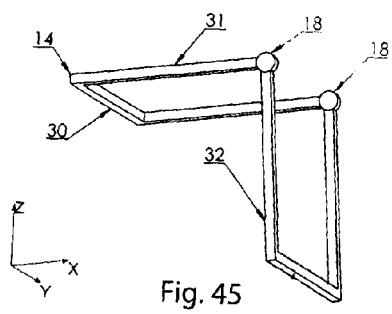
Figure 46:
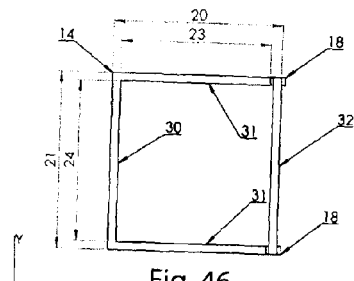

FIG. 43 and FIG. 44 (with both switches set ON) as well as FIG. 45 and FIG. 46 (with both switches set OFF) give illustrations of an alternative example SIE, termed a AL-SIE, used to generate both horizontal alignment forces as well as levitation forces, and consisting of a loop of non-magnetic conductive material extending downward, with two switches 18 located at its upper right-most section that control electrical current within the AL-SIE.

FIG. 43 is a 3D illustration of the alternative example AL-SIE used to generate translational alignment forces, without length dimensions, with both switches set ON.

FIG. 44 is a 3D illustration of the alternative example AL-SIE of FIG. 43, with both switches set ON, with indication of its length dimensions and with the 3D coordinate axis.

FIG. 45 is a 3D illustration of the alternative example AL-SIE of FIG. 43, without length dimensions, with both switches set OFF.

FIG. 46 is an underside 2D view of FIG. 43 in the positive z-axis direction.

Figure 47:
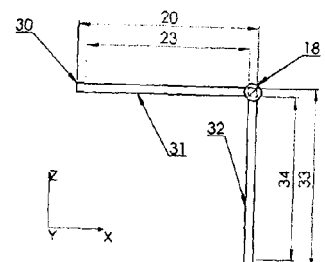

FIG. 47 is a sidewise 2D view (x-z plane cross-section) of FIG. 43 in the positive y-axis direction.

Figure 48:
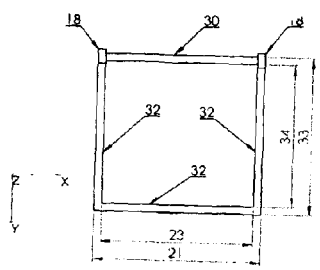

FIG. 48 is a sidewise 2D view (y-z plane cross-section) of FIG. 43 in the positive x-axis direction.

Figure 49:
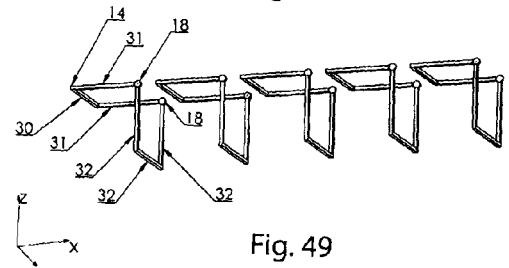

FIG. 49 gives a 3D illustration of a linear array of AL-SIEs forming a linear track, each as illustrated in FIG. 43 and used to generate both horizontal alignment forces as well as levitation forces.

Figure 50:
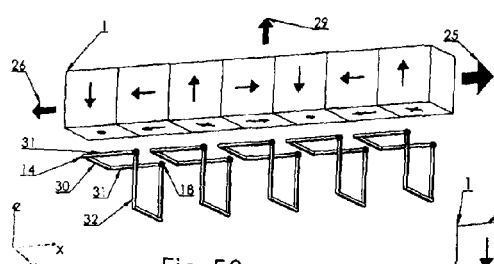

FIG. 50 gives a 3D illustration of a linear array of AL-SIEs forming a linear track as in FIG. 49, with a HA 1 moving from right to left above the AL-SIEs along the x-axis, with indication of resulting horizontal alignment forces as well as levitation forces.

Figure 51:
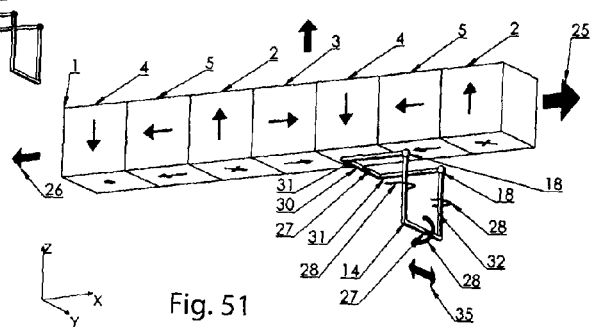

FIG. 51 (in 3D), FIG. 52 (in 3D with external flux lines), FIG. 53 (underside 2D view), and FIG. 54 (sidewise 2D view as x-z plane cross-section) are illustrations of electrical current 27 within AL-SIE induced by movement 25 of an HA in the positive direction of the x-axis from left to right over the AL-SIE, at a position where the electrogeneration element 30 (the upper-left-most part of the AL-SIE) is just below a HA magnet 4 with internal flux directed downward, and where the Switches 18 are ON allowing induced current flow within AL-SIE. Illustrations give the resulting drag force 26 on the HA (resulting from the inductive energy-transfer from kinetic energy to electrical current) is directed from right-to-left, in reverse of the direction of the HA. Also indication of induced the horizontal left-to-right magnetic flux 28 in the electromagnetic element 32. The resulting left-to-right alignment force 32 on the HA parallel with the positive x-axis (resulting from the alignment of the horizontal left-to-right magnetic flux in the electromagnetic element with the similarly directed left-to-right external magnetic flux of the HA in that region) is illustrated. Also, illustration of the resulting levitation force 31 on the HA parallel with the positive z-axis.

FIG. 51 is a 3D illustration of inductive current induced by left to right movement of a HA over the AL-SIE 14 of FIG. 43 at a position where the electrogeneration element 30 (the upper-left-most part of the AL-SIE) is just below a HA magnet 4 with internal flux directed downward, and where the Switches 18 are ON allowing induced current flow within AL-SIE, and resulting drag force on the HA from right-to-left. Indication of induced magnetic flux of AL-SIE. Illustration of the resulting left-to-right alignment force 32 on the HA parallel with the x-axis. Also, illustration of the resulting levitation force 31 on the HA parallel with the positive z-axis. The external flux lines of the HA are not indicated.

FIG. 52 is identical to FIG. 51, but the external flux lines of the HA are also indicated.

FIG. 53 is an underside 2D view of FIG. 51 in the positive z-axis direction.

FIG. 54 is a sidewise 2D view (x-z plane cross-section) of FIG. 40 in the positive y-axis direction.

FIG. 55 (in 3D), FIG. 56 (in 3D with external flux lines), FIG. 57 (underside 2D view), and FIG. 58 (sidewise 2D view as x-z plane cross-section) are illustrations of electrical current 27 within AL-SIE of FIG. 43 induced by movement 25 of an HA in the positive direction of the x-axis from left to right over the AL-SIE, at a position where the electrogeneration element 30 is just below a HA magnet 2 with internal flux directed upward, and where the Switches 18 are ON allowing induced current flow within AL-SIE. Illustrations give the resulting drag force 26 on the HA (resulting from the inductive energy-transfer from kinetic energy to electrical current) is directed from right-to-left, in reverse of the direction of the HA. Also indication of induced the horizontal right-to-left magnetic flux 28 in the electromagnetic element 32. The resulting right-to-left alignment force 32 on the HA parallel with the positive x-axis (resulting from the alignment of the horizontal right-to-left magnetic flux in the electromagnetic element with the similarly directed right-to-left external magnetic flux of the HA in that region) is illustrated. Also, illustration of the resulting levitation force 31 on the HA parallel with the positive z-axis.

FIG. 55 is a 3D illustration of inductive current induced by left to right movement of a HA over the AL-SIE 14 at a position where the electrogeneration element 30 is just below a HA magnet 2 with internal flux directed upward, and where the Switches 18 are ON allowing induced current flow within AL-SIE, and resulting drag force on the HA from right-to-left. Indication of induced magnetic flux of AL-SIE. Illustration of the resulting right-to-left alignment force 32 on the HA parallel with the x-axis. Also, illustration of the resulting levitation force 31 on the HA parallel with the positive z-axis. The external flux lines of the HA are not indicated.

FIG. 56 is identical to FIG. 55, but the external flux lines of the HA are also indicated.

FIG. 57 is an underside 2D view of FIG. 55 in the positive z-axis direction.

FIG. 58 is a sidewise 2D view (x-z plane cross-section) of FIG. 44 in the positive y-axis direction.

FIG. 59 (in 3D), FIG. 60 (in 3D with external lux lines), FIG. 61 (underside 2D view), and FIG. 62 (sidewise 2D view as x-z plane cross-section) are illustrations of movement 25 of an HA in the positive direction of the x-axis from left-to-right over the AL-SIE 14 of FIG. 43, at a position where the left-most part of an AL-SIE is just below a HA magnet 3 with internal flux directed sideways left-to-right and where both the Switches 18 are OFF allowing within the AL-SIE zero induced current flow 27, no drag force 26, and no horizontal alignment force 30.

FIG. 59 is a 3D illustration of inductive current induced by left to right movement 25 of a HA over the AL-SIE 14, at a position where the left-most part of the AL-SIE 14 of FIG. 17 is just below a HA magnet 3 with internal flux directed sideways left-to-right and where both the Switches 18 are OFF allowing within the AL-SIE zero induced current flow 27, no drag force 26, and no horizontal alignment force 30.

FIG. 60 is identical to FIG. 59, but the external flux lines of the HA are also indicated.

FIG. 61 is an underside 2D view of FIG. 59 in the positive z-axis direction.

FIG. 62 is a sidewise 2D view (x-z plane cross-section) of FIG. 59 in the positive y-axis direction.

Illustrations of a 2D array of magnets consisting of multiple linear HAs are given in FIG. 63 (in 3D) and FIG. 64 (in 2D from below), where each HA as in FIG. 1 aligned parallel to the x-axis, and separated on the y-axis to avoid the magnetic fields of neighboring HAs.

FIG. 63 is a 3D illustration of a 2D array of magnets consisting of multiple linear HAs), where each HA as in FIG. 12 aligned parallel to the x-axis, and separated on the y-axis to avoid the magnetic fields of neighboring HAs.

FIG. 64 is an underside 2D view of FIG. 63.

Illustrations of a 2D array of magnets arranged as a two dimensional Halbach Array (2D-HA) are given in FIG. 65 (in 3D), FIG. 66 (in 3D with external magnetic flux indicated), FIG. 67 (underside 2D view), and FIG. 68 (sidewise 2D view along y-axis). The component magnets are rectilinear shaped, and assembled to form the 2D-HA, denoted 1, so that: Magnet 2 has internal magnetic flux 6 directed vertically upward, in the positive direction of the z-axis; it has a neighboring magnet 3 in the positive x-axis direction, and it has a neighboring magnet 37 in the positive y-axis direction. Magnet 3 has internal magnetic flux 7 directed horizontally left-to-right, in the positive direction of the x-axis; it has a neighboring magnet 4 in the positive x-axis direction, and it has no neighboring magnet in the positive y-axis direction. Magnet 4 has internal magnetic flux 8 directed vertically downward, in the negative direction of the z-axis; it has a neighboring magnet 6 in the positive x-axis direction, and it has a neighboring magnet 38 in the positive y-axis direction. Magnet 6 has internal magnetic flux 9 directed horizontally right-to-left, in the negative direction of the x-axis; it has a neighboring magnet 2 in the positive x-axis direction, and it has no neighboring magnet in the positive y-axis direction. Magnet 37 has internal magnetic flux 39 directed horizontally, in the positive direction of the y-axis; it has no neighboring magnet in the positive x-axis direction, and it has a neighboring magnet 4 in the negative y-axis direction. Magnet 38 has internal magnetic flux 40 directed horizontally, in the negative direction of the y-axis; it has no neighboring magnet 4 in the positive x-axis direction, and it has a neighboring magnet 2 in the positive y-axis direction.

FIG. 65 is a 3D illustration of a 2D-HA with rectilinear shaped magnets, without indication of external flux lines.

FIG. 66 is a 3D illustration of the 2D-HA of FIG. 65, with external flux lines indicated.

FIG. 67 is an underside 2D view of a 2D-HA of FIG. 65, with indication of the magnetic flux through the underside of the HA.

FIG. 68 is a sidewise 2D view (y-z plane cross-section) of a 2D-HA of FIG. 65, with internal and external flux lines indicated.

FIG. 69 gives an illustration of a 2D array of L-SIEs, each as illustrated in FIG. 17 (used to generate levitation forces).

FIG. 70 gives an illustration of a 2D array of L-SIEs as in FIG. 69, with a 2D array of magnets (as in FIG. 63) moving from left to right above the L-SIEs along the x-axis, with indication of resulting levitation forces.

FIG. 71 gives an illustration of a 2D array of AL-SIEs, each array of AL-SIEs as illustrated in FIG. 43 (used to generate both horizontal alignment forces as well as levitation forces).

FIG. 72 gives an illustration of a 2D array of SIEs as in FIG. 71, with a 2D array of magnets (as in FIG. 63) moving from left to right above the AL-SIEs along the x-axis, with indication of resulting horizontal alignment forces as well as levitation forces.

Illustrations of a dynamically configured SIE are given in FIG. 73 (with all switches OFF), FIG. 74 (with primary switches ON and secondary switches OFF), FIG. 64 (with primary switches OFF and secondary switches ON).

FIG. 73 is a 3D illustration of a dynamically configured SIE with all switches OFF.

FIG. 74 is a 3D illustration of a dynamically configured SIE primary switches OFF and secondary switches ON, used like a L-SIE to produce only levitation forces.

FIG. 75 is a 3D illustration of a dynamically configured SIE with primary switches ON and secondary switches OFF, used like a AL-SIE to produce both levitation forces and horizontal orientation forces.

Figure 76:
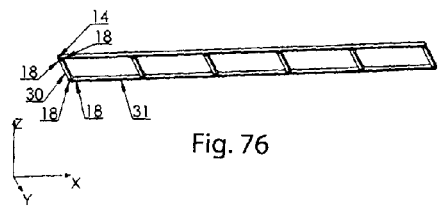
Figure 77:
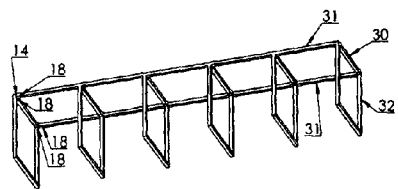
Figure 78:
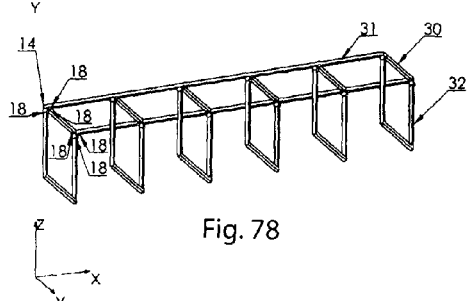

Illustrations of a dynamically configured linear array of SIEs are given in FIG. 76 (with L-SIEs) and FIG. 77 (with AL-SIEs), and FIG. 78 (with dynamically configured SIEs)

FIG. 76 is a dynamically configured linear array of L-SIEs in the shape of a ladder, with switches set to activate multiple separate L-SIEs.

FIG. 77 is a dynamically configured linear array of AL-SIEs, with switches set to activate multiple separate AL-SIEs.

FIG. 78 is a dynamically configured linear array of dynamically configured SIEs, with switches set to activate multiple separate dynamically configured SIEs.

Figure 79:
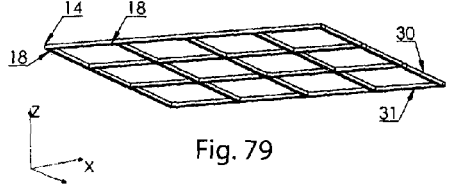
Figure 80:
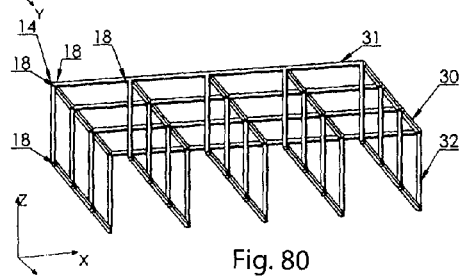
Figure 81:
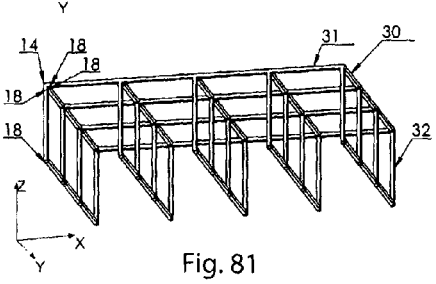

Illustrations of a dynamically configured 2D array of SIEs are illustrated in FIG. 79 (a 2D grid with L-SIEs) and FIG. 80 (a 2D grid with AL-SIEs), and FIG. 81 (with dynamically configured SIEs).

FIG. 79 is a dynamically configured 2D array of L-SIEs in the shape of a 2D grid, with switches set to activate multiple separate L-SIEs.

FIG. 80 is a dynamically configured 2D array of AL-SIEs, with switches set to activate multiple separate AL-SIEs.

FIG. 81 is a dynamically configured 2D array of dynamically configured SIEs, with switches set to activate multiple separate dynamically configured SIEs.

Figure 82:
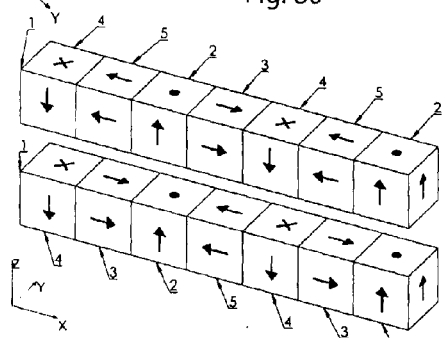
Figure 83:
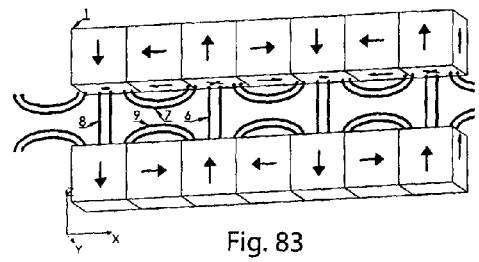
Figure 84:
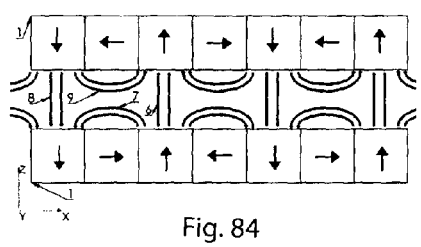
Figure 85:
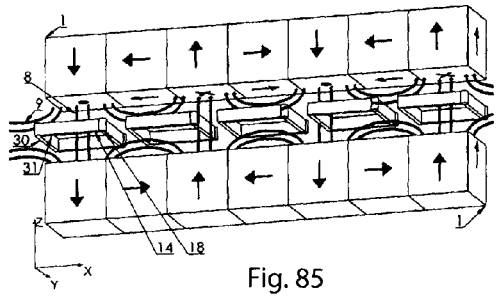

Illustrations of a pair of HAs, the lower one vertically flipped, positioned above each other aligned with the x-axis, are given in FIG. 82 (3D view without magnetic flux), FIG. 83 (3D view with magnetic flux) FIG. 84 (sidewise 2D view as x-z plane cross-section), and FIG. 85 (3D view where the HA channel moves along the linear array of L-SIEs).

FIG. 82 gives a 3D Illustration of a pair of HAs, the lower one vertically flipped, positioned above each other aligned with the x-axis, without indication of magnetic flux.

FIG. 83 gives FIG. 82 with indication of magnetic flux.

FIG. 84 sidewise 2D view (x-z plane cross-section) of FIG. 82 with magnetic flux.

FIG. 85 gives a 3D Illustration of the HA channel 43 given in FIG. 71, where the HA channel moves along the linear array of L-SIEs.

FIG. 86 gives a 2D view (y-z plane cross-section) of HAs positioned on the lower, upper and sides of the interior of HA channel 43 aligned with the x-axis, without indication of magnetic flux.

Illustrations of a Electro-Magnetic Halbach Array (EM-HA) aligned on the x-axis are given in FIG. 87 (in 3D), FIG. 88 (in 3D with lengths indicated), FIG. 78 (in 3D with current and magnetic flux indicated), FIG. 90 (sidewise 2D view as x-z plane cross-section with current and magnetic flux indicated). The Figures illustrate that EM-HA 44 has components that alternatively are a vertically aligned electromagnetic part termed the Vertical EMP 45 of the EM-HA, and a horizontally aligned electromagnetic part termed Horizontal EMP 46 of the EM-HA.

FIG. 87 is a 3D illustration of an EM-HA, without indication of magnetic flux but with indication of lengths.

FIG. 88 is a 3D illustration of the EM-HA of FIG. 87, with indication of lengths. With wires 48 indicated.

FIG. 89 is a 3D illustration of the EM-HA of FIG. 87, with indication of current and magnetic flux.

FIG. 90 is a 3D view of an EM-HAs, with magnetic flux indicated.

Illustrations of an EM-HA of FIG. 90 positioned below an EM-HA of FIG. 87 are given in FIG. 91 (3D view without magnetic flux), FIG. 92 (3D view with magnetic flux) FIG. 93 (sidewise 2D view as x-z plane cross-section), and FIG. 94 (3D view where the HA channel moves along the linear array of L-SIEs).

FIG. 91 gives a 3D Illustration of an EM-HA of FIG. 90 positioned below an EM-HA of FIG. 18 and aligned with the x-axis, without indication of magnetic flux.

FIG. 92 gives FIG. 91 with indication of magnetic flux.

Figure 93:
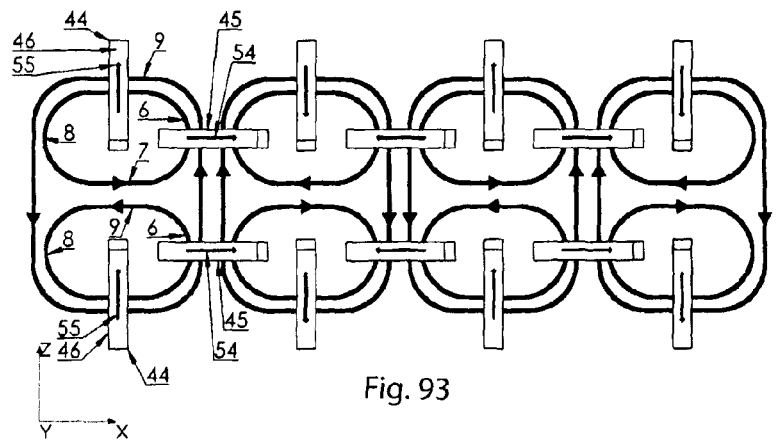

FIG. 93 sidewise 2D view (x-z plane cross-section) of FIG. 92 with magnetic flux.

Figure 94:
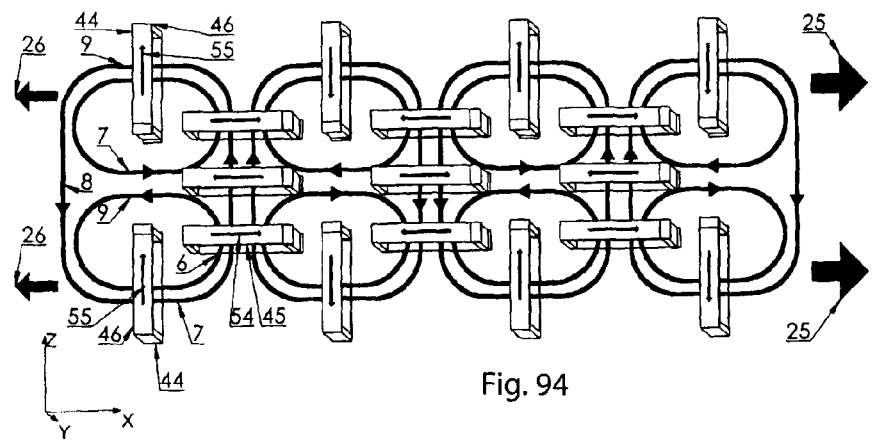

FIG. 94 gives a 3D Illustration of FIG. 93, where the HA channel moves along the linear array of L-SIEs.

Figure 95:
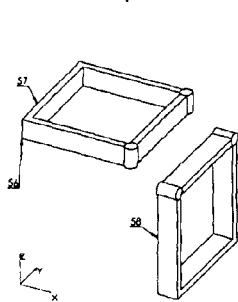
Figure 96:
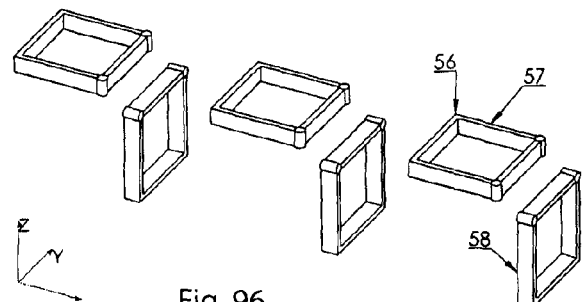

The EM-SIE 56 is illustrated in FIG. 95 (in 3D without indication of magnetic flux), FIG. 96 (in 3D with indication of magnetic flux). The figures indicate that the EM-SIE 56 has two parts, a part termed the Vertical EMP 57 of the EM-SIE, and a horizontally aligned electromagnetic part termed Horizontal EMP 58 of the EM-SIE. These have switches.

FIG. 95 gives a 3D Illustration of the EM-SIE 56 and its parts, without indication of magnetic flux.

FIG. 96 gives a 3D Illustration of a linear array of EM-SIE 56, without indication of magnetic flux.

Figure 97:
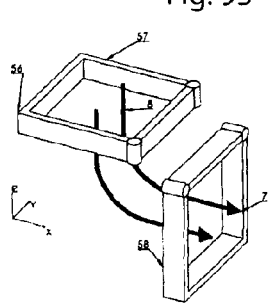

FIG. 97 gives a 3D Illustration of FIG. 95, with indication of magnetic flux.

FIG. 98 gives a 3D Illustration of HA moving above a linear array EM-SIE 56, with indication of resulting magnetic flux in the EM-SIE 56 and induced forces on the HA.

I claim:

1. A magnetic levitation system, comprising:
    an array of magnetic elements, with individual magnetic elements having differently oriented magnetic fields; and
    an inductive component that provides a levitation force by magnetic communication with the magnetic fields of the array of magnetic elements, wherein the inductive component includes:
        an array of inductive elements, wherein individual inductive elements include a looped circuit that provides a component of the levitation force; and
        at least one switch element that controls current flow in one or more of the looped circuits responsive to translational motion between the inductive component and the array of magnetic elements.

2. The system of claim 1 wherein the at least one switch element controls current flow based on magnetic field communication with the differently oriented fields of the array of magnetic elements.

3. The system of claim 2 wherein the at least one switch element further controls current flow based on the magnitude of the velocity of the translational motion.

4. The system of claim 2, further comprising a controller operably coupled to the at least one switch element to control the switch element based on at least one of magnetic field communication with the differently oriented fields of the array of magnetic element and the magnitude of the velocity of the translational motion.

5. The system of claim 1 wherein the translational motion between the inductive component and the magnetic array includes movement of the array of magnetic elements while the inductive component remains stationary.

6. The system of claim 1 wherein the translational motion between the inductive component and the magnetic array includes movement of the inductive component while the array of magnetic elements remains stationary.

7. The system of claim 1, wherein the individual magnetic elements include at least one of a permanent magnet, electromagnet, or a superconducting coil.

8. An apparatus that provides levitation, comprising:
    an inductive element that receives a first magnetic force from an array of magnetic elements and provides a second magnetic force that repels the first magnetic force, wherein the array of magnetic elements includes a first magnetic element providing a first magnetic field and a second magnetic element providing a second magnetic field that is different than the first magnetic field; and
    a switch element operably coupled to the inductive element, wherein the switch element regulates current in the inductive element based on the relative location of the inductive element with respect to the first and second magnetic elements.

9. The apparatus of claim 8 wherein individual magnetic elements of the array of magnetic elements are arranged along a first elongated axis, and wherein the inductive element is one of an array of inductive elements having a second elongated axis that is generally parallel with the first elongated axis.

10. The apparatus of claim 8, wherein further comprising an array of inductive elements including the inductive element and having a first axis and a second axis that is transverse to the first axis, wherein the array of inductive elements provides two-dimensional translational motion between the array of inductive elements and the array of magnetic elements.

11. The apparatus of claim 8 wherein the switch element comprises at least one of a magnetic switch and an inductive switch.

12. The apparatus of claim 8 wherein the switch element comprises an optical switch.

13. The apparatus of claim 8, further comprising a controller operably coupled to the switch element, wherein the controller controls operation of the switch element based on a magnitude of translational motion between the inductive element and the array of magnetic elements.

14. The apparatus of claim 8 wherein the inductive element comprises an inductive coil.

15. The apparatus of claim 8, further comprising a charge storage component that stores energy produced by the inductive element.

16. A method for levitation, comprising:
    receiving a first force from a first magnetic field and a second force from a second magnetic field different than the first magnetic field;
    repelling at least one of the first and second forces with an inductive element in magnetic communication with at least one of the first magnetic field and the second magnetic field; and
    controlling a current in the inductive element based on the relative location of the inductive element with respect to the first and second magnetic elements.

17. The method of claim 16 wherein controlling the current includes operating a gate that increases or decreases a magnitude of the current based on the relative location of the inductive element with respect to the first and second magnetic fields.

18. The method of claim 16 wherein controlling current includes closing a switch or opening the switch.

19. The method of claim 18 wherein the inductive element is a first inductive element, and wherein the method further comprises providing an alignment force with a second inductive element that is coupled to the first inductive element and is positioned in a different plane than the first inductive element.

20. The method of claim 16 wherein repelling at least one of the first and second forces with the inductive element comprises producing a third magnetic force by controlling the current with a switch.

21. The method of claim 20 wherein the third magnetic force comprises a levitation force.

22. The method of claim 20 wherein the third magnetic force comprises and alignment force.

23. A levitation device, comprising:
    a first inductive component that communicates with a magnetic field;
    a second inductive component that communicates with the magnetic field; and
    at least one switch operably coupled to the first inductive component and the second inductive component, wherein the switch regulates current flow in the first and second inductive components according to the relative locations of the magnetic field with respect to the first and second inductive components.

24. The device of claim 23 wherein the first inductive component is coupled to the second inductive component, and wherein:
    the first inductive component is positioned within a first plane, wherein the first inductive component provides a levitation force; and
    the second inductive component is positioned within a second plane that is different than the first plane of the first inductive element, and wherein the second inductive component provides an alignment force that is generally transvers to the levitation force.

25. The device of claim 23 wherein the first and second conductive components are operably coupled to the same switch of the one or more switches.

26. The device of claim 23 wherein the first and second conductive components are operably coupled to different switches of the one or more switches.

27. The device of claim 23 wherein the at least one switch includes at least one first switch and at least one second switch:
    the first inductive component includes the first switch;
    the second inductive component includes the second switch; and
    the first and second switches operate without electrical communication with a controller.

28. The device of claim 23 wherein the switches are coupled to a controller that separately regulates the current flow in each of the first and second inductive components.

* * * * *

UNITED STATES PATENT AND TRADEMARK OFFICE
CERTIFICATE OF CORRECTION

PATENT NO.        : 9,024,487 B1  
APPLICATION NO.   : 13/682712  
DATED             : May 5, 2015  
INVENTOR(S)       : John H. Reif Page 1 of 1

It is certified that error appears in the above-identified patent and that said Letters Patent is hereby corrected as shown below:

In the Specification

In column 12, line 66, delete "(the" and insert -- The --, therefor.

In column 13, line 2, before "relative" delete "from".

In column 17, line 8, delete "($4\rho\alpha d_0$)." and insert -- ($4\rho\alpha_0$). --, therefor.

In column 32, line 47, delete "SIEs)" and insert -- SIEs). --, therefor.

Signed and Sealed this  
Ninth Day of February, 2016

Michelle K. Lee  
*Director of the United States Patent and Trademark Office*